(12) United States Patent
Pogrebezky et al.

(10) Patent No.: US 10,866,996 B2
(45) Date of Patent: Dec. 15, 2020

(54) AUTOMATED METHOD AND SYSTEM FOR CLUSTERING ENRICHED COMPANY SEEDS INTO A CLUSTER AND SELECTING BEST VALUES FOR EACH ATTRIBUTE WITHIN THE CLUSTER TO GENERATE A COMPANY PROFILE

(71) Applicant: salesforce.com, inc., San Francisco, CA (US)

(72) Inventors: Eli Pogrebezky, Bene Ayish (IL); Hanan Aharonof, Ness Ziona (IL); Erez Agami, Tel Aviv (IL); Baruch Shushi, Herzliya (IL)

(73) Assignee: saleforce.com, inc., San Francisco, CA (US)

( * ) Notice: Subject to any disclaimer, the term of this patent is extended or adjusted under 35 U.S.C. 154(b) by 143 days.

(21) Appl. No.: 16/261,348

(22) Filed: Jan. 29, 2019

(65) Prior Publication Data

US 2020/0242171 A1    Jul. 30, 2020

(51) Int. Cl.
| | |
|---|---|
| G06F 16/30 | (2019.01) |
| G06F 16/951 | (2019.01) |
| G06N 20/20 | (2019.01) |
| G06F 16/906 | (2019.01) |
| G06F 16/958 | (2019.01) |

(52) U.S. Cl.
CPC .......... *G06F 16/951* (2019.01); *G06F 16/906* (2019.01); *G06F 16/986* (2019.01); *G06N 20/20* (2019.01)

(58) Field of Classification Search
CPC ..... G06F 16/951; G06F 16/906; G06F 16/986
USPC ........ 707/609, 687, 705, 769, 790, 813, 821
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |

(Continued)

*Primary Examiner* — Sana A Al-Hashemi
(74) *Attorney, Agent, or Firm* — LKGlobal | Lorenz & Kopf, LLP

(57) ABSTRACT

Methods and systems are provided for automatically generating company profiles. Independent seed source services each crawl web pages to collect seeds from different web-based sources. A seed enricher module can then fetch additional information for each of the collected seeds from other different web-based sources and generate an enriched company seed for each collected seed. The enriched company seeds can then be automatically clustered into different clusters that each represent a particular company. A particular value for each attribute of each cluster that is determined to have the highest score can then be selected for inclusion in a corresponding company profile for that cluster.

20 Claims, 18 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,354,339 B2 * | 7/2019 | Deb ..................... G06Q 50/01 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

\* cited by examiner

AUTOMATED METHOD AND SYSTEM FOR CLUSTERING ENRICHED COMPANY SEEDS INTO A CLUSTER AND SELECTING BEST VALUES FOR EACH ATTRIBUTE WITHIN THE CLUSTER TO GENERATE A COMPANY PROFILE

TECHNICAL FIELD

Embodiments of the subject matter described herein relate generally to databases or repositories of company information, and techniques and technologies for automatically creating the same. More particularly, embodiments of the subject matter relate to a method and system for automatically clustering enriched company seeds into a cluster and selecting best values for each attribute within the cluster to generate a company profile.

BACKGROUND

In general, businesses use a customer relationship management (CRM) system (also referred to as a database system or system) to manage business relationships and information associated with the business relationship. For example, a multi-tenant system may support an on-demand customer relationship management (CRM) application that manages the data for a particular organization's sales staff that is maintained by the multi-tenant system and facilitates collaboration among members of that organization's sales staff (e.g., account executives, sales representatives, and the like). This data may include customer and prospect contact information, accounts, leads, and opportunities in one central location. The information may be stored in a database as objects. For example, the CRM system may include "account" object, "contact" object and "opportunities" object. Instances of those objects are called records.

Conventional CRM systems can be used to create records for each type of object. Many of these records require that users input a significant amount of information about the company that is associated with the particular record such as the company name, contact information, information about key contacts, leads, opportunities, etc. Finding the required information to complete the record can be time-consuming for each CRM user. For instance, a CRM user can manually search for a company's home website, and then try to find the information required to complete the record. This information could be spread out across many different webpages that make up the company's home website. However, in some cases, the company's home website may be incomplete and not include all of the required information needed to complete the record. In that case, the CRM user needs to search other resources in an attempt to find the required information needed to complete the record. This further complicates the process. In addition, when creating different records, different CRM users may use different versions of the same information to complete a record for the same company. This can lead to inconsistency.

To address this challenge, the CRM system may choose to subscribe to one or more database services that provide access to a database that includes company information for each company. These services typically create a database of records for many large companies, and regularly update and maintain those records on a regular basis. These services then charge end users for access privileges to access those records. The end users can then access the database and use information therein for a plethora of uses.

Examples of such services include databases offered by Dun & Bradstreet, Mergent Online, Factiva, Business Source Complete, LexisNexis Academic, Uniworld Online, etc. For example, Dun & Bradstreet's Private Company Database offers a comprehensive commercial database of more than 120 million business records that allows users to uncover targeted leads and new sales opportunities. Sales prospecting tools can be used perform public and private company research, and targeting of companies based on size, location, industry, competitors and more. Million Dollar Directory by Dun & Bradstreet provides information on both private and public companies and their executives. It includes coverage of all businesses in the U.S. and Canada and business profiles on firms in over 200 countries worldwide. This database will also let user's build company lists with geographic and industry criteria. The Mergent Online database has information on public and private companies. The Mergent Online database provides full company reports, the ability to view competitors of both private and public companies, and up to 15 years of key financial information. Such services/databases can help address the efficiency and consistency issues noted above.

One drawback of using these company database services is that they are expensive and cost the end users (e.g., other companies) money to subscribe to for the right to use the database service. Another drawback is that the database associated with the service is not complete in the sense that it only includes certain information for certain companies, but may not include information about other companies (e.g., smaller companies that are not deemed important enough for inclusion in the database).

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
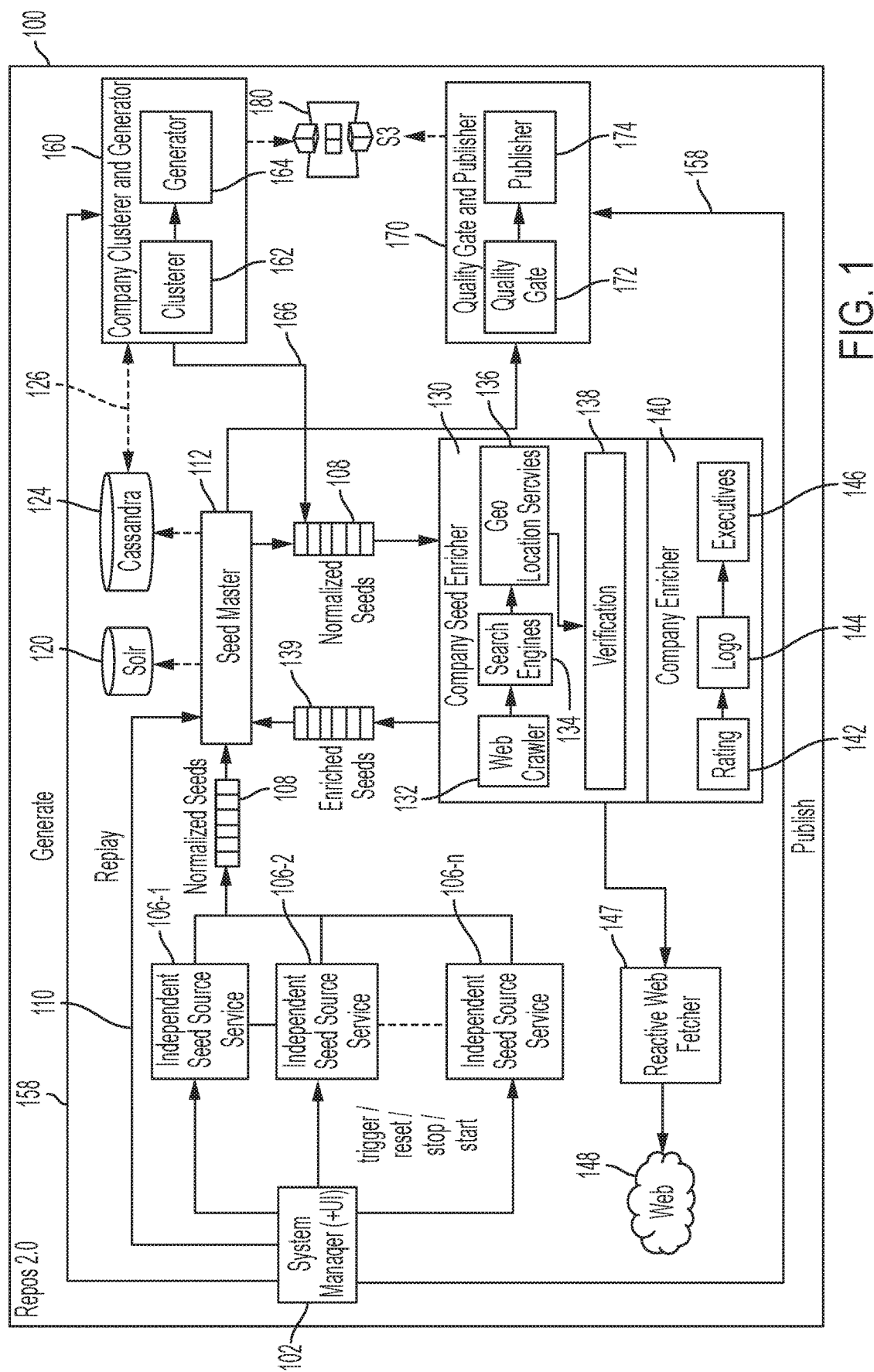
FIG. 1 is a block diagram of a seed collection, enrichment and clustering system in accordance with the disclosed embodiments.

The process of generating and maintaining a company database is time-consuming, tedious and inefficient. Even the process of acquiring data needed to build and regularly update a single company profile that is included in a company database that includes thousands of such company profiles is time-consuming, tedious and inefficient.

For example, according to one approach, a person could do a search to try to find various web-based resources and then methodically go through those web-based resources to collect various pieces of information that could be potentially included in the company profile. The person must first know whether they have found a web resource that is "good" or "valid." There can also be fake websites that use a company name to attract traffic, but have no true affiliation with the company. That process alone can be time-consuming. In some cases, companies may have websites without the company name or with the wrong company name or with multiple inconsistent company names. Even once the company's website or home webpage is found, it may be company information that would be desirable to include in a company profile, or have invalid information that is outdated or incorrect. The person could then perform additional searches to attempt to find company information (that would be desirable to include in a company profile) from other webpages that mention the company, and even once a source of the additional information is found (e.g., after comparing various sources that might include the missing formation that is sought), the person still needs to validate that the information is in fact the company information the person sought. For instance, if it is desirable to include a certain piece of information (such as a company's logo or list of executives) that is not provided by the company via one of the webpages from the company's home website, the person might do a search for that information and come up with hundreds of possible results that they must then sort through and determine which result is the best source. All of this trial and error searching consumes even more time, and even then, this process still prone to error because there is no easy way to validate which information is accurate and which information is inaccurate. The person could attempt to acquire this information from the company itself and/or validate this information with a company representative, but that can also be time-consuming, impractical, or impossible (e.g., if no company representative is willing to provide the information or verification that the information is accurate). These are just a few of the challenges faced when constructing a company profile for a single company that is part of a large database. As such, there are various difficulties involved in the process of creating a single company profile.

The person could then repeat this process for each company that is to be included in the database. There may be thousands, or even hundreds of thousands, of companies in some databases, and the problems noted above become even more pronounced as the number of companies to be included in the database increases.

Another problem is that once the initial database is created, the company information for each company profile needs to be periodically re-checked to see if it has changed and needs to be updated. In addition, as new companies come into existence this process has to be repeated to add a new company profile to the database for each new company. This process is obviously time-consuming and prone to error. As a result, many databases choose to focus on a limited number of companies that are included in the database to limit the time needed to regularly update records for each company.

Moreover, the process for even determining which companies should be included in the database, or added to the database over time, can also be somewhat arbitrary since it is left to a human decision maker to decide which companies warrant having their profile included in the database.

It would be desirable to provide tools that can allow for a repository of company profiles to be generated and regularly updated in a way that is automated, efficient, and consistent, while also helping to eliminate the need to subscribe to a database service such as those described above.

Once the database has been created, and is available for use by end users, the end users may need a way to decide which companies to target when there are multiple different options to choose from. For example, a salesperson might decide that they want to start a marketing campaign directed to a company that buys widgets. The database could include, for example, 50 different companies that are known to buy widgets. The salesperson would then have to review each of the different company profiles to better determine who the best target companies are, and then select a company profile which they believe is the best target for the marketing campaign. It would be desirable if there is some automated way to rank or rate each of the company profiles according to various criteria or metrics so that the various different companies can be sorted based on their ranking or rating, and then presented to the end user in a ranked order.

Prior to describing the disclosed embodiments, some definitions for certain terminology will be provided.

As is known, the Internet is a global wide area network that connects computer systems across the world. It includes several high-bandwidth data lines that comprise the Internet "backbone." These lines are connected to major Internet hubs that distribute data to other locations, such as web servers and ISPs. The World Wide Web is a collection of webpages following the http protocol that can be accessed using a web browser via the Internet. The http protocol is a language that is used on the Internet in order to transfer data and communicate.

A search engine is a web service that helps people find webpages from other websites. Examples of search engines include Google, Bing, Yahoo, or DuckDuckGo. Search engines are normally accessed through a web browser or through a webpage. Search engines search websites available within the World Wide Web. The search engine searches the Internet (or select parts of the Internet) based on important words, and keeps an index of the words they find and where they find them to allows users to look for words or combinations of words found in that index.

A web server can refer to computer hardware or software, or both of them working together. A web server hosts one or more websites on the Internet. "Hosting" means that all the webpages and their supporting files are available on that computer. A web server stores a website's files, namely all HTML documents and their related assets, including images, CSS stylesheets, JavaScript files, fonts, videos, etc. A web server provides support for Hypertext Transfer Protocol (HTTP) that specifies how to transfer hypertext (i.e., linked web documents) between two computers. HTTP provides clear rules for how a client and server communicate.

On the hardware side, a web server is a computer that stores web server software and a website's component files (e.g. HTML documents, images, CSS stylesheets, and JavaScript files). It is connected to the Internet and supports physical data interchange with other devices connected to the web. On the software side, a web server includes several parts that control how web users access hosted files, at minimum an HTTP server. An HTTP server is a piece of software that understands URLs (web addresses) and HTTP (the protocol your browser uses to view webpages). It can be accessed through the domain names (like mozilla.org) of websites it stores, and delivers their content to the end-user's device. The HTTP server is responsible for processing and answering incoming requests. On receiving a request, an HTTP server first checks whether the requested URL matches an existing file. If so, the web server sends the file content back to the browser. If not, an application server builds the necessary file. If neither process is possible, the web server returns an error message to the browser (e.g., 404 Not Found).

The web server will send any webpage from the website it is hosting to any user's web browser, per user request. To fetch a webpage, a browser sends a request to the web server, which proceeds to search for the requested file in its own storage space. On finding the file, the server reads it, processes it as needed, and sends it to the browser. At the most basic level, whenever a browser needs a file which is hosted on a web server, the browser requests the file via HTTP. When the request reaches the correct web server (hardware), the HTTP server (software) accepts request, finds the requested document (if it doesn't then a 404 response is returned), and sends it back to the browser, also through HTTP. Only clients can make HTTP requests, and then only to servers. Servers can only respond to a client's HTTP request. When requesting a file via HTTP, clients must provide the file's URL. The web server must answer every HTTP request, at least with an error message.

A static web server, or stack, consists of a computer (hardware) with an HTTP server (software). The server sends its hosted files "as-is" to a browser. A dynamic web server consists of a static web server plus extra software, most commonly an application server and a database. The application server updates the hosted files before sending them to your browser via the HTTP server. For example, to produce the final webpages displayed in the browser, the application server might fill an HTML template with contents from a database. This setup makes it easier and quicker to maintain and deliver the content.

A web site is a collection of linked webpages (plus their associated resources) that share a unique domain name. A website's main webpage can be called a homepage. The webpages of a website are grouped together and usually connected together in various ways. For example, each webpage of a given website can provide explicit links—most of the time in the form of clickable portion of text—that allow the user to move from one page of the website to another.

A webpage is a representation of a document that is located at a remote site. A webpage is an individual HTML document for the World Wide Web that is identified and reachable by a unique address called a unique uniform resource locator (URL). Webpages are what make up the World Wide Web. Every Webpage corresponds to various types of information presented to the visitor in a visual and readable manner. The data found in a webpage is usually written in hypertext markup language (HTML) or XHTML format. A webpage can embed a variety of different types of resources such as: style information which controls a webpage's look-and-feel; scripts which add interactivity to the page; media such as images, sounds, and videos, etc.

A web browser is software that retrieves and displays webpages. Examples of web browsers include: Mozilla Firefox, Google Chrome, Opera, Microsoft Internet Explorer or Edge, or Apple's Safari. A webpage can be accessed and translated by a web browser so that they can be displayed (e.g., on a monitor or mobile device). The web browser is connected to the web server, where the website's contents are hosted through HTTP. All the information is returned as HTML code, so when the page gets to your browser, all the browser has to do is translate the HTML. The Webpages usually also contain other resources such as style sheets, scripts and images for presentation. Users may be able to navigate to other pages through hypertext links. Webpages can either be static or dynamic. Static pages show the same content each time they are viewed. Dynamic pages have content that can change each time they are accessed. These pages are typically written in scripting languages such as PHP, Perl, ASP, or JSP. The scripts in the pages run functions on the server that return things like the date and time, and database information.

In accordance with the disclosed embodiments, to address the problems and challenges mention above, methods, systems and related technologies are provided that automatically build a repository of company profiles by crawling the Internet to find company information from various sources (referred to as company seeds), enrich those company seeds, assemble the enriched company seeds into clusters, pick the best information from each cluster to generate a corresponding company profile for a particular company, and validate the attributes of each company profile. The company profiles can then be stored within a repository, and the repository can eventually be published (if it meets certain quality control measures) for use by users, applications and services.

In accordance with one embodiment, a system and method are provided for discovery and identification of a company name from a plurality of different websites. Web pages can be crawled to find many candidate company names from many different web-based sources, and then one of the candidate company names can be selected for each company profile. In one implementation, a method is provided for automatically determining and selecting correct company names from websites based on HTML extracted from home webpages of different companies. An HTML source file is downloaded from a home webpage of a company, and many candidate company names are extracted from the HTML source file along with support indicators that are used as support for determining the company names. For example, the candidate company names can be extracted from HTML source files by inspecting different sections (e.g., a copyright section, a <title> tag, meta tags (html), and other textual parts of the home webpage) that correspond to different sections of the home webpage of each company. Each support indicator is an extracted name that has been determined to have similarities to the company name extracted from the home webpage of each company. For example, the support indicators that are used as support for determining the company name can be extracted from one or more URLs, from one or more social handles, or from different HTML attributes.

A clustering algorithm is then applied to cluster similar company names and supporters together into different clusters for further processing that includes computing a score for each cluster using a heuristic formula, and selecting a cluster having a highest score. Each cluster represents a particular company. For example, a score for each cluster can be computed using a heuristic formula based on one or more features derived from that cluster including: cluster size; source location where each of the extracted candidate company names come from within an HTML structure of each HTML web page; and a number of support indicators included in that the cluster. Selection rules are then applied that rank different name options within each selected cluster by order of importance, and, from each of the selected clusters, a top ranked name from is selected as a company name.

In accordance with one embodiment, a company seed enrichment method and pipeline system are provided for finding and validating enhancement information to be added to company seed data to enrich company seed data. In one implementation, a seed enricher module automatically enriches collected seeds. Each of the collected seeds comprises: original seed data that includes a plurality of attributes each having a type and an associated value. Each value is a specific piece of structured or unstructured information associated with a particular company. Each website that is associated with each collected seed is processed, via a web crawler of the seed enricher module. The web crawler crawls a home webpage for the company associated with that collected seed to verify, based on similarity between company name and website name, that a website associated with that home page belongs to that company. For example, in one embodiment, the web crawler of the seed enricher module uses a breadth first (BFS) traversal method to fetch information using the different extractor algorithms.

When verification is successful, other webpages on the website are processed to fetch information using different extractor algorithms. Each extractor algorithm is designed to fetch a specific attribute for that company that corresponds to either missing seed data for that collected seed or other instances of the original seed data for that collected seed. Each collected seed is then enriched by adding the additional company information to the original seed data for each collected seed to generate an enriched company seed. The additional company information added to each collected seed can include the missing seed data and the other instances of the original seed data that were fetched by the crawler.

For example, in one embodiment, some of additional company information for each collected seed can be fetched using one or more search engines. Each collected seed can then be enriched by adding additional company information to the original seed data for each collected seed to generate an enriched company seed. The additional company information added to each collected seed comprises one or more of: the missing seed data and the other instances of the original seed data that were fetched by the crawler, and the additional company information that was fetched by the one or more search engines. In another embodiment, third-party application programming interfaces (APIs) can be used to structure unstructured information to generate structured information. The unstructured information comes from one or more of: the original seed data for each collected seed, the missing seed data to be added to each collected seed, the other instances of original seed data to be added to each collected seed, and the additional company information to be added to each collected seed. Each collected seed can then be enriched by adding this additional company information to the original seed data for each collected seed to generate an enriched company seed. In this case, the additional company information added to each collected seed comprises one or more of: the structured information that was generated by the third-party APIs, the missing seed data and the other instances of the original seed data that were fetched by the crawler, and the additional company information that was fetched by the one or more search engines. The structured information that was generated by the third-party APIs, the missing seed data and the other instances of the original seed data that were fetched by the crawler, and the additional company information that was fetched by the one or more search engines can then be validated by comparing the structured information that was generated by the third-party APIs, the missing seed data and the other instances of the original seed data that were fetched by the crawler, and the additional company information that was fetched by the one or more search engines to the original seed data. Each enriched company seed comprises: values for each attribute from the original seed data prior to enrichment, one or more websites that are associated with that enriched company seed, and additional values for attributes that have been extracted from the one or more websites. The missing seed data and the other instances of the original seed data fetched by the crawler can then be validated by comparing the missing seed data and the other instances of the original seed data fetched by the crawler to the original seed data.

In accordance with one embodiment, a system and method are provided for automatically generating company profiles. A plurality of independent seed source services each crawl web pages to collect seeds from different web-based sources. Each collected seed comprises original seed data that includes a plurality of attributes each having a type and an associated value. Each value is a specific piece of structured or unstructured information associated with a particular company. A seed enricher module can then fetch additional information for each of the collected seeds from a plurality of different web-based sources, and add the additional information to each of collected seeds to enrich that collected seed to generate an enriched company seed. Each enriched company seed includes values for each attribute from the original seed data prior to enrichment, one or more websites that are associated with that enriched company seed, and additional values for attributes that have been extracted from the one or more websites. The enriched company seeds can then be automatically clustered into different clusters via a clusterer and company profile generator module by identifying selected ones of the enriched company seeds that each belong to a particular company, and then grouping the selected ones of the enriched company seeds into a cluster that represents that particular company. Each cluster has at least one value for each attribute. A particular value for each attribute of each cluster that has the highest score can then be selected for inclusion in a corresponding company profile for that cluster, and each of the company profiles can be stored in a repository.

In one embodiment, the enriched company seeds can be automatically clustered into different clusters into different clusters by: retrieving the enriched company seeds from the repository; determining which ones of the enriched company seeds have similar attributes; and grouping similar enriched company seeds that have similar attributes together into different groups, wherein each group is a cluster of enriched company seeds that corresponds to and represents a particular company.

In another embodiment, the enriched company seeds can be automatically clustered into different clusters into different clusters by: indexing, at a search engine of the clusterer and company profile generator module, each of the enriched company seeds by each attribute of that enriched company seed, such that each enriched company seed has an index entry for each attribute to allow each of the enriched company seeds to be searchable by attributes, wherein each index entry represents a particular enriched company seed; and processing each enriched company seed, at a clusterer module of the clusterer and company profile generator module, to: search in the index for other enriched company seeds that have similar attributes to find similar enriched company seeds that are candidates for potential inclusion in a cluster for a particular company. For each seed pair of an enriched company seed for a particular company and a candidate company seed having similar attributes to that enriched company seed, values of attributes of the two company seeds can be compared to calculate and extract features; and a pre-trained random forest machine learning model can then be run on extracted features to determine whether that candidate company seed belongs to the same cluster as the enriched company seed. When the pre-trained random forest machine learning model determines, based on the extracted features, that the candidate company seed belongs to the same cluster as the enriched company seed, that candidate company seed can be added to the same cluster as the enriched company seed. A connective components algorithm can then be executed at the clusterer module to: collect any other candidate company seeds that share a connection to one or more of the other candidate company seeds that were added to the same cluster of the enriched company seed for that particular company; and add the any other candidate company seeds that share a connection to the same cluster.

Each cluster can include a number of different attributes, and each attribute within a particular cluster can have multiple values that were obtained from different seeds. Information in each cluster can be processed by: scoring each value of each attribute within that cluster based on how similar each value is to corresponding information extracted from a home webpage for that company; selecting, for each attribute within that cluster, the particular value for each attribute that has the highest score for inclusion in a company profile for that cluster; and grouping all of the selected values from that cluster together to convert that cluster into a company profile for a particular company, wherein the company profile comprises a set of values that had the highest score for each attribute. Each company profile can then be stored in the repository such that users can access the company profiles and use the company profiles in conjunction with applications.

For example, each of values for each attribute within that cluster can be scored to generate a score for each attribute by comparing values for each attribute to a value of a corresponding attribute from the original seed data that was extracted from the home webpage for that company. In one embodiment, each of values for each attribute within each cluster can be scored by (a) selecting a particular enriched company seed from the cluster; (b) extracting values for each attribute of that particular enriched company seed; (c) determining a similarity of each extracted value for each attribute of that particular enriched company seed in comparison to an original value of a corresponding attribute from the original company seed to determine a similarity score for that attribute of that particular enriched company seed; (d) scaling each similarity score based on a weight assigned to that attribute to generate a weighted similarity score for each attribute of that particular enriched company seed; (e) summing all of the weighted similarity scores at a website scoring function to generate a website score for that particular enriched company seed; and (f) computing a score, for each value of each attribute of that particular enriched company seed, as a product of the website score for that particular enriched company seed and the similarity score that was computed for that attribute of that particular enriched company seed. Steps (a)-(f) can then be repeated for each of the other enriched company seeds from the cluster to generate scores for all attributes that are part of the cluster.

In one embodiment, each company profile comprises the set of values that had the highest score for each attribute, where each attribute is a specific piece of information about a company that describes that company or that can be used to identify that company. In one embodiment, the attributes within a cluster include: a company name attribute, a website address attribute, a ticker attribute, a physical address attribute and a telephone number attribute, and the values within at least one company profile comprise values for a company name, a website address, a ticker symbol, a physical address and a telephone number for a particular company.

In accordance with one embodiment, a system and method are provided for automatically enriching a company profile with a company logo by extracting candidate images from various sources and determining which image most closely corresponds the company logo. The company enricher module can perform company-level enrichment processing on the company profile to update the company profile with supplemental information. Specifically, a company logo module can search a plurality of different web-based sources for different images that are candidate logos for the particular company; determine which image most closely corresponds to a company logo for the particular company; select the image that most closely corresponds to the company logo as the company logo to be included in the company profile for the particular company, and add the selected image to the company profile for the particular company to enrich the company profile for the particular company.

In one embodiment, a search engine executes a query to search a web-based data source for webpages that reference the particular company, and search results from one or more of the webpages that reference the particular company are then scraped to extract a company name and a company website. The extracted company name extracted from the extracted company website is compared to corresponding fields within the company profile for the particular company, and it can be determined whether the extracted company name and the extracted company website match with the corresponding values for those attributes from the company profile. If there is a match, a logo from the web-based data source (e.g., a Wikipedia webpage) can be extracted (e.g., from an information box within the Wikipedia webpage based on observation of HTML domain information).

When the extracted company name and the extracted company website does not match with the corresponding values for those attributes from the company profile, the company logo module can crawl the company website specified in the company profile to extract candidate images for the company logo from the company website; and select either one of the candidate images or the logo that was extracted from the web-based data source as the company logo. For example, in one embodiment, the company logo module can crawl the company website specified in the company profile to extract to extract an HTML file and any imported CSS files from a home webpage of the company website; parse the HTML file and the imported CSS files to extract candidate images for the company logo; filter the candidate images and remove bad image patterns that have been learned to generate a set of remaining candidate images for the company logo from the company website; generate a score for each of the remaining candidate image; and select a sub-set of top remaining candidate images having the highest scores for comparison to the logo that was extracted from the web-based data source to determine which option should be selected as the company logo.

In one embodiment, a score for each of the remaining candidate image can be generated by deriving meta-features for each remaining candidate image, and generating a score for each of the remaining candidate images based on the derived meta-features for that remaining candidate image. The meta-features for each remaining candidate image can include, for example, one or more of: image name, image XPATH expression, html tags and attributes, whether the remaining candidate image includes an HREF attribute that directs to the home page, dimensions of the candidate image, and location of the candidate image.

In one embodiment, each of the sub-set of top remaining candidate images can be downloaded for further processing, and content features can be extracted from each of the sub-set of top remaining candidate images. The extracted content features for each of the sub-set of top remaining candidate images comprise: actual content dimensions; brightness; and whether that top remaining candidate image is a digital image. In one embodiment, a score for each of the sub-set of top remaining candidate images can be computed, based on the derived meta-features and the extracted content features for each of the sub-set of top remaining candidate images. The logo that was extracted from the web-based data source has a fixed score, and the sub-set of top remaining candidate images each have a score that varies based on their respective derived meta-features and extracted content feature. Either the logo that was extracted from the web-based data source, or one of the sub-sets of top remaining candidate images that has the highest score can be selected as the company logo.

In accordance with one embodiment, a system and method are provided for automatically identifying candidates from a plurality of different websites, determining which candidates correspond to company executives for a company profile, and generating an executive profile for the company profile. In accordance with the disclosed embodiments, a company enricher module can then perform company-level enrichment processing on the company profile to update the company profile with supplemental information. Specifically, in this embodiment, a company executive determination module can search, using a search engine API, a plurality of different web-based sources to identify candidate webpages that potentially include information that relates to one or more executives of a particular company having a company profile that is part of a repository; download each of the candidate webpages; extract data from each of the candidate web pages that relates to an executive for the particular company, wherein the extracted data comprises: executive details that correspond to company executives; process the extracted data to generate at least one executive profile for the company profile; and add the at least one executive profile for the particular company to the company profile for that particular company to enrich the company profile for that particular company.

In one embodiment, the company executive determination module can also verify whether each of the candidate webpages belongs to the particular company. For example, in one implementation, the company executive determination module can verify whether each of the candidate webpages belongs to the particular company by comparing webpage domain name to the company domain; and then determine whether each of the verified candidate web pages are executive web pages by executing a random forest machine learning model to identify if each verified candidate webpage is an executive page that belongs to the particular company. In one non-limiting implementation, the random forest machine learning model includes words from each of the candidate webpages including: title, body and URL, wherein the words and their n-grams are encoded using Word2Vec neural network to construct vector representations of words and used as the model features.

In one embodiment, the company executive determination module can also analyze each of the verified executive webpages to extract executive details from each of the verified executive webpages. For example, in one implementation, in each of the verified candidate webpages, the company executive determination module can mark elements in that verified candidate webpage that are suspected to be names of people and job titles; traverse an HTML tree of that verified candidate webpage to locate one or more subgraph patterns that correspond to names of people and job titles; search the HTML tree of that verified candidate webpage to locate similar patterns that correspond to names of people and job titles; and extract, from the HTML tree of that verified candidate webpage, names of people and job titles. The company executive determination module can then add the extracted names of people and job titles to the company profile for that particular company as executive information.

In accordance with one embodiment, a system and method are provided for automatically generating a rating for each company profile of a plurality of company profiles stored in a repository and auto-filling a record with information from one of the highest ranked company profile. In accordance with the disclosed embodiments, a company enricher module can perform company-level enrichment processing on the company profile to update the company profile with supplemental information. Specifically, the company enricher module includes a company rating module that is configured to execute a process for each company to: automatically generate a rating score for each company profile of a plurality of company profiles stored in the repository, where each rating score is generated by processing a plurality of input metrics. In one embodiment, the company rating module can process the plurality of input metrics, at a company scoring function that is executed at the company rating module to rate each of the plurality of company profiles and generate a rating score for each company profile by executing code to: multiply each input metric by a weighting value assigned to that input metric to generate a product, wherein each product scales the relative importance of a particular input metric with respect to each of the other input metrics; sum all of the products for a particular company to generate a rating score for that particular company profile; and rank all of the company profiles based on their respective rating scores. In general terms, each rating score represent popularity, interest, and size of a particular company.

In one embodiment, the plurality of input metrics can include any combination of company size in terms of number of employees; a cluster size that indicates a number of company seeds that a particular company profile has in a cluster for that particular company; a reliability score, obtained by crowd source testing, that indicates reliability of each of the seed sources that reflects data correctness of that seed source; a number of company news items that indicates how many news items have been collected on a particular company; and a popularity metric that indicates how many times the particular company profile was selected in the past by other CRM users.

In one embodiment, the plurality of input metrics can include any combination of an indication of whether the company profile includes a ticker symbol that indicates that the particular company is publicly traded; an indication of whether the company profile includes a phone number for that particular company; an indication of whether the company profile includes a physical address for that particular company; an indication of whether the company profile includes a first type of social media account for that particular company; an indication of whether the company profile includes a second type of social media account for that particular company; an indication of whether the company profile includes a third type of social media account for that particular company; an indication of whether the company profile includes a page for that particular company in a web-based encyclopedia hosted on the World Wide Web; and an indication of whether the company profile includes a website having a top-level domain name that is one of .edu, .gov and .org.

A customer-relationship management (CRM) system, that provides a CRM application, can automatically retrieve, in response to a user input, a subset of the company profiles having the highest rating scores from the repository. The company profiles are used to autofill fields of CRM records during a process of creating the CRM records using the CRM application. For example, in response to selection of one of the subset of the company profiles, fields of a new CRM record created by the CRM application can be automatically filled with information from the selected one of the company profiles. To explain further, the CRM application that is used to create the new CRM record in the CRM system can automatically generate a query in response to user input (via a user interface of the CRM application), such as a prefix that represents a company name, and send the query to the repository to search for a number of top candidate company profiles having the highest rating scores. The CRM application can then display the number of top candidate company profiles via the user interface of the CRM application. The number of top candidate company profiles can be sorted based on their respective scores from highest to lowest, so that the user can select one of the top candidate company profiles that will be used to create the new CRM record. When the user selects one of the top candidate company profiles, the CRM application can automatically fill in the company name, website, phone, and address fields of the CRM record with name, website, phone, and address information from the selected one of the company profiles to auto populate the new CRM record with the data for the selected company profile.

In accordance with one embodiment, a system and method are provided for automatically verifying quality of company profiles stored in a repository and publishing the repository when the company profiles pass a quality test. In accordance with the disclosed embodiments, a quality gate and publisher module can process information from selected ones of the company profiles that make up the current version of the repository to automatically compute a repository quality score. The repository quality score indicates whether the current version of the repository meets quality standards to publish the current version of the repository to a data store. In one embodiment, the quality gate and publisher module is further configured to: apply a set of statistical methods and crowd sourcing methods, to at least some of the company profiles stored in the current version of the repository, to generate a set of variables; and then process the set of variables, at a repository quality scoring function that is executed at the quality gate and publisher module, to generate the repository quality score for the current version of the repository. The repository quality score indicates quality of the current version of the repository. In one implementation, the repository quality scoring function can execute code to: multiply each variable by a weighting value assigned to that variable to generate a product, and then sum all of the products to generate compute the repository quality score for the current version of the repository. Each product scales the relative importance of a particular variable with respect to each of the other variables.

In one embodiment, the quality gate and publisher module can determine whether the repository quality score is greater than or equal to a quality threshold that is used to determine whether the current version of the repository is of sufficiently high quality to allow for publication to the data store, and when the repository quality score is greater than or equal to the quality threshold, publish the current version of the repository to the data store.

In one embodiment, the set of variables comprise a name match percentage that is a percentage of company names for the selected ones of the company profiles that match corresponding company names obtained from company websites. A higher name match percentage reflects a higher quality of the current version of the repository, whereas a lower name match percentage reflects a lower quality of the current version of the repository.

In one embodiment, the set of variables can include an attribute coverage percentage for the selected ones of the company profiles. The attribute coverage percentage is a percentage of company profiles that have a value for each possible attribute type. A higher attribute coverage percentage reflects a higher quality of the current version of the repository, whereas a lower attribute coverage percentage reflects a lower quality of the current version of the repository.

In one embodiment, the set of variables can include an attribute duplication percentage for the selected ones of the company profiles, wherein attribute duplication percentage is a percentage of company profiles that exhibit attribute duplication by having duplicate values for the same attribute type, wherein a lower attribute duplication percentage reflects a higher quality of the current version of the repository, and wherein a higher attribute duplication percentage reflects a lower quality of the current version of the repository.

In one embodiment, the set of variables can include an overall display formatting score for a set of attributes selected from the company profiles in the repository. The overall display formatting score is a percentage of the set of attributes that have an average score greater than a threshold. Each one of the set of attributes can be scored by a plurality of users via a crowd sourcing platform. Each user submits a score for formatting of values for each one of the set of attributes, and an average of the submitted scores is computed for each of the attributes. The percentage of the set of attributes having an average score greater than a threshold is computed as the overall display formatting score. A higher overall display formatting score reflects a higher quality of the repository, whereas a lower overall display formatting score reflects a lower quality of the repository.

In one embodiment, the set of variables can include a geographical distribution of the company profiles in the current version of the repository. The quality gate and publisher module can perform geo-statistical analysis to determine the geographical distribution of the company profiles in the current version of the repository. The geographical distribution describes percentage of company profiles from different regions of interest. The quality gate and publisher module can also compare the geographical distribution of the company profiles in the current version of the repository to another geographical distribution of the company profiles in a past version of the repository to determine consistency of the current version of the repository with the past version of the repository.

FIG. 1 is a block diagram of a seed collection, enrichment and clustering system 100 in accordance with the disclosed embodiments. The seed collection, enrichment and clustering system 100 is a robust highly scalable system for generating a repository of company profiles that can be used other applications (e.g., CRM applications). The seed collection, enrichment and clustering system 100 is designed to collect seeds 108 from any source (e.g. Thomson Reuters, New York company registry, etc.) via dedicated components. In particular, the seed collection, enrichment and clustering system 100 includes a system manager 102 and independent seed source services 106-1 . . . 106-n that are triggered by the system manager 102 to collect new seeds.

The seed collection, enrichment and clustering system 100 includes a system manager 102, a plurality of independent seed source services 106-1 . . . 106-n, a seed master module 112, a search engine 120, a repository 124, a seed enricher module 130, a 147 that accesses webpages over a 148, a clusterer and company profile generator module 160, and a quality gate and publisher module 170, and the data store 180.

The system manager 102 controls and manages other components of the seed collection, enrichment and clustering system 100 such as the independent seed source services 106-1 . . . 106-n, the seed master module 112, and the clusterer and company profile generator module 160. In particular, the system manager 102 triggers each instance of the independent seed source services 106-1 . . . 106-n so that the independent seed source services 106-1 . . . 106-n collects new seeds. Each collected seed comprises original seed data that includes one or more attributes each having a type and an associated value. As used herein, an "attribute" can refer to a specific piece of information about a company that describes or can be used to identify that company. In most cases, an attribute is a tuple of a type and a value <type, value>, where the type can be different properties of some entity (e.g., if the entity is company or an organization some examples of types can include company name, website address, phone, physical address, stock ticker, industry, Facebook® Handle, etc.). Each value is a specific piece of structured or unstructured information associated with a particular company (e.g., information about a company that describes a company, identifies a company, or that can be processed to identify a company) that has been extracted from a webpage or another source. In most cases, the original seed data is raw data or a list of attributes that has been pulled from some source (e.g., Wikipedia®, Thomson-Reuters®, Jigsaw®, account data from a CRM system, etc.). The original seed data can come in different forms (e.g., structured or unstructured data). In some cases, a seed is a vector of information that can contain one or more values for attributes that correspond to some company, organization or entity. While a seed can include any information about a company some common examples of this type of information can include: a company name, a company address, a company telephone number, a URL for a company website, one or more social media handles for the company, etc. A "company seed" is a seed having one or more values for attributes that point to some company, organization or entity.

Each of the independent seed source services 106-1 . . . 106-n can output the collected seeds to the seed master module 112. The seed master module 112 can store the seeds temporarily and then persist them at the repository 124. The seed master module 112 can also send the seeds 108 to the seed enricher module 130 for enrichment as will be described in greater detail below. Each collected seed can be enriched to include additional information or seed data that was not present in the original seed data. The "additional seed data" can include new attributes that were not present in the original seed data (where the new attributes also have values), or can include some or all of the same attributes that were present in the original seed data, where the same attributes can have the same or different values that the original seed data. An "enriched company seed" is an extended object—that holds the original collected seed, and adds new values for attributes by different methods (crawling website, invoking third-party APIs, geo-location services, using search engines and more). In other words, each enriched company seed typically includes: values for each attribute from the original seed data prior to enrichment, one or more websites that are associated with that enriched company seed, and additional values for attributes that have been extracted from the one or more websites. In other words, some enriched company seeds may include one website, and other enriched company seed may include multiple websites. An example might be CRM account data that contains company name, company website and phone (e.g., Apple INC, www.apple.com, 1-800-275-2273).

Another example of a seed might be Thomson Reuters (TR) data (e.g., in the following line https://permid.org/1-4295907347 different information about VMware can be found).

The search engine 120 is used for searching the repository 124 for seeds and/or company profiles. In one implementation, the search engine 120 can be implemented using an open source enterprise search platform such as Solr (120) from the Apache Lucene project. Its major features include full-text search, hit highlighting, faceted search, real-time indexing, dynamic clustering, database integration, NoSQL features and rich document handling.

In one implementation, the repository 124 where seeds and company profiles are stored can be implemented using a data store or distributed database such as the Apache Cassandra™ database management system. Apache Cassandra™ is a free and open-source distributed NoSQL database management system designed to handle large amounts of data across many commodity servers, providing high availability with no single point of failure. Cassandra™ offers robust support for clusters spanning multiple datacenters, with asynchronous masterless replication allowing low latency operations for all clients.

Once a seed is collected and persisted at repository 124, the seed enricher module 130 starts to enrich it. The seed enricher module 130 includes various components that each perform enrichment processing to enrich the seeds 108. For example, the seed enricher module 130 fetches desired company information using external sources. The enrichment process performed by the seed enricher module 130 can be designed as a pipeline 132-136, where each step in the seed enricher pipeline 132-136 performs a different enrichment step.

For example, in one implementation, the seed enricher module 130 includes a web crawler 132, search engines 134, geo-location services 136, etc. that collectively form a seed enrichment pipeline. The seed enricher module 130 also includes a verification module 138.

As used herein, a web crawler can refer to a program that visits web sites and reads their pages and other information in order to create entries for a search engine index. The entries can include words found on pages of a web site, and where the words are found on each page. For example, words occurring in the title, subtitles, meta tags and other positions of relative importance were noted for special consideration during a subsequent user search. A web crawler indexes each word on the web site in the search index. The major search engines on the web all have such a program, which can also be referred to as a "spider" or a "bot."

Once a seed has been enriched and reaches the end of the seed enricher pipeline 132-136, the seed enricher module 130 sends the enriched company seeds 139 to the verification module 138. The verification module 138 validates or verifies seed data for each of the enriched company seeds prior to sending them back to the seed master module 112. Each enriched company seed that is successfully validated/verified can then be sent to the seed master module 112, and the seed master module 112 stores or "persists" the enriched company seeds 139 at the repository 124.

After the seed have been enriched, the clusterer and company profile generator module 160 can regularly (e.g., periodically or in response to occurrence of a condition of event) start a process of clustering the enriched company seeds. In the clustering process, the clusterer and company profile generator module 160 can retrieve the enriched company seeds from the repository 124, and can then group similar enriched company seeds together into clusters. Once the seeds have been grouped into clusters the information in each cluster can then be validated to help create a strong company profile for each company.

In one embodiment, the clusterer and company profile generator module 160 includes a clusterer module 162 and a profile generator module 164. The clusterer module 162 can group or cluster the enriched company seeds into different clusters (also referred to as "cluster data sets" herein) that correspond to a particular company.

The profile generator module 164 can perform processing to generate company profiles 126 and provide the company profiles to the repository 124. For example, the profile generator module 164 can use machine learning methods to convert each of the company seed clusters into a corresponding company profile in a process that selects the best information gathered while eliminating redundant information. As such, by extracting and keeping the best information that was collected while removing other information that was collected, each company profile 126 is processed version of a cluster of enriched company seeds that has been processed to further improve it.

Once the clusterer and company profile generator module 160 has grouped the enriched company seeds into the clusters and processed them to generate corresponding company profiles, the company enricher module 140 can perform company-level enrichment processing on each company profile to further enrich it by performing various enrichment steps. For example, in one embodiment, the company enricher module 140 includes a rating module 142 that rates the company according to various metrics, a company logo module 144 that finds the best company logo from a number of different image options, and a company executive determination module 146 that finds company executives.

Once the company enrichment processing has been performed by the company enricher module 140, the "enhanced" company profile that has been generated for each company can be stored at the repository 124.

In certain cases, when publication is warranted, the company profiles stored at the repository 124 can be published (e.g., the current version of the repository is published). Once published the company profiles are provided to and stored at the data store 180, the repository 124 of enhanced company profiles is then available for use by other consumers/applications.

In one embodiment, prior to publishing the company profiles to the data store 180, the quality gate and publisher module 170 can perform processing to determine whether the company profiles that are part of the repository 124 meet certain quality criteria. As will be explained in greater detail below, when the quality gate module 172 determines that the current version of the repository 124 meets the quality criteria, the publisher module 174 can publish the repository 124 of company profiles to the data store 180. In one embodiment, that will be described in greater detail below, the quality gate module 172 applies a set of statistical methods and crowd sourcing methods in order to determine the quality of a candidate repository. In some embodiments, a smart comparison between previous versions of the repository can be performed to determine data quality.

If the quality gate module 172 determines that the current version of the repository 124 does not meet the quality criteria, further processing can be performed by the seed enricher module 130 and/or the rating module 142 further enrich the company profiles until they meet the quality criteria necessary for publication by the publisher module 174. Once the quality gate module 172 determines that the current version of the repository 124 does meet the quality criteria (i.e., passes the quality test), the publisher module 174 publishes it to data store (S3) 180.

Figure 2A:
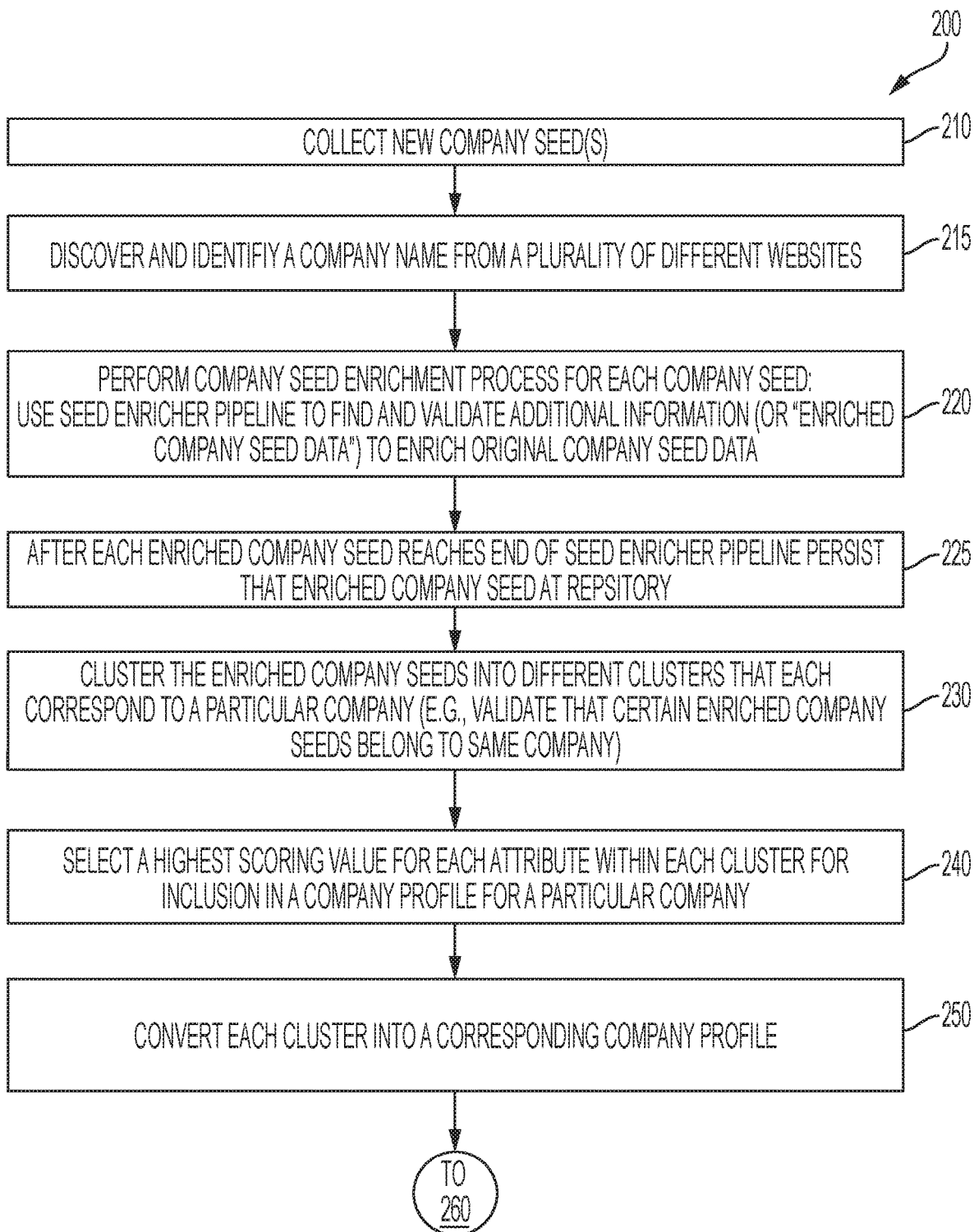
FIGS. 2A and 2B collectively illustrate a method for automatically generating a repository of company profiles in accordance with the disclosed embodiments.
Figure 2B:
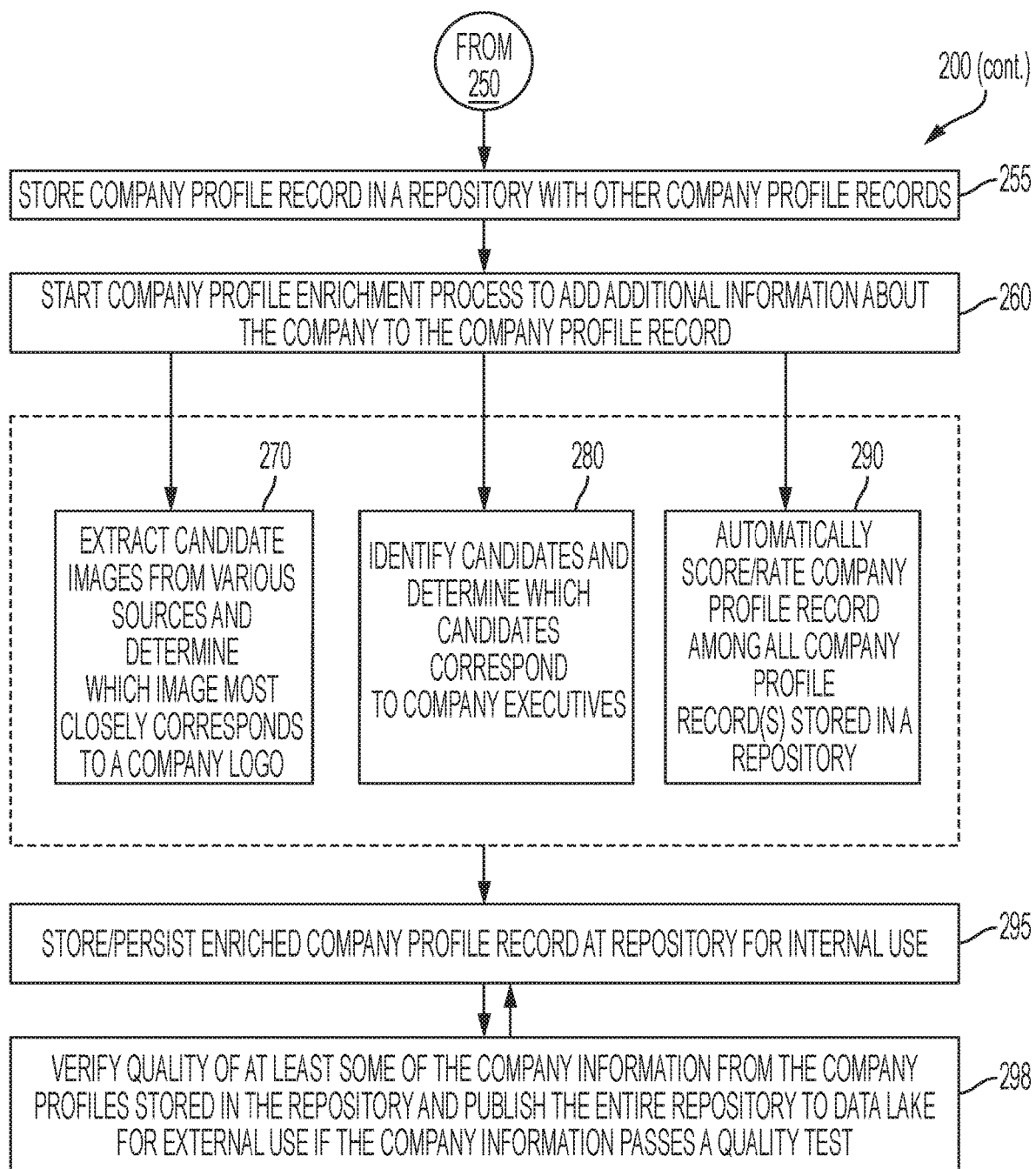

FIGS. 2A and 2B collectively illustrate a method 200 for automatically generating a repository 124 of company profiles in accordance with the disclosed embodiments. The method 200 can be used to generate the repository 124 without requiring input from any human actors. The method 200 can be performed continuously to generate different versions of the repository 124 and update them over time. The various company profiles are included as part of the repository 124 can then be utilized within a CRM system, for example, to generate various records such as account records, lead records, opportunity records, etc. For sake of simplicity, the method 200 will be described with respect to a single company, but it should be appreciated that the method 200 can be performed for several different companies. In other words, multiple different instances of the method 200 can be executed simultaneously or in parallel to create company profiles for many different companies that will be included as part of repository 124.

With reference to method 200, steps can be added, omitted, and/or performed simultaneously without departing from the scope of the appended claims. It should be appreciated that the method 200 may include any number of additional or alternative tasks, that the tasks shown in FIGS. 2A and 2B need not be performed in the illustrated order, and that the method 200 may be incorporated into a more comprehensive procedure or process having additional functionality not described in detail herein. Moreover, one or more of the tasks shown in FIGS. 2A and 2B could potentially be omitted from an embodiment of the method 200. It should also be understood that the illustrated method 200 can be stopped at any time. The method 200 is computer-implemented in that various tasks or steps that are performed in connection with the method 200 may be performed by software, hardware, firmware, or any combination thereof. For illustrative purposes, the following description of the method 200 may refer to blocks/elements mentioned above in connection with FIG. 1. In certain embodiments, some or all steps of this process, and/or substantially equivalent steps, are performed by execution of processor-readable instructions stored or included on a non-transitory processor-readable medium. For instance, any block/element illustrated in FIG. 1 will be described in FIGS. 2A and 2B as performing various acts, tasks or steps, but it should be appreciated that this refers to processing system(s) and/or storage system(s) of these entities executing instructions to perform those various acts, tasks or steps. Depending on the implementation, some of the processing system(s) can be centrally located, or distributed among a number of server systems that work together. Furthermore, in the description of FIGS. 2A and 2B, a particular example is described in which various blocks/elements of FIG. 1 perform certain actions by interacting with other blocks/elements of the system 100.

Method 200 begins at 210. At 210, when triggered by the system manager 102, each of the various instances of independent seed source services 106-1 . . . 106-n can collect new seeds 108 from any source (e.g., any websites on the Internet, a CRM system, private data companies like Thomson Reuters®, New York Company Registry®, etc.).

The method 200 then proceeds to 215, where the seed enricher module 130 discovers and identifies one or more company names from a plurality of different websites. One implementation of step 215 will be described below with reference to FIG. 3.

At 220, the seed enricher module 130 can perform seed enrichment processing for each seed. As will be described in greater detail below, the seed enricher module 130 includes a seed enricher pipeline 132, 134 136 that can find enhancement information (or "enriched company seed data") used to enrich the original company seed data for each company seed. In addition, the seed enricher module 130 includes a verification module 138 that can verify this enhancement information (or "enriched company seed data") before making it part of the seed data for a seed.

At 225, once each seed reaches the end of the seed enricher pipeline 132, 134 136, and has been verified by the verification module 138, the seed enricher module 130 can persist each enriched company seed at the repository 124. One implementation of steps 215, 220, 225 will be described below with reference to FIG. 4.

At 230, for each company, the clusterer and company profile generator module 160 can cluster selected company seed data into a cluster (also referred to as "cluster data set") for that company. For example, the clusterer and company profile generator module 160 can validate that certain company seed data from various enriched company seeds belongs to same company, and then group it into a cluster for that company. In other words, for each company, some of the company seed data from the various enriched company seeds can be grouped together into a cluster for that particular company. The company seed data that is included in each cluster belongs to or is associated with a particular company. One implementation of step 230 will be described below with reference to FIGS. 5A and 5B.

At 240, the clusterer and company profile generator module 160 scores all of the attributes within the cluster. For example, the values of attributes for each field can be scored based on how similar those values are to information extracted from the company webpage. One implementation of step 240 will be described below with reference to FIGS. 5A and 5C.

At 250, the clusterer and company profile generator module 160 can select highest scoring attributes within the cluster to convert the cluster into a company profile. In other words, the highest scoring attributes from the cluster are chose to be part of the company profile for the particular company. In one implementation, the clusterer and company profile generator module 160 can determine which fields to choose from multiple sources when converting each cluster data set into a company profile the clusterer. The company profile generator module 160 automatically selects the best values for a given field of the company profile from multiple sources and filters out any bad values. One implementation of step 250 will be described below with reference to FIG. 5A.

At 255, the clusterer and company profile generator module 160 can store the company profile in a repository with other company profiles for other companies. Following 255, the method 200 proceeds to 260 is shown in FIG. 2B. At 260, a company profile enrichment process is performed to add additional information about each company to its corresponding company profile. This additional information is information that would not be directly available from the company seeds when a company profile is created, but is useful to include in a company profile to enhance or enrich it. The company profile enrichment process can include several steps 270, 280 and 290.

At 270, the company logo module 144 of the company enricher module 140 can extract candidate images from various sources and determine which image most closely corresponds to a company logo. The company logo module 144 can then add that image to the company profile as the company logo. The processing at 270 can be performed for each company that is part of the repository 124. One implementation of step 270 will be described below with reference to FIGS. 6A and 6B.

At 280, the company executive determination module 146 can identify candidate webpages, determine/verify which candidate webpages belong to a particular company, and then extract executive details that correspond to company executives from at least one of the candidate webpages that was successfully verified. Again, the processing performed at 280 can be done for each company that is part of the repository 124. One implementation of step 280 will be described below with reference to FIG. 7.

At 290, the rating module 142 can automatically score or rate company profiles that are stored in the repository 124 to generate a score or rating for each company profile. The scores or ratings that are generated at 290 can then be used by applications when selecting company profiles (e.g., in the process of generating CRM records). For example, in one embodiment, a CRM system can use the company profiles are stored in the repository 124 when creating an account record. A CRM user can input information into a CRM application and the CRM application can then automatically retrieve one or more of the company profiles that have the highest score(s) or rating(s). The CRM user can then select one of those company profiles and the information for the selected company profile can then be auto populated into the account record. One implementation of step 290 will be described below with reference to FIGS. 8 and 9.

After all the company profiles have undergone the company profile enrichment processing, at step 295, the enriched company profiles can be stored and persisted at the repository 124.

At 298, the quality gate and publisher module 170 can periodically or regularly verify the quality of at least some of the company information from one or more of the company profiles stored at the repository 124 prior to publishing the current version of the repository 124 to the data store 180. In other words, when at least some of the company information stored as the current version of the repository 124 passes a quality test performed by the quality gate module 172, then the company information that is stored as the current version of the repository 124 can then be published to the data store 180 by the publisher module 174. Users, applications and services can then access any of the company profiles (or data that is part of any of the company profiles) and use it in conjunction with various applications and services.

On the other hand, when the samples of company information stored at the repository 124 fail the quality test performed by the quality gate module 172, the company information that is currently stored at the repository 124 will not be published to the data store 180, but will instead continue to be further enriched or improved. This can involve collecting additional seed data, enriching existing or newly collected seed data, or performing further company enrichment processing at the company enricher module 140 to improve the quality of the company information that is stored at the repository 124. One implementation of step 298 will be described below with reference to FIGS. 10 and 11.

Company Name Generation

Figure 3:
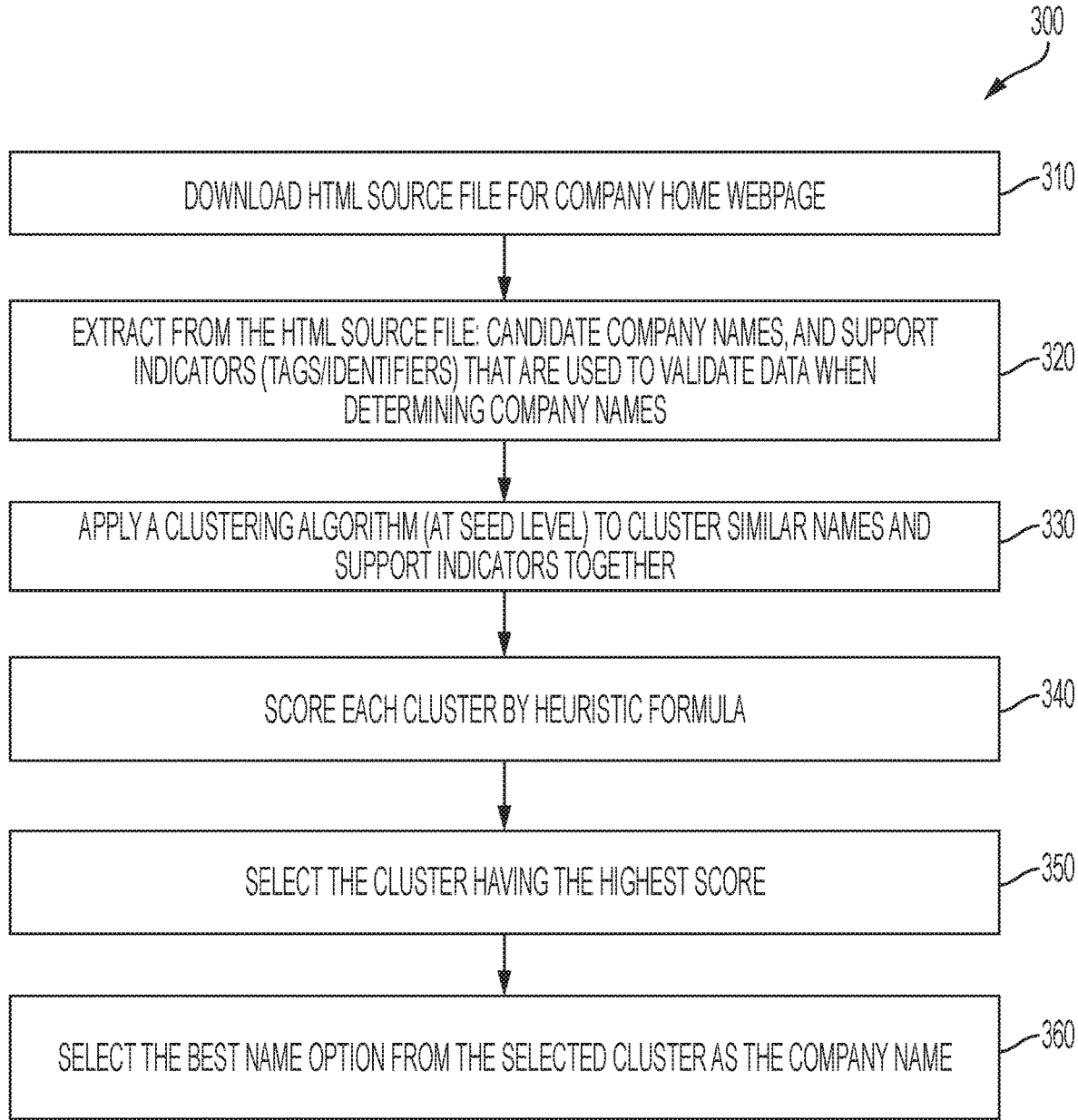
FIG. 3 is a flowchart of a method performed by the seed enricher module for automatically determining and selecting a company name in accordance with the disclosed embodiments.

FIG. 3 is a flowchart of a method 300 performed by the seed enricher module 130 for automatically determining and selecting a company name in accordance with the disclosed embodiments. In some cases, seeds have websites without the company name or wrong company name. The method 300 can be used to discover a company name from a website (e.g., find the correct company name based on HTML from the company's home webpage). The method 300 can determine the correct company name even when a given webpage might contain different company names. For example, a webpage might hold social links—so LinkedIn or Facebook names might be extracted as company names. A webpage might hold different examples of customers or partners that are extracted as potential company names. To address this, different candidate company names are extracted based on different heuristics (name shaping, for example, copyright, company name suffixes such as INC. or LLC.), then all those candidate company names can be clustered together into groups that each cluster represent a potential company name for the website. Thereafter, each cluster is scored/ranked, and the best one is picked if it passes some threshold. The best company in that selected cluster can then be chosen as the company name. The method 300 will be described as it is applied to a single company; however, it should be appreciated that multiple instances of the method 300 can be executed at the same time or in parallel for multiple different companies.

With reference to method 300, steps can be added, omitted, and/or performed simultaneously without departing from the scope of the appended claims. It should be appreciated that the method 300 may include any number of additional or alternative tasks, that the tasks shown in FIG. 3 need not be performed in the illustrated order, and that the method 300 may be incorporated into a more comprehensive procedure or process having additional functionality not described in detail herein. Moreover, one or more of the tasks shown in FIG. 3 could potentially be omitted from an embodiment of the method 300 as long as the intended overall functionality remains intact. It should also be understood that the illustrated method 300 can be stopped at any time. The method 300 is computer-implemented in that various tasks or steps that are performed in connection with the method 300 may be performed by software, hardware, firmware, or any combination thereof. For illustrative purposes, the following description of the method 300 may refer to elements mentioned above in connection with FIG. 1. In certain embodiments, some or all steps of this process, and/or substantially equivalent steps, are performed by execution of processor-readable instructions stored or included on a non-transitory processor-readable medium. For instance, in the description of FIG. 3 that follows, the seed enricher module 130 will be described as performing various acts, tasks or steps, but it should be appreciated that this refers to processing system(s) and/or storage system(s) executing instructions to perform those various acts, tasks or steps. Depending on the implementation, some of the processing system(s) can be centrally located, or distributed among a number of server systems that work together. Furthermore, in the description of FIG. 3, a particular example is described in which the seed enricher module 130 performs certain actions by interacting with other elements of the system 100.

The method 300 begins at 310 when the seed enricher module 130 downloads in HTML source file from the company's home webpage. At 320, the seed enricher module 130 then extracts from the html source file: (1) candidate company names, and (2) support indicators (e.g., tags/identifiers) that are used (as support) to validate data when determining company names. In one embodiment, the seed enricher module 130 extracts tags, identifiers, and other support indicators that indicate that data from the HTML source file is a valid piece of information (e.g., information that can be used to validate data from the HTML source file).

For example, in one embodiment, the seed enricher module 130 attempts to find and extract possible company names from different sections of the home webpage such as from copyright sections, from a <title> tag, from meta tags (html), and from other textual parts of the company's home webpage. Identifiers and other support indicators can include pieces of information fetched from the website that can be used as support for determining the company name. Examples of identifiers and other support indicators can include information extracted from one or more Uniform Resource Locators (URLs) (e.g., microsoft.com→microsoft, aa.com→aa), from one or more social handles ("http://www.facebook.com/walmart"→walmart), from different HTML attributes (<img="logo.html" alt="Vmware">→vmware), etc.

Each support indicator is an extracted name that has been determined to have similarities to the company name that was extracted from the home webpage of each company. A support indicator is a string/phrase that is very similar to the company name, but isn't a true candidate company name that is considered for selection since in some cases it is extracted from URL and therefore does not contain spaces or might be an abbreviation. The support indicators can be obtained from a number of different sources including company website URL or a social handle.

One important support indicator is the domain of the website. For example, a support indicator "microsoft" can be extracted from the URL "microsft.co.uk". As another example, a support indicator "aa" can be extracted from the URL "aa.com". Similarly, a support indicator "bofa" can be extracted from the URL "bofa.co.il". A support indicator "salesforce" can be extracted from the URL "www.salesforce.com". A support indicator "bankofamerica" can be extracted from the URL "www.bankofamerica.com". These types of support indicators can be important because companies generally try to use a domain name that is similar (as much as possible) to its company name. For example, in the salesforce example this is a good candidate, but in the American Airlines example it is an abbreviation, and in the Bank of America example the string does not contain spaces, but it has a great similarity. So, if a cluster contains a support indicator it generally means that a similarity was found between some candidate in the cluster and that the support indicator. This type of support indicator is a very good signal that this is the correct company name.

Other types of support indicators can include social handles or social keys. For example, e.g., "https://www.facebook.com/vmware"→vmware); html images attributes from a company logo (e.g., <i id="z1-globe-md" class="icon-att-globe" aria-label="AT&T" home" role="img"></i>→"AT&T"). A support indicator "bank-of-America" can be extracted from the URL "https://www.linkedin.com/company/bank-of-America/". A support indicator "CCC" can be extracted from the URL "XXX". A support indicator "americanairlines" can be extracted from the URL "https://www.facebook.com/AmericanAirlines/". A support indicator "vmware" can be extracted from the URL "https://www.facebook.com/vmware/". Other types of support indicators are also possible.

At 330, the seed enricher module 130 applies a clustering algorithm at the seed level to cluster similar names and support indicators together. For example, in one embodiment, the seed enricher module 130 can fetch many possible company names, and cluster them together into different clusters for further processing. During the clustering process, each candidate company name is compared to each support indicator using similarity functions. Each cluster can include two types of objects—regular candidate company name and support indicators. In the scoring phase clusters that do NOT contain indicators are "punished," while clusters that do are "rewarded."

At 340, the seed enricher module 130 scores each cluster using a heuristic formula based on one or more features derived from that cluster, and then selects the cluster having the highest score at 350. For example, in one embodiment, the seed enricher module 130 can determine or compute a score for each cluster based on factors such as one or more of: (1) cluster size (e.g., how many similar candidate names were extracted); (2) source location where extracted candidate names come from within an HTML structure of each HTML webpage (e.g., a candidate from copyright section, a candidate from the alt attribute from the company logo (html meta data)); and (3) a number of support indicators included in that the cluster. The cluster size; location where the extracted information comes from within the HTML structure of the HTML webpage (e.g., copyright tag in the HTML is a strong candidate); whether the cluster includes at least one support indicator indicating that it is a valid piece of information, are not the only factors considered. Other factors, such as the weight of the edges (e.g., similarities between name/support indicators in the cluster), etc. can also be used.

At 360, the seed enricher module 130 selects the highest-scoring or "best" name from the selected cluster (that was selected at 350) as the company name by applying selection rules that rank/prioritize different name options by order of importance. Factors used in scoring each of the company names within the selected cluster can include, but are not limited to, how many times the particular company name appears in the selected cluster, the length in number of characters of the particular company name, the location of the particular company name in the webpage, whether the particular company name has suffix such as INC., LLC, etc. For instance, when the selected cluster includes a full name (e.g., American Airlines) and an abbreviation (AA) of the full name as options, the seed enricher module 130 can select the full name since that is the higher ranked/prioritized name option of the two choices.

In one implementation, the clusters can be sorted by score, the highest scoring cluster can be selected, and a candidate company name (but not the support indicators) can be selected from the cluster.

Seed Enrichment Processing

In some cases, a company seed can have missing information or invalid information. For example, even once the company's website or home webpage is found, it may be missing information, or have invalid information that is outdated or incorrect. For instance, the Coca-Cola company seed might contain a valid phone number, but could be missing a valid address. To address this issue, the seed enricher module 130 can enrich each company seed by finding attributes and other enhancing information for enriching data that is part of a company seed.

Figure 4:
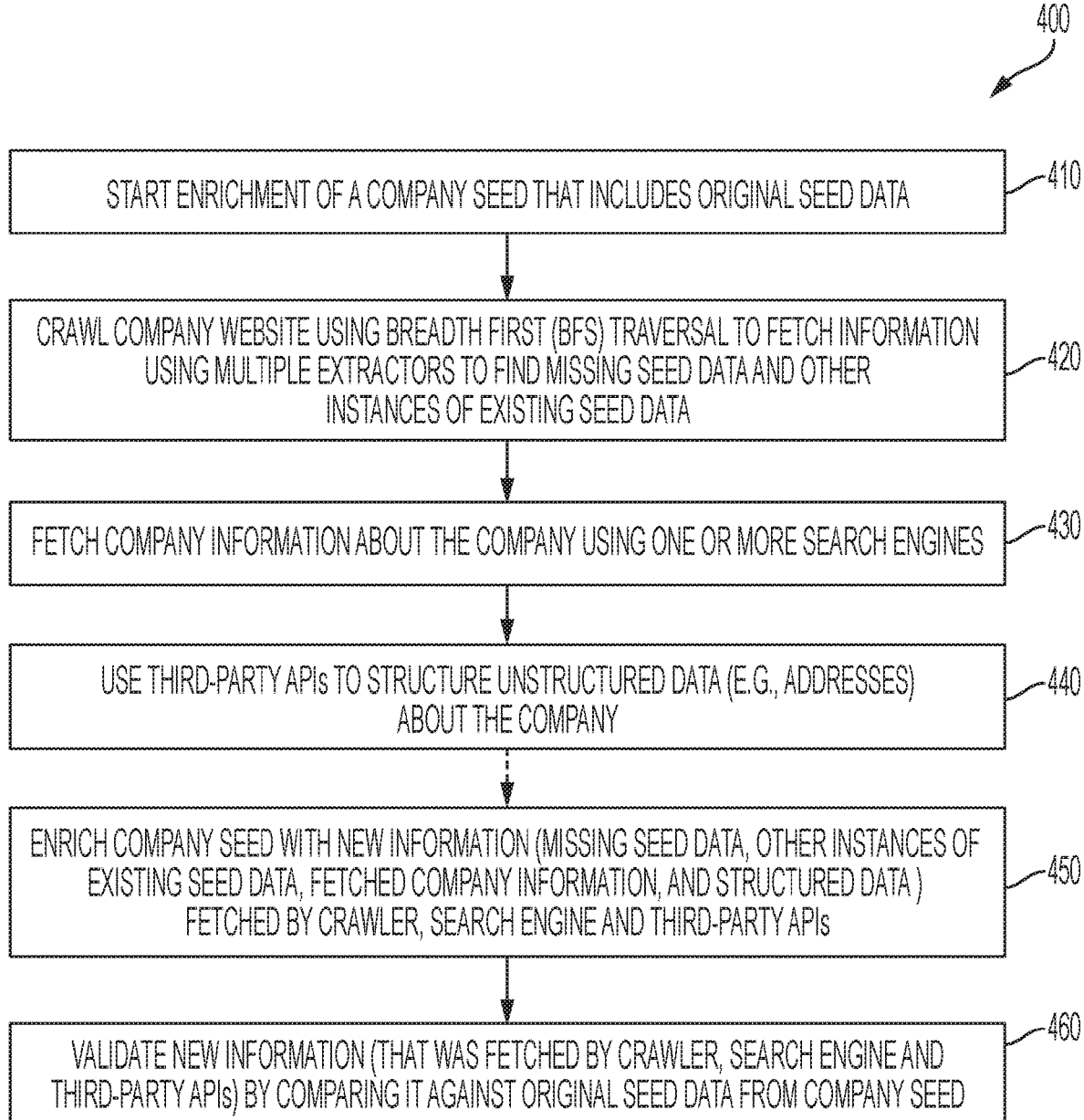
FIG. 4 is a flowchart of a method performed by the seed enricher module for automatically enriching a company seed in accordance with the disclosed embodiments.

FIG. 4 is a flowchart of a method 400 performed by the seed enricher module 130 for automatically enriching a company seed in accordance with the disclosed embodiments. The method 400 performs an enrichment process that fetches company information and validates existing information about a company seed. The enrichment process can be carried out in a pipeline form with multiple enrichment steps. Each enrichment step enriches the company seed using a different method. The method 400 will be described as it is applied to enrich a single company seed; however, it should be appreciated that multiple instances of the method 400 can be executed at the same time or in parallel to enrich multiple different company seeds.

With reference to method 400, steps can be added, omitted, and/or performed simultaneously without departing from the scope of the appended claims. It should be appreciated that the method 400 may include any number of additional or alternative tasks, that the tasks shown in FIG. 4 need not be performed in the illustrated order, and that the method 400 may be incorporated into a more comprehensive procedure or process having additional functionality not described in detail herein. Moreover, one or more of the tasks shown in FIG. 4 could potentially be omitted from an embodiment of the method 400 as long as the intended overall functionality remains intact. It should also be understood that the illustrated method 400 can be stopped at any time. The method 400 is computer-implemented in that various tasks or steps that are performed in connection with the method 400 may be performed by software, hardware, firmware, or any combination thereof. For illustrative purposes, the following description of the method 400 may refer to elements mentioned above in connection with FIG. 1. In certain embodiments, some or all steps of this process, and/or substantially equivalent steps, are performed by execution of processor-readable instructions stored or included on a non-transitory processor-readable medium. For instance, in the description of FIG. 4 that follows, the seed enricher module 130 and the repository 124 will be described as performing various acts, tasks or steps, but it should be appreciated that this refers to processing system(s) and/or storage system(s) of these entities executing instructions to perform those various acts, tasks or steps. Depending on the implementation, some of the processing system(s) can be centrally located, or distributed among a number of server systems that work together. Furthermore, in the description of FIG. 4, a particular example is described in which the seed enricher module 130 performs certain actions by interacting with other elements of the system 100.

The method 400 begins at 410 when the seed enricher module 130 starts an enrichment process for company seed. Prior to enrichment, the company seed includes original/existing seed data or "original attributes."

At 420, a web crawler 132 of the seed enricher module 130 crawls the company website using, for example, a breadth first (BFS) traversal method to fetch information. The web crawler does not just crawl the home webpage for each company . . . we need to change this as follows: The web crawler processes each website that is associated with each collected seed by: (1) crawling a home webpage for the company associated with that collected seed to verify, based on similarity between company name and website name, that a website associated with that home page belongs to that company. When verification is successful, the web crawler (2) processes other webpages on the website to fetch information using different extractor algorithms.

To find missing seed data and or other instances of existing seed data, each webpage is crawled using multiple different extractor algorithms. Each extractor algorithm is specifically designed to fetch certain piece of information, such as a company phone number or company address. Each extractor algorithm is designed to fetch a specific attribute for that company that corresponds to either missing seed data for that collected seed or other instances of the original seed data for that collected seed. So, for each company seed, for each of the websites it holds, the home webpage is crawled in order to verify that the website indeed belongs to the company (based on name to website similarity algorithm), and once the website has been verified (based on it being sufficiently similar to the home webpage), the web crawler crawls more webpages on that website (e.g., contact us page, leadership page, about us page, etc.) to extract additional information. For example, in one embodiment, the web crawler 132 can extract attributes including, but not limited to, the company name, company phone number, company address, a Facebook® link to the company's Facebook page, a Twitter® link to the company's Twitter page, a LinkedIn® link to the company's LinkedIn page, and information describing related domains (e.g., related domains can be websites that can be reached from a company website via links). Some of the extractor algorithms are contextual, meaning that they use data from the original seed in order to find it in the websites (e.g., trying to find given phone in the website). Other extractor algorithms are non-contextual—searching data based on different patterns (e.g., phone regex).

The method 400 then proceeds to 430, where one or more search engines 134 (e.g., Microsoft® Bing, Google® Chrome, Firefox®, etc.) fetches additional company information about the company.

The method 400 and proceeds to 440 where one or more geo-location services 136 or third-party APIs are used to structure unstructured data, such as company addresses, into structured data. Examples of third-party APIs can include search engine APIs (e.g., Bing), APIs of geo-location services (such as Here.com), embedding APIs (such as Embedly® API). Although not illustrated, the pipeline of the seed enricher module 130 could also include other enrichment steps that are not illustrated in FIG. 1 or FIG. 4. For example, other examples of enrichment steps can include but are not limited to: using a phone directory to locate company phone, using a search engine to locate company website, using Wikipedia to get information about the company.

The method 400 and proceeds to step 450, where the seed enricher module 130 enriches company seed with new information fetched by the crawler, other information fetched by the search engine, and new structured data information generated by the geolocation services/third-party APIs. The method 400 and proceeds to step 460, where the seed enricher module 130 verifies or validates the new information that was used to enrich that seed at step 450 by comparing/corroborating it against original attributes (or "existing seed data") from the company seed (that was part of the original company seed before enrichment). Similarly, if the information extracted from the website matches the original seed information, then both the original seed information and the new information extracted from the website are validated. Validation is performed after enrichment because even if the new information that was added to the enriched seed is invalid it is possible that it could later become valid when clustered together with different seeds because invalid data that came from different, independent data sources may later be considered valid in later steps. Any of the new information that is invalid can be given a lower score/confidence, and in later steps (e.g., clustering steps), a decision can be made, based on the confidence, whether to use this piece of data or not.

Clustering of Enriched Company Seeds and Conversion to Company Profiles

Once company seeds have been enriched there is a potentially large list of company seeds. Each company seed includes different pieces of information about companies (or company information). A method is needed to identify all the pieces of information that belong to the same company and group them together. To do so, a clustering method can be performed to identify all the pieces of information that belong to the same company and group them together into a single cluster. Each cluster can then be processed further to generate a company profile (or "company profile record") for each company.

Figure 5A:
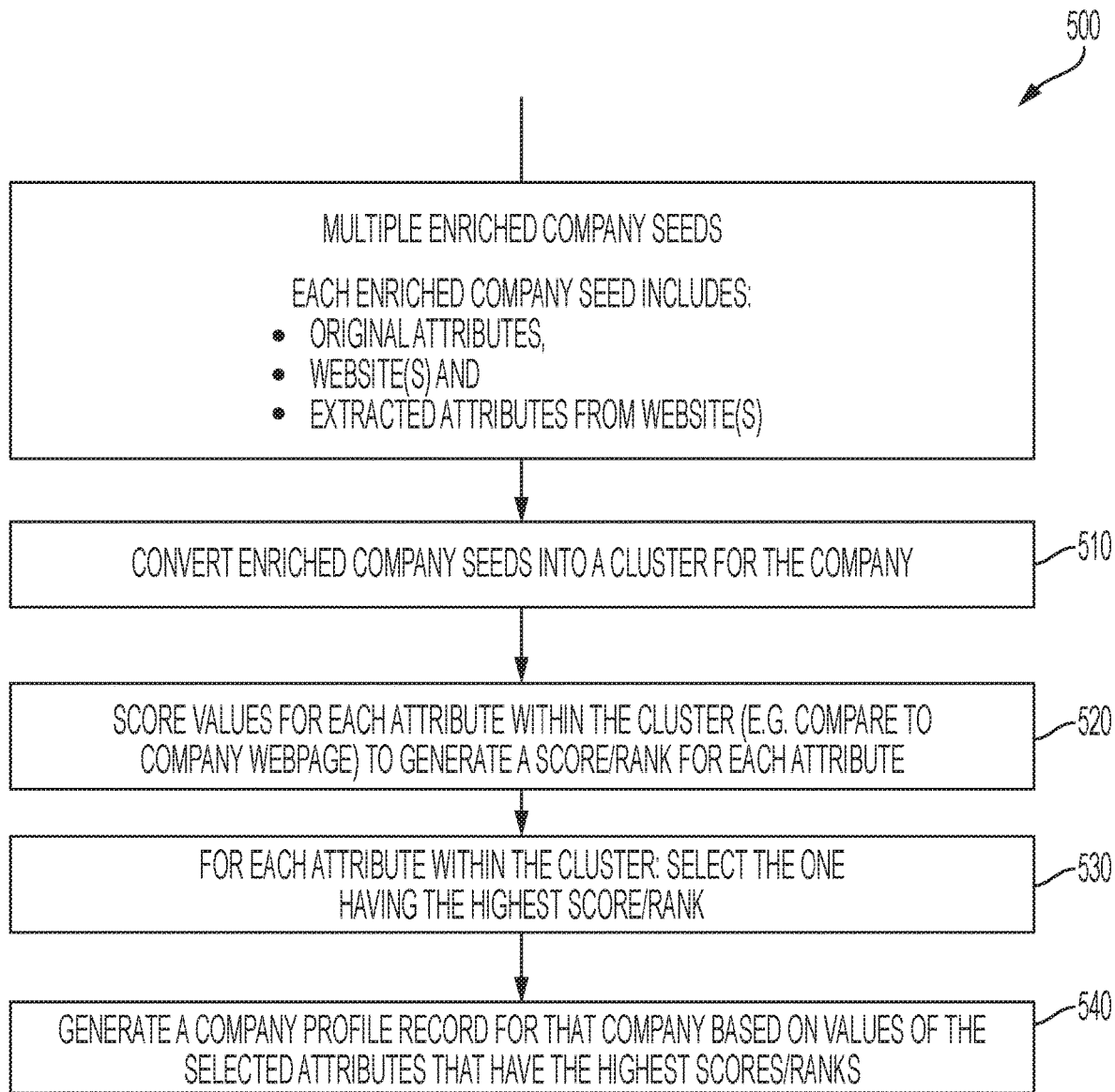
FIG. 5A is a flowchart of a method performed by the clusterer and company profile generator module for automatically clustering company seed data from the enriched company seeds into a cluster and processing the company seed data of the cluster to generate a company profile in accordance with the disclosed embodiments.

FIG. 5A is a flowchart of a method 500 performed by the clusterer and company profile generator module 160 for automatically clustering company seed data from the enriched company seeds into a cluster and processing the company seed data of the cluster to generate a company profile in accordance with the disclosed embodiments. The method 500 will be described as it is applied to cluster company seed data into a cluster for a single company and generate a single company profile; however, it should be appreciated that multiple instances of the method 500 can be executed at the same time or in parallel to do the same for multiple different companies.

With reference to method 500, steps can be added, omitted, and/or performed simultaneously without departing from the scope of the appended claims. It should be appreciated that the method 500 may include any number of additional or alternative tasks, that the tasks shown in FIG. 5A need not be performed in the illustrated order, and that the method 500 may be incorporated into a more comprehensive procedure or process having additional functionality not described in detail herein. Moreover, one or more of the tasks shown in FIG. 5A could potentially be omitted from an embodiment of the method 500 as long as the intended overall functionality remains intact. It should also be understood that the illustrated method 500 can be stopped at any time. The method 500 is computer-implemented in that various tasks or steps that are performed in connection with the method 500 may be performed by software, hardware, firmware, or any combination thereof. For illustrative purposes, the following description of the method 500 may refer to elements mentioned above in connection with FIG. 1. In certain embodiments, some or all steps of this process, and/or substantially equivalent steps, are performed by execution of processor-readable instructions stored or included on a non-transitory processor-readable medium. For instance, in the description of FIG. 5A that follows, the clusterer and company profile generator module 160 and the repository 124 will be described as performing various acts, tasks or steps, but it should be appreciated that this refers to processing system(s) and/or storage system(s) of these entities executing instructions to perform those various acts, tasks or steps. Depending on the implementation, some of the processing system(s) can be centrally located, or distributed among a number of server systems that work together. Furthermore, in the description of FIG. 5A, a particular example is described in which the clusterer and company profile generator module 160 performs certain actions by interacting with other elements of the system 100.

The method 500 begins when the clusterer and company profile generator module 160 receives multiple company seeds that have been enriched. Each enriched company seed can have its own original attributes and one or more websites, plus additional "extracted" attributes that have been extracted from each of the website(s) that are also part of that enriched company seed (i.e., each website can also have additional attributes that can be extracted).

At 510, the clusterer module 162 converts the enriched company sees into a cluster for the company by grouping selected ones of the enriched company seeds together (into a cluster). One non-limiting embodiment of step 510 will be described below with reference to FIG. 5B.

As used herein, the term "cluster" can refer to a group or collection of seeds that have been selected to be part of the cluster. The terms "cluster" and "cluster data set" can be used interchangeably herein. As used herein, a "company profile" can refer to a selected group of values from a particular cluster for different attributes used to describe a company.

For a given attribute, there may be many possible values that come from different sources, and therefore it is desirable to select the best possible values for each attribute for inclusion in the company profile. As will be explained below with reference to steps 520 through 540, the profile generator module 164 can execute a company profile generation algorithm that processes a collection of seeds (that were grouped together at 510 during the clustering phase and should represent a single company), and automatically determines/selects which attributes to choose for converting the cluster into a company profile by selecting the best values for a given attribute (or field) from multiple sources. In this way, the profile generator module 164 can effectively filter out any bad values. For each attribute, the company generation algorithm executed by the profile generator module 164 can generate a score/value, and then select the attributes having the highest score/value for inclusion in the company profile. Any values that were not validated can be discarded. In one embodiment, if the attribute comes from highly accurate seed source, the value for that attribute can be selected, but if there are no such attributes then the attribute that has been validated as being the strongest in comparison to a corresponding attribute from the company's home webpage can be selected.

The method 500 then proceeds to step 520, where the profile generator module 164 scores a value for each extracted attribute within the cluster to generate a score/rank for each value of each extracted attribute within the cluster. This can be done, for example, by comparing each extracted attribute to a corresponding information from the company's home webpage. In other words, the profile generator module 164 scores each value of each attribute within that cluster based on how similar each value is to corresponding information extracted from a home webpage for that company. One non-limiting example of an embodiment of step 520 will be described below with reference to FIG. 5C.

At 530, the profile generator module 164 selects the attributes having the highest score/ranks from the cluster for inclusion in a company profile for that cluster. In other words, for each attribute within that cluster, the profile generator module 164 can select the particular value for each attribute that has the highest score for inclusion in the company profile that corresponds to that cluster. The attributes that are selected can be either the original attributes or the extracted attributes depending on which one has the highest score/ranks.

At 540, the profile generator module 164 generates a company profile for that company based on the selected attributes (from 530) for each of the attributes within the cluster. The profile generator module 164 can group all of the selected values from that cluster together to convert that cluster into a company profile for a particular company, where the company profile comprises a set of values that had the highest score for each attribute.

Figure 5B:
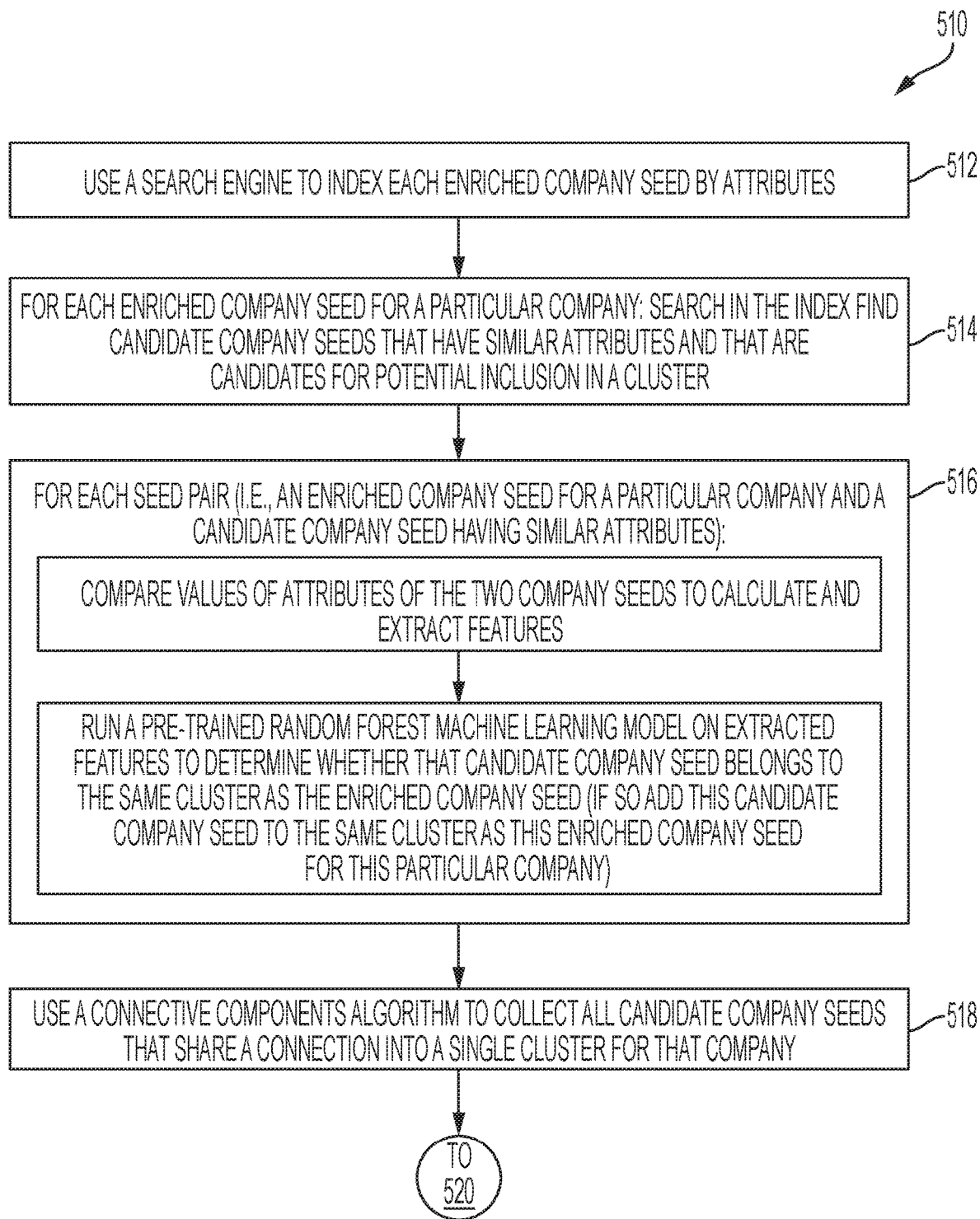
FIG. 5B is a flowchart of a method performed by the clusterer module for automatically clustering company seed data from the enriched company seeds into a cluster in accordance with the disclosed embodiments.

FIG. 5B is a flowchart of a method 510 performed by the clusterer module 162 for automatically clustering company seed data from the enriched company seeds into a cluster in accordance with the disclosed embodiments. The method 510 will be described as it is applied to cluster company seed data into a cluster for a single company; however, it should be appreciated that multiple instances of the method 510 can be executed at the same time or in parallel to do the same for multiple different companies. With reference to method 510, steps can be added, omitted, and/or performed simultaneously without departing from the scope of the appended claims. It should be appreciated that the method 510 may include any number of additional or alternative tasks, that the tasks shown in FIG. 5B need not be performed in the illustrated order, and that the method 510 may be incorporated into a more comprehensive procedure or process having additional functionality not described in detail herein. Moreover, one or more of the tasks shown in FIG. 5B could potentially be omitted from an embodiment of the method 510 as long as the intended overall functionality remains intact. It should also be understood that the illustrated method 510 can be stopped at any time. The method 510 is computer-implemented in that various tasks or steps that are performed in connection with the method 510 may be performed by software, hardware, firmware, or any combination thereof. For illustrative purposes, the following description of the method 510 may refer to elements mentioned above in connection with FIG. 1. In certain embodiments, some or all steps of this process, and/or substantially equivalent steps, are performed by execution of processor-readable instructions stored or included on a non-transitory processor-readable medium. For instance, in the description of FIG. 5B that follows, the clusterer module 162 will be described as performing various acts, tasks or steps, but it should be appreciated that this refers to processing system(s) and/or storage system(s) of this entity executing instructions to perform those various acts, tasks or steps. Depending on the implementation, some of the processing system(s) can be centrally located, or distributed among a number of server systems that work together. Furthermore, in the description of FIG. 5B, a particular example is described in which clusterer module 162 performs certain actions by interacting with other elements of the system 100.

At 512, a search engine (not illustrated in FIG. 1) of the clusterer and company profile generator module 160 can index each of the enriched company seeds by its attributes (e.g., company name, website address, ticker, physical address, phone number, etc.) such that each enriched company seed has an index entry for each attribute to allow each of the enriched company seeds to be searchable by attributes. Each index entry represents a particular enriched company seed. This way searches can be performed for all seeds that have similar values for a certain attribute. Each entry in the index represents a company seed. For example, if you consider three seeds with the following values: id: 1|name: abc inc; id: 2|name: abc; and id: 3|name: ddd, then a search for name: "abc", will return seeds with id (1,2).

At 514, the clusterer module 162 further processes each enriched company seed. For each enriched company seed, the clusterer module 162 searches in the index for other enriched company seeds that have similar attributes (e.g., company name, website address, ticker, physical address, phone number, etc.) to find similar enriched company seeds that are candidates for potential inclusion in a cluster for a particular company. Some company seeds will not be candidates for inclusion because they do not include enough similar attributes to indicate that they might be associated with the same company and included in the cluster for that company.

The method 500 then proceeds to 516. At 516, for each seed pair of an enriched company seed (for a particular company) and a candidate company seed having similar attributes to that enriched company seed (and that may potentially be part of the same cluster), the clusterer module 162 can then compare values of the corresponding attributes of the two company seeds to calculate and extract features (e.g. domain equality, name similarity, ticker equality etc.) from each comparison (e.g., for each candidate company seed that was found at 514, the clusterer module 162 compares the attributes of the candidate company seed to corresponding attributes of the original seed from the company's home website to compute and extract features).

For example, a feature can be calculated by comparing two corresponding attribute values form the two seeds. For instance, the attribute is company name, and if there are two seeds with names abc and abc inc, then they can have the following features could result: name_idf_similarity: 0.8 and name_char_similarity: 0.5. This same calculation/comparison could be done for any number of different attributes.

The clusterer module 162 can then run a more accurate matching algorithm, such as a pre-trained random forest machine learning model, on extracted features to determine whether that candidate company seed belongs to the same cluster as the enriched company seed (e.g., whether the two seeds belong to the same company). When the pre-trained random forest machine learning model determines, based on the extracted features, that the candidate company seed belongs to the same cluster as the enriched company seed, the clusterer module 162 adds that candidate company seed to the same cluster as the enriched company seed In one embodiment, for each candidate company seed that was found at 514, the clusterer module 162 compares the attributes of the candidate company seed to corresponding attributes of the original seed from the company's home website, computes features (e.g. domain equality, name similarity, ticker equality etc.) from each comparison, and applies features to a pre-trained random forest machine learning model that determines whether the seeds belong to the same company.

After the clusterer module 162 has evaluated all seed pairs at 516, the method proceeds to 518. At 518, the clusterer module 162 executes a connective components algorithm to: collect any other candidate company seeds that share a connection to one or more of the other candidate company seeds that were added to the cluster of the enriched company seed for that particular company. This way all of the candidate company seeds that share a connection to one or more of the other candidate company seeds can be grouped into a single cluster for that particular company.

Figure 5C:
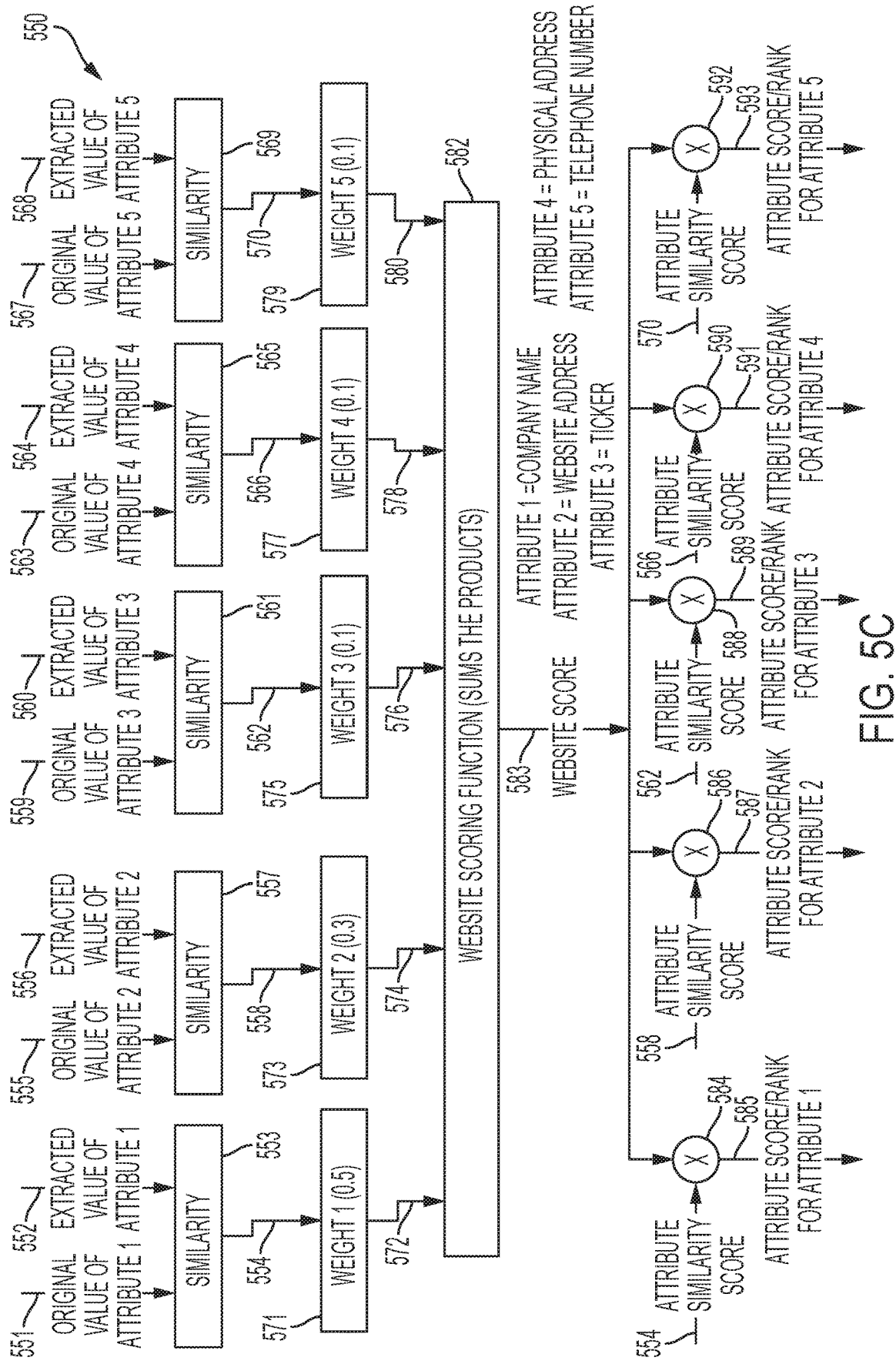
FIG. 5C is a block diagram of a system for generating score/ranks for various attributes that are part of a cluster in accordance with the disclosed embodiments.

FIG. 5C is a block diagram of a system 550 for generating scores/ranks for various attributes that are part of a cluster in accordance with the disclosed embodiments. In this example, the system 550 is illustrated as processing attributes from a particular enriched company seed that is part of a particular cluster. However, it should be appreciated that the same scoring process is applied to each company seed that is part of a particular cluster to generate scores/ranks for all of that cluster's attributes. This allows all of the attributes that are part of a particular cluster to be compared to determine which attributes have the highest score/ranks so that they can be selected for inclusion in the company profile. Furthermore, it should be noted that in this non-limiting example, that it is assumed that the cluster has five extracted attributes that are processed to generate a corresponding score/rank for each one. However, it should be appreciated that the cluster or an enriched company seed that is part of that cluster could have any number of extracted attributes that are to be scored by the system 550. In addition, it should also be noted that a particular enriched company seed could have a number of attributes that is different than a number of attributes of another particular enriched company seed that is part of the particular cluster. Further, it should also be noted that a particular enriched company seed could have a number of attributes that is less than a number of attributes of the particular cluster. For example, if a particular cluster has a first seed with attributes A, B, C, and a second seed with attributes B, C, D, and a third seed with attributes D, E, F, then that particular cluster can have six attributes. The corresponding company profile can then also have six values for the six attributes that are selected from among the three different seeds.

In brief, the similarity of each extracted attribute is compared to a corresponding attribute of the original company seed to determine similarity, and then scaled based on a weight for that particular attribute. The weighted similarity for each attribute can then be summed by a website scoring function to generate a website score. The website score can then be multiplied by the attribute's similarity score for that attribute to generate an attribute score/rank for that attribute.

For example, the similarity module 553 can compare a value of the company name attribute 552 that was extracted from the enriched company seed to a value of the company name attribute 551 of the original company seed to determine a first attribute similarity score 554. The first attribute similarity score 554 can then be scaled based on a first weight (e.g., 0.5) for that particular company name attribute to generate a first weighted similarity product 572. Similarly, the similarity module 557 can compare a value of the website address attribute 556 that was extracted from the enriched company seed to a value of the website address attribute 555 of the original company seed to determine a second attribute similarity score 558. The second attribute similarity score 558 can then be scaled based on a second weight (e.g., 0.3) for that particular website address attribute to generate a second weighted similarity product 574. Likewise, the similarity module 561 can compare a value of the ticker attribute 560 that was extracted from the enriched company seed to a value of the ticker attribute 559 of the original company seed to determine a third attribute similarity score 562. The third attribute similarity score 562 can then be scaled based on a third weight (e.g., 0.1) for that particular ticker attribute to generate a third weighted similarity product 576. The similarity module 565 can compare a value of the physical address attribute 564 that was extracted from the enriched company seed to a value of the physical address attribute 563 of the original company seed to determine a fourth attribute similarity score 566. The fourth attribute similarity score 566 can then be scaled based on a fourth weight (e.g., 0.1) for that particular physical address attribute to generate a fourth weighted similarity product 578. The similarity module 569 can compare a value of the telephone number attribute 568 that was extracted from the enriched company seed to a value of the telephone number attribute 567 of the original company seed to determine a fifth attribute similarity score 570. The fifth attribute similarity score 570 can then be scaled based on a fifth weight (e.g., 0.1) for that particular telephone number attribute to generate a fifth weighted similarity product 580.

The weighted similarity products 572, 574, 576, 578, 580 for each attribute can then be summed by a website scoring function 582 to generate a website score 583. In other words, all of the extracted attributes that are extracted from a company seed for a particular website are scored, weighted and then grouped together to generate score 583 to that website. In this example, the score 583 of the website is calculated by the weighted similarity of the name, website, ticker, address and phone number to the corresponding attributes of the original seeds. This is done for each seed/website in a cluster of seeds.

Then, for each attribute of the particular seed, the website score 583 can then be multiplied by an attribute similarity score for that attribute to generate an attribute score/rank for that attribute.

For example, for the company name attribute, the website score 583 can then be multiplied at 584 by the first attribute similarity score 554 for that company name attribute to generate an attribute score/rank 585 for the company name attribute that was extracted from the enriched company seed. If the attribute score/rank 585 for the company name attribute (that was extracted from the enriched company seed) is the highest scoring company name attribute among all of the company name attributes within the cluster then that company name attribute (that was extracted from the enriched company seed) will be selected as the company name attribute for the company profile.

Likewise, for the website address attribute, the website score 583 can then be multiplied at 586 by the second attribute similarity score 558 for that website address attribute to generate an attribute score/rank 587 for the website address attribute that was extracted from the enriched company seed. If the attribute score/rank 587 for the website address attribute (that was extracted from the enriched company seed) is the highest scoring website address attribute among all of the website address attributes within the cluster then that website address attribute (that was extracted from the enriched company seed) will be selected as the website address attribute for the company profile.

For the ticker attribute, the website score 583 can then be multiplied at 588 by the third attribute similarity score 562 for that ticker attribute to generate an attribute score/rank 589 for the ticker attribute that was extracted from the enriched company seed. If the attribute score/rank 589 for the ticker attribute (that was extracted from the enriched company seed) is the highest scoring ticker attribute among all of the ticker attributes within the cluster then that ticker attribute (that was extracted from the enriched company seed) will be selected as the ticker attribute for the company profile.

In addition, for the physical address attribute, the website score 583 can then be multiplied at 590 by the fourth attribute similarity score 566 for that physical address attribute to generate an attribute score/rank 591 for the physical address attribute that was extracted from the enriched company seed. If the attribute score/rank 591 for the physical address attribute (that was extracted from the enriched company seed) is the highest scoring physical address attribute among all of the physical address attributes within the cluster then that physical address attribute (that was extracted from the enriched company seed) will be selected as the physical address attribute for the company profile.

Finally, for the telephone number attribute, the website score 583 can then be multiplied at 592 by the fifth attribute similarity score 570 for that telephone number attribute to generate an attribute score/rank 593 for the telephone number attribute that was extracted from the enriched company seed. If the attribute score/rank 593 for the telephone number attribute (that was extracted from the enriched company seed) is the highest scoring telephone number attribute among all of the telephone number attributes within the cluster then that telephone number attribute (that was extracted from the enriched company seed) will be selected as the telephone number attribute for the company profile.

Company Enrichment Processing

As will now be described below with reference to FIGS. 6A-9, once all the company profiles have been formed or generated for each of the various companies, the company enricher module 140 can perform a variety of different company enrichment processes to further enrich the company profile for each company by adding additional information to that company profile.

Figure 6A:
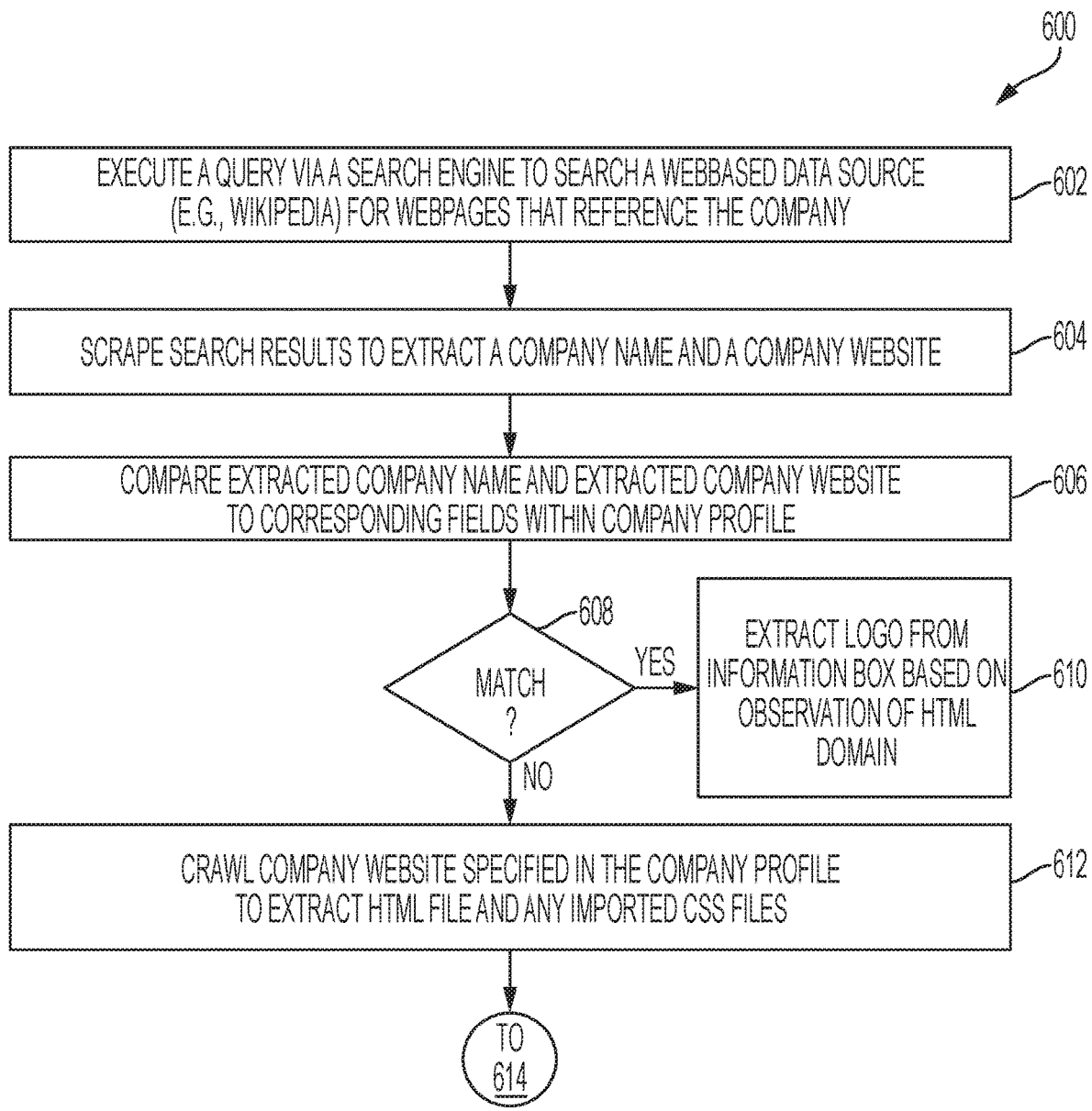
FIGS. 6A and 6B are collectively a flowchart of a method performed by the company logo module of the company enricher module for extracting a plurality of images and then selecting one of the images from the plurality of images as a company logo in accordance with the disclosed embodiments.
Figure 6B:
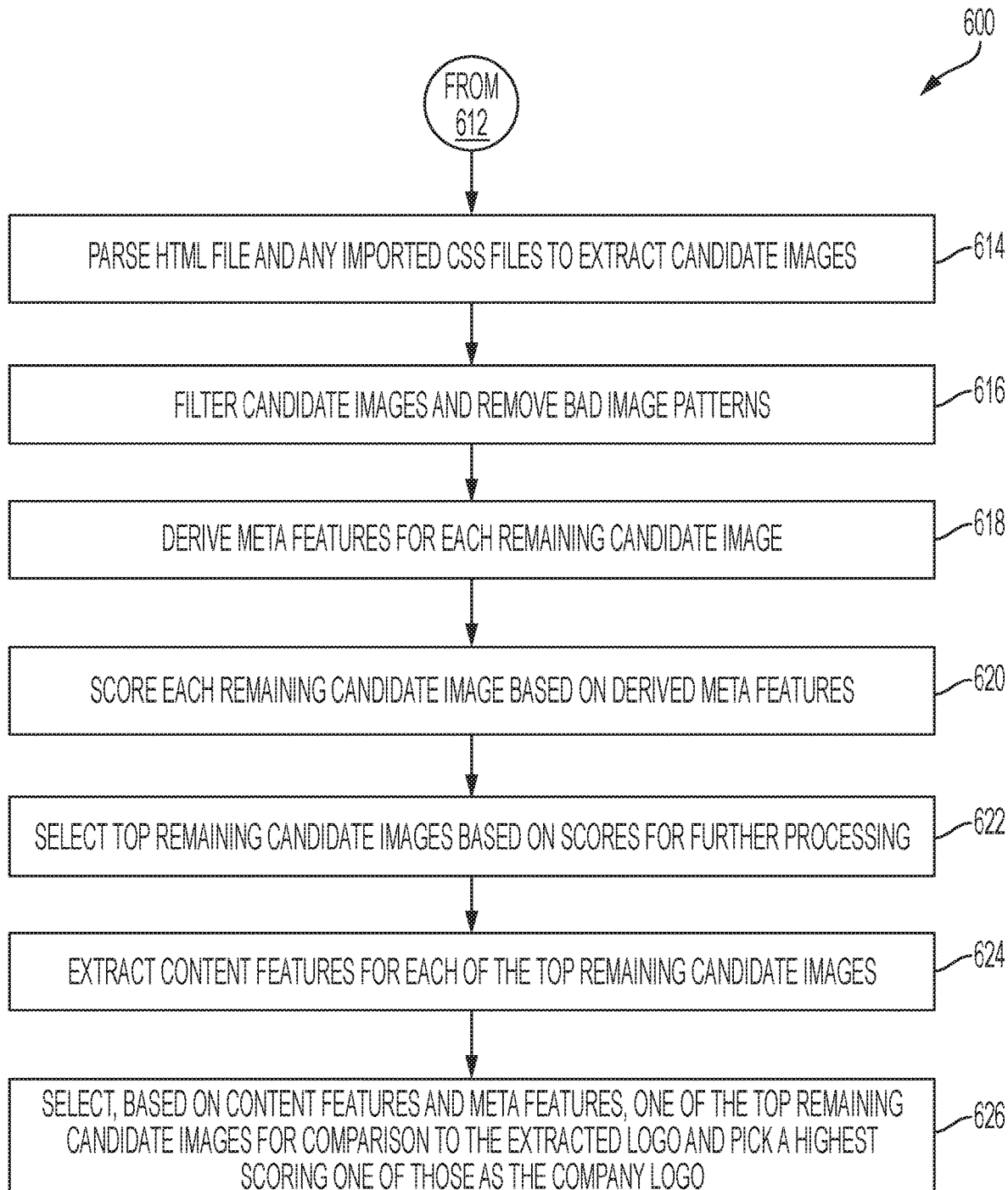

FIGS. 6A and 6B are collectively a flowchart of a method 600 performed by the company logo module 144 of the company enricher module 140 for extracting a plurality of images and then selecting one of the images from the plurality of images as a company logo in accordance with the disclosed embodiments. The company logo that is selected can then be added to the company profile for that company to supplement other information such as the company name, company website, address, phone number, etc. The method 600 will be described as it is applied to a single company; however, it should be appreciated that multiple instances of the method 600 can be executed at the same time or in parallel for multiple different companies.

With reference to method 600, steps can be added, omitted, and/or performed simultaneously without departing from the scope of the appended claims. It should be appreciated that the method 600 may include any number of additional or alternative tasks, that the tasks shown in FIGS. 6A and 6B need not be performed in the illustrated order, and that the method 600 may be incorporated into a more comprehensive procedure or process having additional functionality not described in detail herein. Moreover, one or more of the tasks shown in FIGS. 6A and 6B could potentially be omitted from an embodiment of the method 600 as long as the intended overall functionality remains intact. It should also be understood that the illustrated method 600 can be stopped at any time. The method 600 is computer-implemented in that various tasks or steps that are performed in connection with the method 600 may be performed by software, hardware, firmware, or any combination thereof. For illustrative purposes, the following description of the method 600 may refer to elements mentioned above in connection with FIG. 1. In certain embodiments, some or all steps of this process, and/or substantially equivalent steps, are performed by execution of processor-readable instructions stored or included on a non-transitory processor-readable medium. For instance, in the description of FIGS. 6A and 6B that follows, the company logo module 144 will be described as performing various acts, tasks or steps, but it should be appreciated that this refers to processing system(s) and/or storage system(s) of this entity executing instructions to perform those various acts, tasks or steps. Depending on the implementation, some of the processing system(s) can be centrally located, or distributed among a number of server systems that work together. Furthermore, in the description of FIGS. 6A and 6B, a particular example is described in which the company logo module 144 performs certain actions by interacting with other elements of the system 100.

The method 600 begins at 602, when the company logo module 144 executes a query via a search engine to search a web-based data source, such as Wikipedia, for webpages that reference a company. For example, in one non-limiting implementation, the company's wiki pages can be searched via search engine 134 (e.g., Bing) by a query that has been developed.

At 604, the company logo module 144 scrapes search results to extract a company name and a company website from one or more of the webpages that reference a company. At 606 the company logo module 144 compares the extracted company name in the extracted company website to corresponding fields within the company profile for this particular company. For example, in one non-limiting implementation, as a search engine returns many options, the results are scraped one by one. A name & website are extracted from the wiki page and compared to the company profile that was input.

At 608 the company logo module 144 determines whether the extracted company name and extracted company website match with the corresponding attributes/fields from the company profile.

When there is a match at 608, at 610 the company logo module 144 extracts a logo from the web-based data source. For example, in one implementation, the company logo module 144 can extract a logo from an information box within a Wikipedia webpage based on observation of HTML domain information.

If there is not match (at 608), then the company logo module 144, attempts to extract candidate images for the company logo from the company's website. In other words, when company logo module 144 determines (at 608) that the extracted company name and extracted company website did not match the corresponding fields within the company profile, the method 600 proceeds to 612 where the company logo module 144 crawls the company website specified in the company profile to extract an HTML file and any imported CSS files from the company website. For example, in one implementation, based on the website given in the input company profile, a two-level crawling process can be performed—home page html and imported CSS files.

The method 600 and proceeds to 614 where the company logo module 144 parses the HTML file and imported CSS files to extract candidate images from the company website. For example, in one implementation, parsers for each file type (html/CSS) can then be used to extract candidate logo images.

At 616, the company logo module 144 filters candidate images and removes bad image patterns. For example, in one implementation, filtering is performed to find bad image patterns that have been learned (such as placeholders/home buttons, etc.).

At 618, the company logo module 144 derives meta-features for each remaining candidate image, such as, image name, image XPATH expression, html tags and attributes, whether it includes an HREF attribute that directs to the home page, size (dimensions), location and many other signals. XPath is a query language defined by the World Wide Web Consortium for selecting nodes from an XML document. The XPath language is based on a tree representation of the XML document, and provides the ability to navigate around the tree, selecting nodes by a variety of criteria. In popular use (though not in the official specification), an XPath expression is often referred to simply as "an XPath". In addition, XPath may be used to compute values (e.g., strings, numbers, or Boolean values) from the content of an XML document. The HREF is an attribute of the anchor tag, which is also used to identify sections within a document. The HREF contains two components: the URL, which is the actual link, and the clickable text that appears on the page, called the "anchor text."

At 620, the company logo module 144 scores each remaining candidate image based on the derived meta-features. For example, in one embodiment, the company logo module 144 can compute a score for each candidate logo by calculating numerical values for each of the derived meta-features (for each candidate logo), then multiplying each numerical value by a constant factor (or weight) to generate a product, and then generating a final score for that candidate logo by summing each of products. In one non-limiting implementation, the derived meta-features that are calculated and the corresponding constant factors (in parenthesis) for each can be as follows:

company name in an alt tag (constant factor=8.0)—alt is an HTML tag used to describe the contents of an image. With this feature the similarity between the company name and the description in the alt tag can be calculated.

company name in name tag (constant factor=8.0)—similar to the alt tag just with the name tag.

whether the word 'logo' is contained in the alt tag (constant factor=5.0).

logo name in URL (constant factor=5.0)—determines if the name of the page that contains the image contains the word 'logo'.

company name in title tag (constant factor=6.0)—same as alt tag just with title tag.

company name in URL (constant factor=15.0)—determines if the name of the page that contains the image contains the company name.

relative position in HTML (constant factor=2.0)—measures the distance of the image tag in HTML tree from the root.

relative position in CSS (constant factor=1.0)—measures the distance of the image tag in CSS tree from the root.

'logo' in HTML image XPath (constant factor=2.0)—determines whether 'logo' is in the HTML XPath of the image.

HTML)(Path length (constant factor=1.0)

homepage (constant factor=5.0)—determines whether the image was found in the company homepage.

external page (constant factor=-1000.0)—determines whether the image was found in external page of the company website dangerous words in URL (constant factor=-1000.0)—determines whether image URL contains dangerous words.

forbidden XPath filter (constant factor=-1000.0)—determines whether image XPath has forbidden tags.

This is one non-limiting example of derived meta-features and corresponding weights that can be used to compute a score for each logo.

The method 600 and proceeds to 622 where the company logo module 144 selects the top remaining candidate images having the highest scores for further processing and comparison to the logo that were extracted at step 610. For example, in one non-limiting implementation, a number of top remaining candidate images (e.g., the top 20) can be selected to move forward with in order to download the resource itself and extract content features.

Method 600 and proceeds to 624, where the company logo module 144 extracts content features for the top remaining candidate images that were selected at 622. For example, in one non-limiting implementation, the company logo module 144 can extract content features and determine: (1) whether each top remaining candidate image is a digital image (e.g., a support vector machine (SVM) learning algorithm separates digital from natural images), (2) actual content dimensions, (3) brightness (e.g., some logos are transparent so those are filtered out), etc. In machine learning, support vector machines (SVMs) are supervised learning models with associated learning algorithms that analyze data used for classification and regression analysis.

Based on the content features and the meta-features, at 626, the company logo module 144 can select either one of the top remaining candidate images (from 622) or the logo that was extracted at 610 as the company logo. For example, in one embodiment, the company logo module 144 can select whichever one of the top remaining candidate images or logo has the highest score and meets size criteria. In one embodiment, the logo that was extracted at 610 has a fixed score, and the each one of the top remaining candidate images (from 622) from the websites have a score that varies based on the meta features. The one of these having highest score can then be selected.

Figure 7:
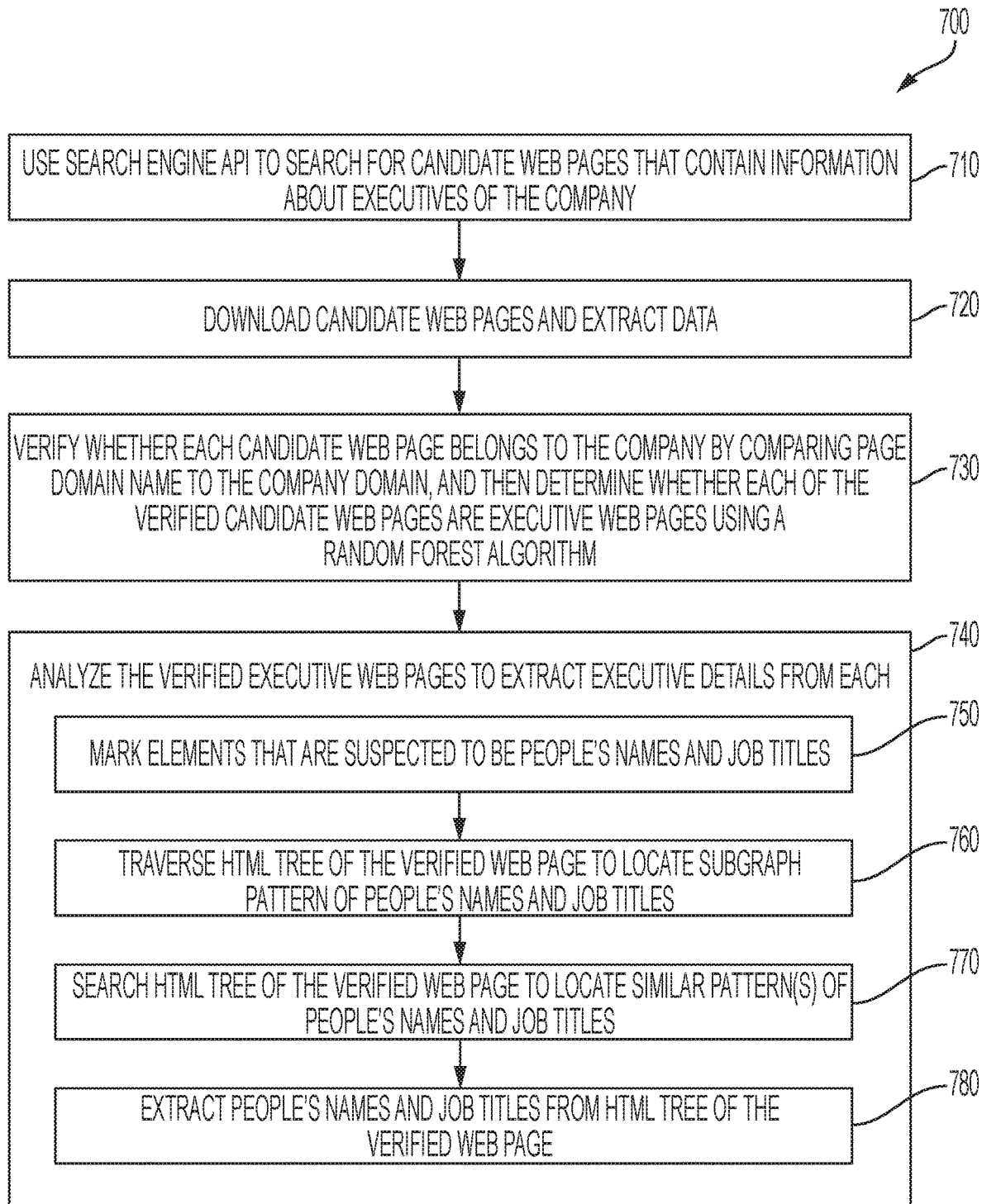
FIG. 7 is a flowchart of a method performed by the company executive determination module for automatically generating executive profile information for a company from multiple sources in accordance with the disclosed embodiments.

FIG. 7 is a flowchart of a method 700 performed by the company executive determination module 146 for automatically generating executive profile information for a company from multiple sources in accordance with the disclosed embodiments. The executive profile information that is generated can then be added to the company profile for that company to supplement other information such as the company name, company website, address, phone number, logo, etc. The method 700 will be described as it is applied to a single company; however, it should be appreciated that multiple instances of the method 700 can be executed at the same time or in parallel for multiple different companies to automatically generate executive profile information for each of those companies.

With reference to method 700, steps can be added, omitted, and/or performed simultaneously without departing from the scope of the appended claims. It should be appreciated that the method 700 may include any number of additional or alternative tasks, that the tasks shown in FIG. 7 need not be performed in the illustrated order, and that the method 700 may be incorporated into a more comprehensive procedure or process having additional functionality not described in detail herein. Moreover, one or more of the tasks shown in FIG. 7 could potentially be omitted from an embodiment of the method 700 as long as the intended overall functionality remains intact. It should also be understood that the illustrated method 700 can be stopped at any time. The method 700 is computer-implemented in that various tasks or steps that are performed in connection with the method 700 may be performed by software, hardware, firmware, or any combination thereof. For illustrative purposes, the following description of the method 700 may refer to elements mentioned above in connection with FIG. 1. In certain embodiments, some or all steps of this process, and/or substantially equivalent steps, are performed by execution of processor-readable instructions stored or included on a non-transitory processor-readable medium. For instance, in the description of FIG. 7 that follows, the company executive determination module 146 will be described as performing various acts, tasks or steps, but it should be appreciated that this refers to processing system(s) and/or memory of this entity executing instructions to perform those various acts, tasks or steps. Depending on the implementation, some of the processing system(s) can be centrally located, or distributed among a number of server systems that work together.

The method 700 begins at 710 where the company executive determination module 146 uses a search engine API to search for candidate webpages that contain information about executives of the company. For example, in one non-limiting embodiment, Bing® search engine API can be used to locate candidate executive pages (e.g., use the company name+a number of key words as the search string). The method then proceeds to 720 where the company executive determination module 146 downloads candidate webpages and extracts data/features from those candidate webpages.

At 730, the company executive determination module 146 executes a random forest machine learning model to verify whether each of the candidate webpages belongs to the particular company by comparing webpage's domain name to the company domain; and then determine whether each of the verified candidate webpages are executive webpages by executing a random forest machine learning model to identify if each candidate webpage is an executive page that belongs to the particular company. In one embodiment, this is a two-phase process. In the first phase, the webpage domain name is compared to the company domain to determine if they match. A match means that the verified candidate webpage belongs to the particular company. Then, a machine learning algorithm, which is a Random Forest ML model in one non-limiting embodiment, is applied in order to determine if this verified candidate webpage is indeed an executive page. In one implementation, the random forest machine learning model considers features such as a bag of words in the verified candidate webpage, the number of times the person's name appears in the verified candidate webpage, the number of job titles in the verified candidate webpage, the type of job titles (e.g., mostly C-level) in the verified candidate webpage, the number of photos in the verified candidate webpage, and other signals. The bag-of-words model is a simplifying representation used in natural language processing and information retrieval (IR). In this model, a text (such as a sentence or a document) is represented as the bag (multiset) of its words, disregarding grammar and even word order but keeping multiplicity.

For example, in one non-limiting embodiment, a random forest machine learning model is used to identify if each candidate webpage is indeed an executive page that belongs to the company. Random forests or random decision forests are an ensemble learning method for classification, regression and other tasks, that operate by constructing a multitude of decision trees at training time and outputting the class that is the mode of the classes (classification) or mean prediction (regression) of the individual trees. The random forest machine learning model include words from each of the candidate webpages such as: title, body and URL. The words and their n-grams are encoded using a Word2Vec (w2v) neural network to construct vector representations of words and used as the model features.

Word2Vec is a group of models used for constructing vector representations of words, also known as word embeddings. Word2Vec (w2v) uses a shallow neural network to learn how words are used in a particular text corpus. These models are shallow, two-layer neural networks that are trained to reconstruct linguistic contexts of words. Word2vec takes as its input a large corpus of text and produces a vector space, typically of several hundred dimensions, with each unique word in the corpus being assigned a corresponding vector in the space. Word vectors are positioned in the vector space such that words that share common contexts in the corpus are located in close proximity to one another in the space. The output of w2v is a matrix of vectors, with each vector (column) representing a word in the corpus and providing a numerical description of how that word is used in context. Given a large enough corpus, two words that are used similarly will have similar vector representations. For example, a corpus may employ the words 'student' and 'pupil' to mean the same thing, but never use them together in a sentence. If provided with enough information, w2v would be able to learn the context of these two concepts and make their vectors numerically similar (i.e. place them together in semantic space). Given that w2v provides the semantic description of words in a corpora as numeric vectors, once all words have been mapped into the vector space it becomes possible to use vector math to find words that have similar semantics or more complex relationships.

At 740, the company executive determination module 146 analyzes the verified candidate webpages to extract executive details from the verified candidate webpages. In other words, after 730, each of the verified candidate webpages can be analyzed (at 740) to extract executive details from each. Each of the verified candidate webpages is a webpage that has already been matched to the company and that a classifier has been applied to in order to determine that it is an executive page. The methodology used to analyze the verified candidate webpages can vary depending on the implementation. In one embodiment, two extraction strategies can be applied during the extraction phase. In accordance with one extraction strategy, a person name extractor (an algorithm that based on text extracts words/phrases that are suspected as a person name) is used to extract different candidate names from the HTML document, and then, for each name, performs a search (based on the DOM graph) around that name to find other attributes (e.g., job title) to create a candidate. In accordance with another extraction strategy, a person name and job title extractor (an algorithm that based on text extracts words/phrases that are suspected as a person name and job title) is used to extrapolate the HTML patterns in the page and to extract different candidate names/job titles from the HTML document, and then, for each name/job title combination, performs a search (based on the DOM graph) around the name/job title to find other attributes to create a candidate. In this regard, a candidate is a vector of data that includes different attributes such as name, job title, profile image, biograph, etc. A clustering algorithm can be applied in order to remove duplicate candidates.

In one embodiment, the company executive determination module 146 performs steps 750 through 780 to analyze each of the verified candidate webpages and extract executive details from those verified candidate webpages. The method described at steps 750 through 780 describes how a single verified candidate webpage is analyzed to extract executive details. However, it will be appreciated that step 750 through 780 can be performed with respect to each verified candidate webpage to analyze it and extract executive details from that verified candidate webpage.

At 750, the company executive determination module 146 marks elements in each of the verified candidate webpages that are suspected to be people's names and job titles. At 760, the company executive determination module 146 traverses the HTML tree of each verified candidate webpage to locate subgraph pattern(s) that correspond to people's names and job titles.

At 770, the company executive determination module 146 searches the HTML tree of each verified candidate webpage to locate similar patterns that correspond to names of people and job titles. At 780, the company executive determination module 146 extracts people's names and job titles from the HTML tree (of each verified candidate webpage) and then adds the extracted names and job titles to the company profile for that particular company as executive information.

Figure 8:
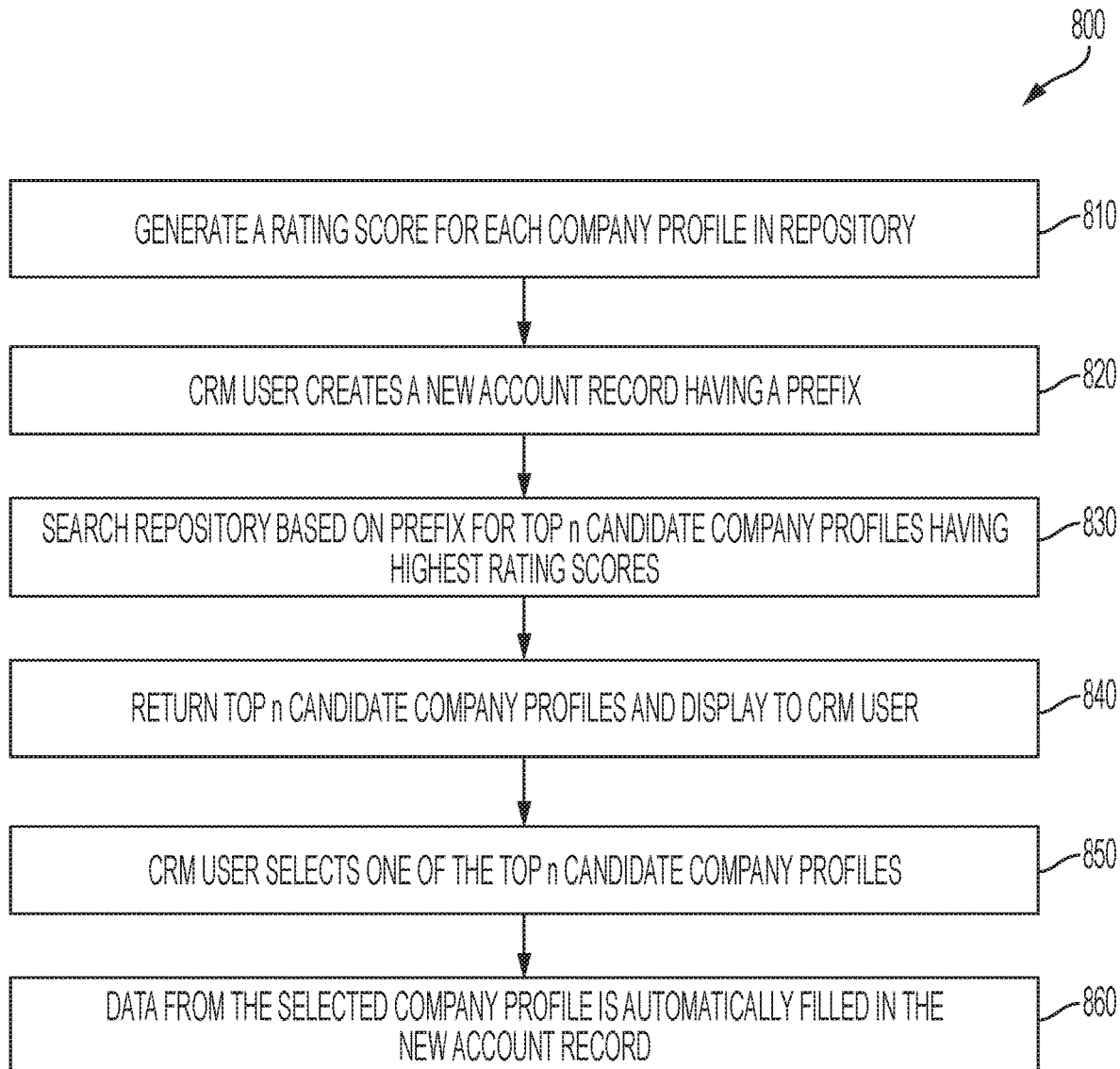
FIG. 8 is a flowchart of a method performed by the rating module for rating company profiles and then using a highest rated company to create a CRM record in a CRM system in accordance with the disclosed embodiments.

FIG. 8 is a flowchart of a method 800 performed by the rating module 142 for rating company profiles and then using a highest rated company to create a CRM record in a CRM system in accordance with the disclosed embodiments. The method 800 will be described as it is applied to a single company; however, it should be appreciated that multiple instances of the method 800 can be executed at the same time or in parallel for multiple different companies. With reference to method 800, steps can be added, omitted, and/or performed simultaneously without departing from the scope of the appended claims. It should be appreciated that the method 800 may include any number of additional or alternative tasks, that the tasks shown in FIG. 8 need not be performed in the illustrated order, and that the method 800 may be incorporated into a more comprehensive procedure or process having additional functionality not described in detail herein. Moreover, one or more of the tasks shown in FIG. 8 could potentially be omitted from an embodiment of the method 800 as long as the intended overall functionality remains intact. It should also be understood that the illustrated method 800 can be stopped at any time. The method 800 is computer-implemented in that various tasks or steps that are performed in connection with the method 800 may be performed by software, hardware, firmware, or any combination thereof. For illustrative purposes, the following description of the method 800 may refer to elements mentioned above in connection with FIG. 1. In certain embodiments, some or all steps of this process, and/or substantially equivalent steps, are performed by execution of processor-readable instructions stored or included on a non-transitory processor-readable medium. For instance, in the description of FIG. 8 that follows, the rating module 142 and a CRM system will be described as performing various acts, tasks or steps, but it should be appreciated that this refers to processing system(s) and/or memory of these entities executing instructions to perform those various acts, tasks or steps. Depending on the implementation, some of the processing system(s) can be centrally located, or distributed among a number of server systems that work together. Various acts, tasks or steps FIG. 8 will be described in further below with reference to FIGS. 9 and 12-14.

At step 810, the rating module 142 can generate a rating score for each company that has a company profile stored in the repository 124. The company profiles can eventually be used to autofill CRM records created by CRM users, and the rating scores for each company can be used to help the CRM users pick which company profiles to utilize to create the CRM records. The methodology for generating the rating score at rating module 142 can vary depending on the implementation, and one non-limiting embodiment will be described below with reference to FIG. 9.

After the rating scores for each company have been generated and added to their respective company profiles, the rating scores can then be used as part of a method described with reference to steps 820 through 860 of FIG. 8. In this regard, it should be appreciated that the step 810 is performed to generate a rating score for each company profile in the repository 124 can be performed as a separate method that takes place prior to steps 820 through 860, but for sake of simplicity step 810 is described in conjunction with steps 820 through 860 of FIG. 8. In one embodiment, a CRM application can automatically generate a query in response to the user input via a user interface of the CRM application that is used to create the new CRM record in the CRM system. The user input can be a prefix or other identifier that represents a company name. When a CRM user wants to create new account record, she/he opens a window and starts to enter details about the account. One of the fields is company name. When the user types some prefix a query is generated to search for records in the repository that match the prefix, and the records are found they can be sorted via rating scores.

At step 820, a CRM user creates a new record in a CRM system. An example of certain features of the CRM system will be described below with reference to FIGS. 12-14. The type of record can vary depending on the implementation and if you non-limiting examples can include account records, lead records, opportunity records, etc. For sake of illustrating example, in the description of steps 830-860 that follows, it will be assumed that the CRM user has created a new account record at 820. When the CRM user creates a new account record, the CRM user can enter a prefix that represents a company name.

At step 830, based on the prefix entered, the application can then search the repository 124 for the top candidate company profiles having the highest rating scores. The number of top candidate company profiles can vary depending on the implementation, and can be configured or specified by the CRM user of the application. For example, in one non-limiting implementation, the number of top candidate company profiles could be the top five candidate company profiles sorted based on scores from highest to lowest. The top candidate company profiles can be suggested to the user starting with the most interesting/popular company first based on the ratings/scores for each of the top candidate company profiles.

At step 840, the top candidate company profiles are returned to the CRM system and displayed to the CRM user via user interface of the application sorted based on their scores from highest to lowest so that the CRM user can select one of the top candidate company profiles and use it to create the new account record.

At step 850, the CRM user can select one of the top candidate company profiles that the CRM user would like to use, and at step 860, data (e.g., name, website, phone, address, etc.) from the selected company profile is automatically filled or auto populated into the new account record to auto populate the new account record with the data for the selected company profile.

Figure 9:
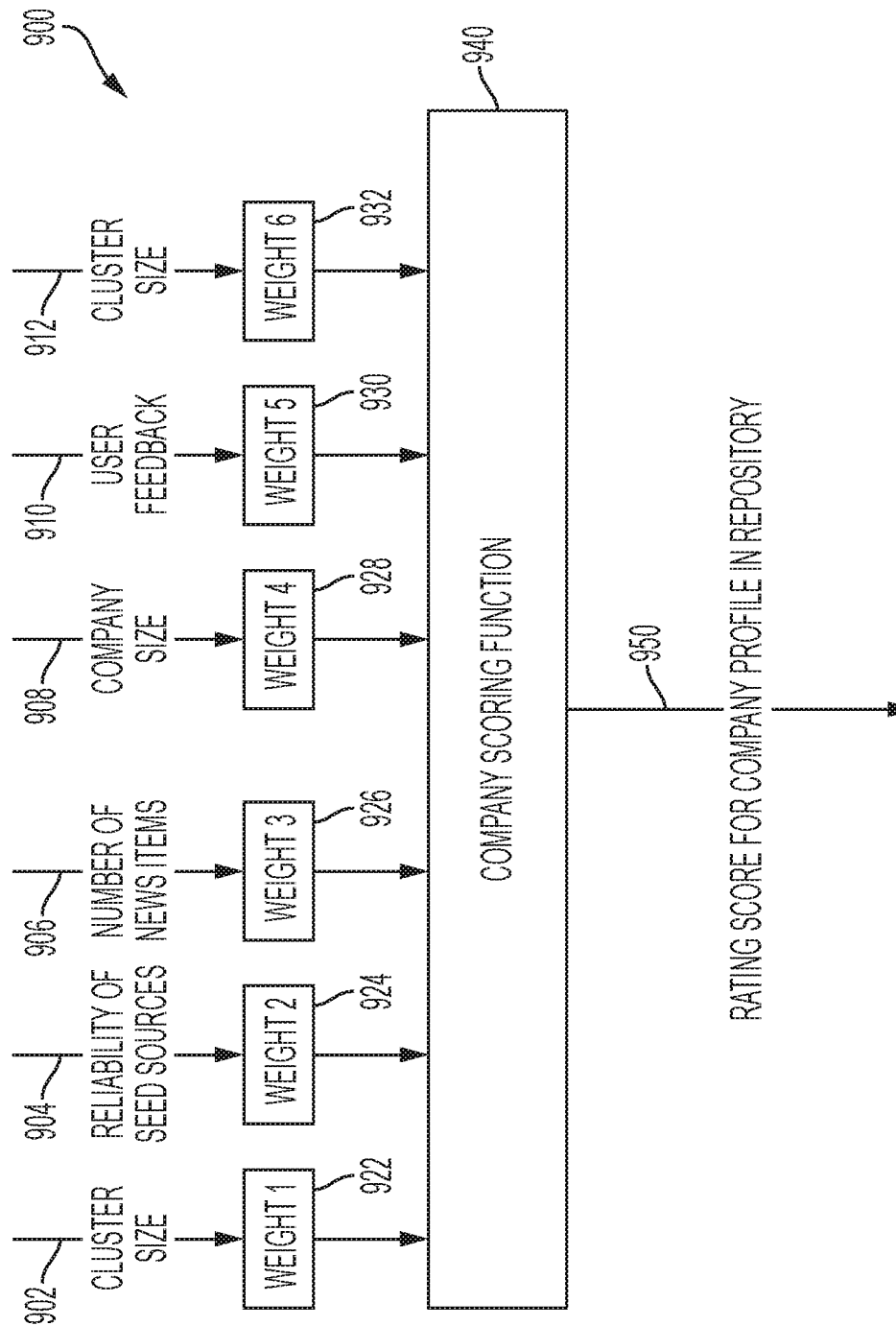
FIG. 9 is a block diagram of a company scoring generator that can be executed at the rating module to rate company profiles that are stored in a repository in accordance with the disclosed embodiments.

FIG. 9 is a block diagram of a company scoring generator 900 that can be executed at the rating module 142 to rate company profiles that are stored in a repository 124 in accordance with the disclosed embodiments.

As illustrated in FIG. 9, the rating module 142 includes a company scoring function 940 that processes various input metrics 902, 904, 906, 908, 910, 912 to generate a rating score 950 for company profile that is stored in the repository 124. The rating score 950 represent popularity, interest, and size of the company. Although the company scoring generator 900 is described as it is applied to a single company, it should be appreciated that multiple instances of the company scoring generator 900 can be executed at the same time or in parallel to generate scores for multiple different companies.

The input metrics 902, 904, 906, 908, 910, 912 that are input into the company scoring function 940 can vary depending on the specific implementation. The input metrics 902, 904, 906, 908, 910, 912 can come from the company profile for the company. In this non-limiting example, the input metrics include a cluster size 902 (e.g., the number of company seeds that a particular company profile has in a cluster for that particular company), a reliability score that indicates reliability of each of the seed sources that reflects data correctness of that seed source (e.g., some source are more reliable—for example Fortune 1000 companies or CRM system data), a number of company news items 906 that indicates how many news items have been collected on a particular company (e.g., an internal news API can be invoked to see how many news items were received as responses), company size 908 in terms of number of employees; (e.g., extract the company size using a LinkedIn® company size code that indicates the relative size of the company self-employed, 1-10 employees, 11-50 employees, 51-200 employees, 2011-500 employees, 501-1000 employees, 1001-5000 employees, 5001-10000 employees, 10001+ employees, etc.), and popularity metric 910 (e.g., that indicates how many times the particular company profile was selected in the past by other CRM users). The number of company news items can be obtained from a service that collects news items for each company profile in the repository. For instance, when a customer enters to some account page, the account's data (e.g., name and website) are automatically receive, and the query data can be matched the repository. Upon receiving a match, news item(s) that have been collected can then be returned. The number of news items that return is an indicator of how popular the company is in the news. However, it should be appreciated that any number of other signals 912 for each company could also be input into the company scoring function 940.

In one non-limiting embodiment, a weight (e.g., a constant factor) is applied to each of the input metrics 902, 904, 906, 908, 910, 912 to scale the relative importance of that particular input with respect to each of the other input metrics. So, in this particular example a weight 922 can be applied to the cluster size 902, a weight 924 can be applied to the reliability of the seed sources 904, a weight 926 can be applied to the number of news items 906, a weight 928 can be applied to the company size 908, and a weight 930 can be applied to the user feedback 910. In one embodiment, the value of each input can be multiplied by its corresponding weight (e.g., a constant factor) to generate a product, and then all of the products can be summed to generate a rating score 950 for that particular company profile. After rating scores have been generated for all the different company profiles, all of the different company profiles can then be ranked based on their respective rating scores.

In other embodiments, the input metrics can include other signals that are not explicitly shown in FIG. 9 due to page constraints, such as, one or more of, an indication of whether the company profile includes a ticker symbol that indicates that the particular company is publicly traded; an indication of whether the company profile includes a phone number for that particular company; an indication of whether the company profile includes a physical address for that particular company; an indication of whether the company profile includes various types of social media accounts for that particular company (e.g., Facebook® LinkedIn® and/or Twitter® accounts); an indication of whether the company profile includes an entry or a page for that particular company in a web-based encyclopedia (e.g., a Wikipedia® page) hosted on the World Wide Web; and an indication of whether the company profile includes a website having a top-level domain name that is one of .edu, .gov and .org (e.g., the website is .edu, .gov and .org website). For example, a scoring penalty can be assessed when the top-level domain name that is one of .edu, .gov and .org because this tends to indicate that the company is a non-profit organization. The embodiment of FIG. 9 is non-limiting. In one implementation, the input metrics and their corresponding weights (in parenthesis) can include:

cluster size in terms of the number of company seeds the company has (weight=3.0)

seed source reliability (weight=5.0)—A static score for each seed source according to crowd source testing performed that reflects data correctness of that seed source.

Number of company news items (weight=5.0)—the amount for news collected on a company.

Company size (weight=15.0)—The size of the company according to LinkedIn® ticker (weight=5.0)—determines whether the company is traded.

company phone (weight=2.0)

company address (weight=2.0)

Facebook® (weight=2.0)—determines whether a company has a Facebook® account

LinkedIn® (weight=2.0)—determines whether a company has a LinkedIn® account

Twitter® (weight=2.0)—determines whether a company has a Twitter® account

Wikipedia® (weight=2.0)—determines whether a company has a Wikipedia® page

.edu, .gov and .org websites (weight=−1000)—Determines if the company website is .edu, .gov or .org.

Repository Publication

The company seed collection, enrichment and clustering system 100 executes continuously or regularly to update the company profiles that are stored in the repository 124. In other words, the information or company data that stored within the repository 124 is constantly changing. At any given time, a particular version of the company profiles is stored at repository 124. Eventually, the repository 124 can be published to the data store 180, where applications, services and users can utilize these company profiles (that are part of that particular version of the repository 124) in conjunction with other applications, such as CRM applications, etc.

However, the particular version of company profiles stored at the repository 124 is not available for use by external users, applications and services until it is published to the data store 180. The particular version of the repository 124 can be published to the data store 180 after certain conditions are met or a decision is made by an administrator to publish that version of the repository 124. For example, in some implementations, the particular version of the repository 124 can be published to the data store 180 after a certain amount of time has elapsed since it was created. This approach assumes that if the system 100 executes for a certain amount of time the company profiles stored at the repository 124 has been sufficiently developed and will be sufficiently complete and accurate to warrant publication to the data store 180. However, it is desirable to verify the quality of at least some of the company profiles stored at the repository 124 prior to publishing that version of the repository 124 to the data store 180. In addition, it is also desirable to make sure that the quality of the data in the repository 180 is maintained between versions.

In accordance with the disclosed embodiments, the quality gate and publisher module 170 (FIG. 1) applies a set of statistical methods and crowd sourcing methods in order to determine the quality of a candidate repository.

For example, the quality gate module 172 can perform crowd sourcing to select a sample set of company names from the repository 124, and then determine a name match percentage. In this context, "name match percentage" can refer to the percentage of company names for the selected ones of the company profiles that match corresponding company names obtained from company websites. Name match percentage can be determined by crowd sourcing. For example, in one implementation, a link to the company website is sent to many users, who are then asked if a company name that is also provided matches the name in the website. A higher name match percentage reflects a higher quality of the repository 124, whereas a lower name match percentage reflects a lower quality of the repository 124.

As another example, the quality gate module 172 can determine attribute coverage percentage of the company profiles in the repository 124. In this context, "attribute coverage percentage" can refer to the percentage or number of company profiles that have a value for each possible attribute type. A higher percentage or number reflects better attribute coverage percentage and hence higher quality of the current version of the repository. A lower percentage or number reflects weaker attribute coverage percentage and hence lower quality of the current version of the repository.

As another example, the quality gate module 172 can determine attribute duplication percentage among the company profiles in the repository 124. In this context, "attribute duplication percentage" can refer to the percentage or number of company profiles that exhibit attribute duplication by having duplicate values for the same attribute type (e.g., have the same or duplicate values for common attributes like website or telephone number). A lower attribute duplication percentage reflects a higher quality of the current version of the repository, and a higher attribute duplication percentage reflects a lower quality of the current version of the repository. While duplication may not be bad in some cases (e.g., two companies may have the same address, or name in different states), the duplication of certain attributes (e.g., website, phone) can be and is viewed negatively as a penalty.

As another example, the quality gate module 172 can select/sample various attributes from the company profiles in the repository 124, and then use crowd sourcing technologies to ask a group of users to score the formatting of the values of those selected attributes. In one embodiment, each user submits a score for a "formatting value" for each attribute. The quality gate module 172 can then average the scores from the group of users for each of the selected attributes to generate a mean score for each attribute (e.g., an average score value for each attribute). The quality gate module 172 can then analyze the mean scores for each attribute to determine a composite or overall display formatting score for the various attributes that were selected/sampled from the company profiles in the repository 124. In one embodiment, the system then computes a percentage of the attributes having a score above a threshold. In this context, "overall display formatting score" can refer to the percentage or number of the sampled attributes that have a mean score greater than a threshold (e.g., percentage of the set of attributes that have an average score greater than a threshold). A higher overall display formatting score reflects a higher quality of the repository, whereas a lower overall display formatting score reflects a lower quality of the repository.

In one embodiment, geo-statistical measures can also be used as one of the variables when computing the repository quality score (i.e., to determine "quality" of the repository, or consistency with past versions of the repository). For example, geographical coverage of data in the repository can be evaluated (e.g., we expect of have more than certain amount of companies from the US and another amount in CANADA). In one implementation, the quality gate module 172 can perform geo-statistical analysis to determine a geographical distribution of the company profiles in the repository 124. In this context, "geographical distribution" can refer to the percentages or numbers of company profiles from different regions of interest. For example, depending on the implementation, the regions of interest could be different cities within a state, different states within a country, different countries within a continent, or different continents within the world. Regardless of the implementation, the percentages or numbers of company profiles from different regions of interest for a particular version of the repository can then be compared to the percentages or numbers of company profiles from different regions of interest from one or more past versions of the repository to determine consistency of the current version of the repository with past version(s) of the repository. If a big drop in certain region is observed that could affect customer experience in that region, then that indicates that the repository is of a lower quality and it might be due to bug that needs to be checked. The quality gate module 172 can also determine if the number of companies in the repository is bigger than a threshold.

The quality gate module 172 can then scale the computed values for the name match percentage, attribute coverage percentage, attribute duplication percentage, overall display formatting score, the number of companies that overlap, etc. according to weights that are defined for each metric, and then use the scaled values to compute a repository quality score (e.g., a sum of the scaled values). The repository quality score can then be compared to a threshold. If the repository quality score is greater than or equal to the threshold, the current version of the repository is deemed to be of sufficiently high quality to allow for publication to the data store 180. As such, once the current version of the repository passes the quality test, the publisher module 174 can automatically publish it to data store (S3) 180. In one embodiment, the data store 180 can be a data lake. The data lake 180 is a centralized repository that stores structured and unstructured data for the company profiles at any scale. Data can be stored in its natural format (e.g., object blobs or files). A data lake can be a single store of all enterprise data including raw copies of source system data and transformed data used for tasks such as reporting, visualization, analytics and machine learning. A data lake can include structured data from relational databases (rows and columns), semi-structured data (CSV, logs, XML, JSON), unstructured data (emails, documents, PDFs) and binary data (images, audio, video). As such, data can be stored as-is, without having to first structure the data, and users can then access the data for the company profiles and use it for various purposes. For example, users can use the data for the company profiles in their own applications, or run different types of analytics—from dashboards and visualizations to big data processing, real-time analytics, and machine learning to guide better decisions. One example of technology used to host a data lake can store a data lake is the distributed file system used in Apache Hadoop. Many companies also use cloud storage services such as Azure Data Lake and Amazon S3.

Figure 10:
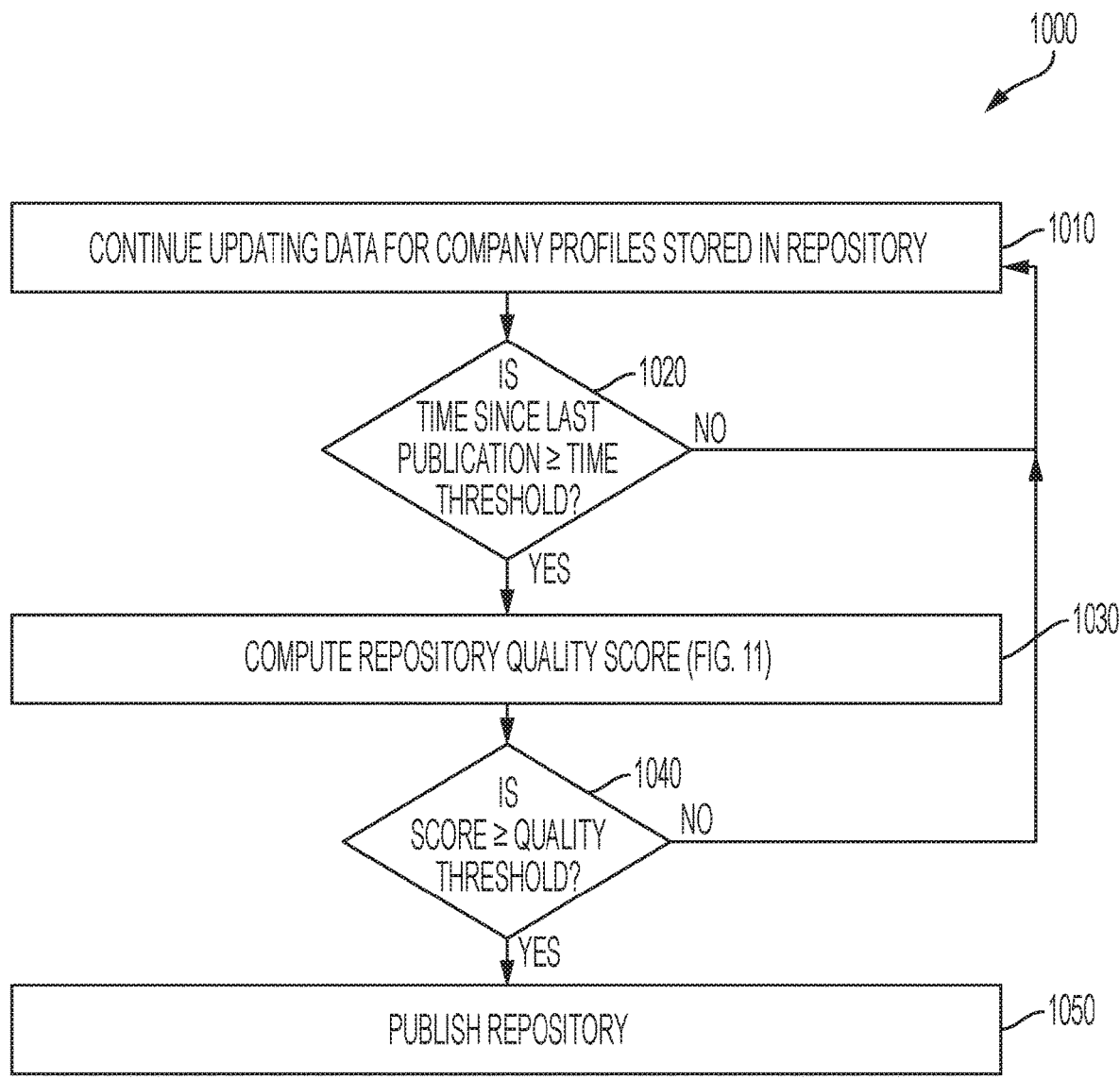
FIG. 10 is a flowchart of a method performed by the quality gate and publisher module for determining quality of a version of a repository and determining whether to publish that version of the repository depending on its quality score in accordance with the disclosed embodiments.

FIG. 10 is a flowchart of a method 1000 performed by the quality gate and publisher module 170 for determining quality of a version of a repository 124 and determining whether to publish that version of the repository 124 depending on its quality score in accordance with the disclosed embodiments. The method 1000 can be used to verify the quality of company information that is stored in a particular version of the repository 124, and to generate a score that reflects the quality of the repository 124. This quality score can then be compared to a threshold to decide whether this particular version of the repository 124 passes a quality test, and if so, that particular version of the repository 124 is ready for publication to the data store 180 so that company profiles and company data can be accessed and used by users, applications and services. The method 1000 will be described as it is applied to a single version of a repository 124; however, it should be appreciated that the method 1000 can be executed against multiple different versions of a repository 124.

With reference to method 1000, steps can be added, omitted, and/or performed simultaneously without departing from the scope of the appended claims. It should be appreciated that the method 1000 may include any number of additional or alternative tasks, that the tasks shown in FIG. 10 need not be performed in the illustrated order, and that the method 1000 may be incorporated into a more comprehensive procedure or process having additional functionality not described in detail herein. Moreover, one or more of the tasks shown in FIG. 10 could potentially be omitted from an embodiment of the method 1000 as long as the intended overall functionality remains intact. It should also be understood that the illustrated method 1000 can be stopped at any time. The method 1000 is computer-implemented in that various tasks or steps that are performed in connection with the method 1000 may be performed by software, hardware, firmware, or any combination thereof. For illustrative purposes, the following description of the method 1000 may refer to elements mentioned above in connection with FIG. 1. In certain embodiments, some or all steps of this process, and/or substantially equivalent steps, are performed by execution of processor-readable instructions stored or included on a non-transitory processor-readable medium. For instance, in the description of FIG. 10 that follows, the quality gate and publisher module 170, the repository 124 and/or the data store 180 will be described as performing various acts, tasks or steps, but it should be appreciated that this refers to processing system(s), memory and/or storage system(s) of these entities executing instructions to perform those various acts, tasks or steps. Depending on the implementation, some of the processing system(s) can be centrally located, or distributed among a number of server systems that work together. Furthermore, in the description of FIG. 10, a particular example is described in which quality gate and publisher module 170 performs certain actions by interacting with other elements of the system 100.

The method 1000 can begin at any time, and in one embodiment, starts at 1010 as company data for company profiles stored in the repository 124 is being continuously updated. At 1020, the quality gate module 172 determines whether an amount of time since the last publication is greater than or equal to a particular time threshold. In this embodiment, the quality gate module 172 will evaluate a particular version of the repository 124 for potential publication after a certain amount of time elapses. It should be appreciated however, that other events or conditions can trigger the quality gate module 172 to evaluate a particular version of the repository 124 for potential publication to the data store 180. When the quality gate module 172 determines (at 1020) that the time since last publication is less than the time threshold, the method 1000 loops back to 1010 where the company seed collection, enrichment and clustering system 100 continues to update company profiles stored in the repository 124. By contrast, when the quality gate module 172 determines that 1020 that time since last publication is greater than or equal to the time threshold, the method 1000 proceeds to 1030 where the quality gate module 172 computes a quality score for that particular version of the repository. This quality score is also referred to herein as a repository quality score. The repository quality score can be computed in different ways depending on the implementation. One non-limiting example of how the repository quality scores computed will be described below with reference to FIG. 11.

The method 1000 then proceeds to step 1040 where the quality gate module 172 determines whether the repository quality score is greater than or equal to a quality threshold. When the quality gate module 172 determines (at 1040) that the repository quality score is less than the quality threshold this means that the current version of the repository 124 has failed the quality test, and the method 1000 loops back to 1010 where the company seed collection, enrichment and clustering system 100 continues to update company profiles stored in the repository 124. By contrast when the quality gate module 172 determines (at 1040) that the repository quality score is greater than or equal to the quality threshold this means that the current version of the repository 124 has passed the quality test, and the method 1000 proceeds to 1050 where the publisher module 174 publishes the current version of the repository 124 to the data store 180. That version of the repository 124 is available at the data store 180 and company data from the various company profiles of the repository 124 can then be utilized by applications.

Figure 11:
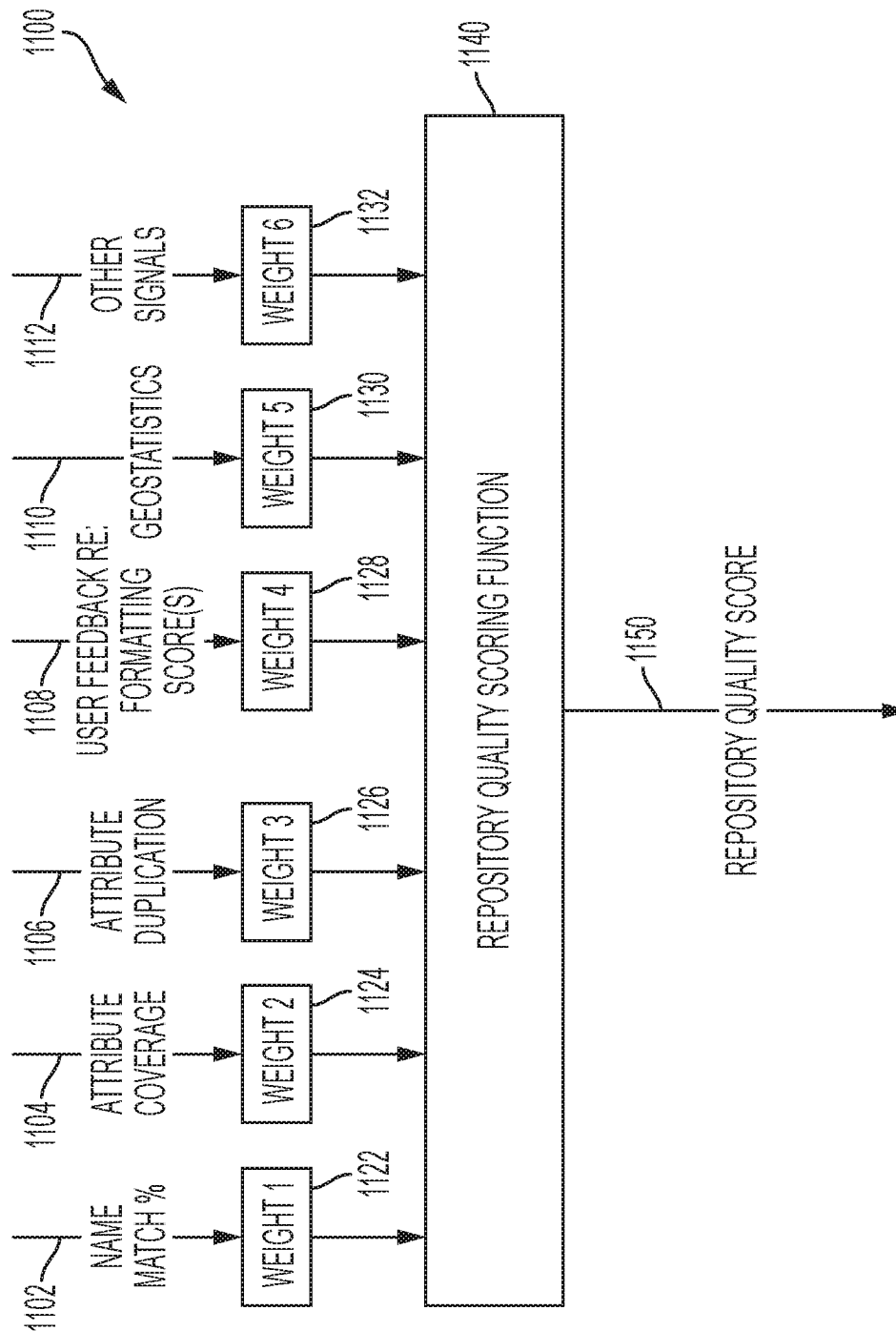
FIG. 11 is a block diagram of a quality scoring generator that can be executed at the quality gate module to compute a quality score for a particular version of a repository in accordance with the disclosed embodiments.

FIG. 11 is a block diagram of a quality scoring generator 1100 that can be executed at the quality gate module 172 to compute a quality score for a particular version of a repository 124 in accordance with the disclosed embodiments. As illustrated in FIG. 11, the quality gate module 172 includes a repository quality scoring function 1140 that processes various input metrics to generate a repository quality score 1150 for a particular version of the repository 124. The repository quality score 1150 can then be used to decide whether that particular version of the repository 124 should be published to the data store 180.

The inputs that are input into the repository quality scoring function 1140 can vary depending on the specific implementation. In this non-limiting example, the inputs include a name match percentage 1102, attribute coverage percentage 1104, attribute duplication percentage 1106, user feedback 1108 regarding formatting score(s), and geo-statistics 1110. However, it should be appreciated that any number of other signals 1112 could also be input into the repository quality scoring function 1140. In one non-limiting embodiment, a weight is applied to each input to scale the relative importance of that particular input with respect to each of the other inputs. So, in this particular example a weight 1122 can be applied to the name match percentage 1102, a weight 1124 can be applied to the attribute coverage percentage 1104, a weight 1126 can be applied to the attribute duplication percentage 1106, a weight 1128 can be applied to the user feedback 1108, a weight 1130 can be applied to the geo-statistics 1110, etc. In one embodiment, the value of each input can be multiplied by its corresponding weight to generate a product, and then all of the products can be summed to generate a repository quality score 1150 for that particular version of the repository 124. After repository quality score 1150 has been generated it can then be used to make a decision regarding whether to publish that particular version of the repository 124 to the data store 180, or to decide that the particular version of the repository 124 needs further development or enrichment before it is published to the data store 180.

The technologies describe above can be used to generate a repository of company profiles that can be accessed by other systems, applications and services. In one implementation, these technologies and the resulting repository that are described above can be used in conjunction with a cloud computing platform, such as a multitenant database system, that provides applications and services to multiple tenants or organizations so that all of those tenants can have access to the company profiles and leverage the repository for use with applications that are part of the cloud computing platform. One example of such a system will now be described below with reference to FIGS. 12-14.

Figure 12:
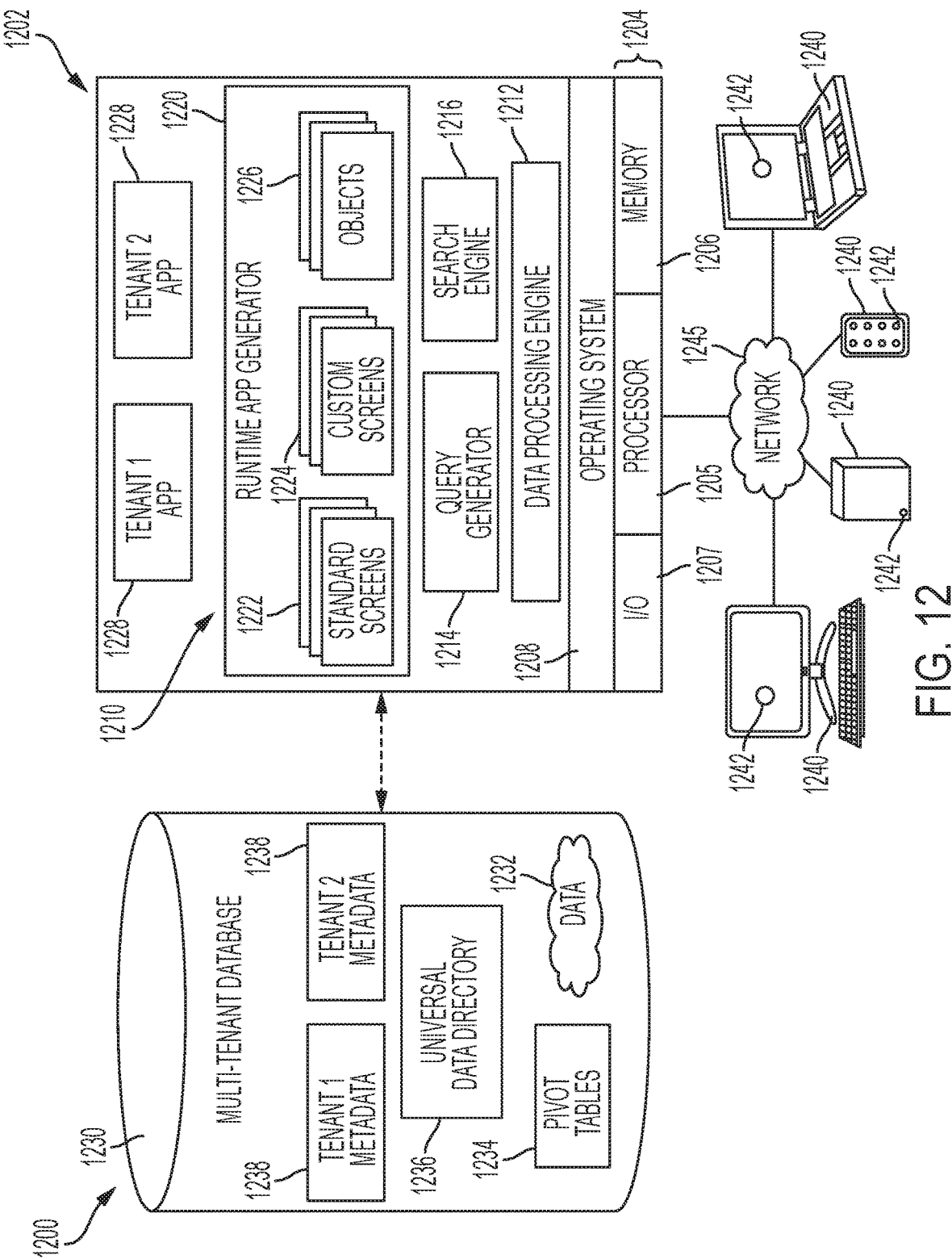
FIG. 12 is a schematic block diagram of an example of a multi-tenant computing environment in which features of the disclosed embodiments can be implemented in accordance with some of the disclosed embodiments.

FIG. 12 is a schematic block diagram of an example of a multi-tenant computing environment in which features of the disclosed embodiments can be implemented in accordance with the disclosed embodiments. As shown in FIG. 12, an exemplary cloud-based solution may be implemented in the context of a multi-tenant system 1200 including a server 1202 that supports applications 1228 based upon data 1232 from a database 1230 that may be shared between multiple tenants, organizations, or enterprises, referred to herein as a multi-tenant database. The multi-tenant system 1200 can be shared by many different organizations™, and handles the storage of, and access to, different metadata, objects, data and applications across disparate organizations. In one embodiment, the multi-tenant system 1200 can be part of a database system, such as a multi-tenant database system.

The multi-tenant system 1200 can provide applications and services and store data for any number of organizations. Each organization is a source of metadata and data associated with that metadata that collectively make up an application. In one implementation, the metadata can include customized content of the organization (e.g., customizations done to an instance that define business logic and processes for an organization). Some non-limiting examples of metadata can include, for example, customized content that describes a build and functionality of objects (or tables), tabs, fields (or columns), permissions, classes, pages (e.g., Apex pages), triggers, controllers, sites, communities, workflow rules, automation rules and processes, etc. Data is associated with metadata to create an application. Data can be stored as one or more objects, where each object holds particular records for an organization. As such, data can include records (or user content) that are held by one or more objects.

The multi-tenant system 1200 allows users of user systems 1240 to establish a communicative connection to the multi-tenant system 1200 over a network 1245 such as the Internet or any type of network described herein. Based on a user's interaction with a user system 1240, the application platform 1210 accesses an organization's data (e.g., records held by an object) and metadata that is stored at one or more database systems 1230, and provides the user system 1240 with access to applications based on that data and metadata. These applications are executed or run in a process space of the application platform 1210 will be described in greater detail below. The user system 1240 and various other user systems (not illustrated) can interact with the applications provided by the multi-tenant system 1200. The multi-tenant system 1200 is configured to handle requests for any user associated with any organization that is a tenant of the system. Data and services generated by the various applications 1228 are provided via a network 1245 to any number of user systems 1240, such as desktops, laptops, tablets, smartphones or other client devices, Google Glass™, and any other computing device implemented in an automobile, aircraft, television, or other business or consumer electronic device or system, including web clients.

Each application 1228 is suitably generated at run-time (or on-demand) using a common application platform 1210 that securely provides access to the data 1232 in the database 1230 for each of the various tenant organizations subscribing to the system 1200. The application platform 1210 has access to one or more database systems 1230 that store information (e.g., data and metadata) for a number of different organizations including user information, organization information, custom information, etc. The database systems 1230 can include a multi-tenant database system 1230 as described with reference to FIG. 12, as well as other databases or sources of information that are external to the multi-tenant database system 1230 of FIG. 12. In accordance with one non-limiting example, the service cloud 1200 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that share access to common subset of the data within the multi-tenant database 1230. In this regard, each tenant includes one or more users and/or groups associated with, authorized by, or otherwise belonging to that respective tenant. Stated another way, each respective user within the multi-tenant system 1200 is associated with, assigned to, or otherwise belongs to a particular one of the plurality of enterprises supported by the system 1200.

Each enterprise tenant may represent a company, corporate department, business or legal organization, and/or any other entities that maintain data for particular sets of users (such as their respective employees or customers) within the multi-tenant system 1200. Although multiple tenants may share access to the server 1202 and the database 1230, the particular data and services provided from the server 1202 to each tenant can be securely isolated from those provided to other tenants. The multi-tenant architecture therefore allows different sets of users to share functionality and hardware resources without necessarily sharing any of the data 1232 belonging to or otherwise associated with other organizations.

The multi-tenant database 1230 may be a repository or other data storage system capable of storing and managing the data 1232 associated with any number of tenant organizations. The database 1230 may be implemented using conventional database server hardware. In various embodiments, the database 1230 shares processing hardware 1204 with the server 1202. In other embodiments, the database 1230 is implemented using separate physical and/or virtual database server hardware that communicates with the server 1202 to perform the various functions described herein.

In an exemplary embodiment, the database 1230 includes a database management system or other equivalent software capable of determining an optimal query plan for retrieving and providing a particular subset of the data 1232 to an instance of application (or virtual application) 1228 in response to a query initiated or otherwise provided by an application 1228, as described in greater detail below. The multi-tenant database 1230 may alternatively be referred to herein as an on-demand database, in that the database 1230 provides (or is available to provide) data at run-time to on-demand virtual applications 1228 generated by the application platform 1210, as described in greater detail below.

In practice, the data 1232 may be organized and formatted in any manner to support the application platform 1210. In various embodiments, the data 1232 is suitably organized into a relatively small number of large data tables to maintain a semi-amorphous "heap"-type format. The data 1232 can then be organized as needed for a particular virtual application 1228. In various embodiments, conventional data relationships are established using any number of pivot tables 1234 that establish indexing, uniqueness, relationships between entities, and/or other aspects of conventional database organization as desired. Further data manipulation and report formatting is generally performed at run-time using a variety of metadata constructs. Metadata within a universal data directory (UDD) 1236, for example, can be used to describe any number of forms, reports, workflows, user access privileges, business logic and other constructs that are common to multiple tenants.

Tenant-specific formatting, functions and other constructs may be maintained as tenant-specific metadata 1238 for each tenant, as desired. Rather than forcing the data 1232 into an inflexible global structure that is common to all tenants and applications, the database 1230 is organized to be relatively amorphous, with the pivot tables 1234 and the metadata 1238 providing additional structure on an as-needed basis. To that end, the application platform 1210 suitably uses the pivot tables 1234 and/or the metadata 1238 to generate "virtual" components of the virtual applications 1228 to logically obtain, process, and present the relatively amorphous data 1232 from the database 1230.

The server 1202 may be implemented using one or more actual and/or virtual computing systems that collectively provide the dynamic application platform 1210 for generating the virtual applications 1228. For example, the server 1202 may be implemented using a cluster of actual and/or virtual servers operating in conjunction with each other, typically in association with conventional network communications, cluster management, load balancing and other features as appropriate. The server 1202 operates with any sort of conventional processing hardware 1204, such as a processor 1205, memory 1206, input/output features 1207 and the like. The input/output features 1207 generally represent the interface(s) to networks (e.g., to the network 1245, or any other local area, wide area or other network), mass storage, display devices, data entry devices and/or the like.

The processor 1205 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 1206 represents any non-transitory short-term or long-term storage or other computer-readable media capable of storing programming instructions for execution on the processor 1205, including any sort of random-access memory (RAM), read only memory (ROM), flash memory, magnetic or optical mass storage, and/or the like. The computer-executable programming instructions, when read and executed by the server 1202 and/or processor 1205, cause the server 1202 and/or processor 1205 to create, generate, or otherwise facilitate the application platform 1210 and/or virtual applications 1228 and perform one or more additional tasks, operations, functions, and/or processes described herein. It should be noted that the memory 1206 represents one suitable implementation of such computer-readable media, and alternatively or additionally, the server 1202 could receive and cooperate with external computer-readable media that is realized as a portable or mobile component or platform, e.g., a portable hard drive, a USB flash drive, an optical disc, or the like.

The server 1202, application platform 1210 and database systems 1230 can be part of one backend system. Although not illustrated, the multi-tenant system 1200 can include other backend systems that can include one or more servers that work in conjunction with one or more databases and/or data processing components, and the application platform 1210 can access the other backend systems.

The multi-tenant system 1200 includes one or more user systems 1240 that can access various applications provided by the application platform 1210. The application platform 1210 is a cloud-based user interface. The application platform 1210 can be any sort of software application or other data processing engine that generates the virtual applications 1228 that provide data and/or services to the user systems 1240. In a typical embodiment, the application platform 1210 gains access to processing resources, communications interfaces and other features of the processing hardware 1204 using any sort of conventional or proprietary operating system 1208. The virtual applications 1228 are typically generated at run-time in response to input received from the user systems 1240. For the illustrated embodiment, the application platform 1210 includes a bulk data processing engine 1212, a query generator 1214, a search engine 1216 that provides text indexing and other search functionality, and a runtime application generator 1220. Each of these features may be implemented as a separate process or other module, and many equivalent embodiments could include different and/or additional features, components or other modules as desired.

The runtime application generator 1220 dynamically builds and executes the virtual applications 1228 in response to specific requests received from the user systems 1240. The virtual applications 1228 are typically constructed in accordance with the tenant-specific metadata 1238, which describes the particular tables, reports, interfaces and/or other features of the particular application 1228. In various embodiments, each virtual application 1228 generates dynamic web content that can be served to a browser or other client program 1242 associated with its user system 1240, as appropriate.

The runtime application generator 1220 suitably interacts with the query generator 1214 to efficiently obtain multi-tenant data 1232 from the database 1230 as needed in response to input queries initiated or otherwise provided by users of the user systems 1240. In a typical embodiment, the query generator 1214 considers the identity of the user requesting a particular function (along with the user's associated tenant), and then builds and executes queries to the database 1230 using system-wide metadata 1236, tenant specific metadata 1238, pivot tables 1234, and/or any other available resources. The query generator 1214 in this example therefore maintains security of the common database 1230 by ensuring that queries are consistent with access privileges granted to the user and/or tenant that initiated the request.

With continued reference to FIG. 12, the data processing engine 1212 performs bulk processing operations on the data 1232 such as uploads or downloads, updates, online transaction processing, and/or the like. In many embodiments, less urgent bulk processing of the data 1232 can be scheduled to occur as processing resources become available, thereby giving priority to more urgent data processing by the query generator 1214, the search engine 1216, the virtual applications 1228, etc.

In exemplary embodiments, the application platform 1210 is utilized to create and/or generate data-driven virtual applications 1228 for the tenants that they support. Such virtual applications 1228 may make use of interface features such as custom (or tenant-specific) screens 1224, standard (or universal) screens 1222 or the like. Any number of custom and/or standard objects 1226 may also be available for integration into tenant-developed virtual applications 1228. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 1232 associated with each virtual application 1228 is provided to the database 1230, as appropriate, and stored until it is requested or is otherwise needed, along with the metadata 1238 that describes the particular features (e.g., reports, tables, functions, objects, fields, formulas, code, etc.) of that particular virtual application 1228. For example, a virtual application 1228 may include a number of objects 1226 accessible to a tenant, wherein for each object 1226 accessible to the tenant, information pertaining to its object type along with values for various fields associated with that respective object type are maintained as metadata 1238 in the database 1230. In this regard, the object type defines the structure (e.g., the formatting, functions and other constructs) of each respective object 1226 and the various fields associated therewith.

Still referring to FIG. 12, the data and services provided by the server 1202 can be retrieved using any sort of personal computer, mobile telephone, tablet or other network-enabled user system 1240 on the network 1245. In an exemplary embodiment, the user system 1240 includes a display device, such as a monitor, screen, or another conventional electronic display capable of graphically presenting data and/or information retrieved from the multi-tenant database 1230, as described in greater detail below.

Typically, the user operates a conventional browser application or other client program 1242 executed by the user system 1240 to contact the server 1202 via the network 1245 using a networking protocol, such as the hypertext transport protocol (HTTP) or the like. The user typically authenticates his or her identity to the server 1202 to obtain a session identifier ("SessionID") that identifies the user in subsequent communications with the server 1202. When the identified user requests access to a virtual application 1228, the runtime application generator 1220 suitably creates the application at run time based upon the metadata 1238, as appropriate. However, if a user chooses to manually upload an updated file (through either the web-based user interface or through an API), it will also be shared automatically with all of the users/devices that are designated for sharing.

As noted above, the virtual application 1228 may contain Java, ActiveX, or other content that can be presented using conventional client software running on the user system 1240; other embodiments may simply provide dynamic web or other content that can be presented and viewed by the user, as desired. As described in greater detail below, the query generator 1214 suitably obtains the requested subsets of data 1232 from the database 1230 as needed to populate the tables, reports or other features of the particular virtual application 1228.

Objects and Records

In one embodiment, the multi-tenant database system 1230 can store data in the form of records and customizations. As used herein, the term "record" can refer to a particular occurrence or instance of a data object that is created by a user or administrator of a database service and stored in a database system, for example, about a particular (actual or potential) business relationship or project. The data object can have a data structure defined by the database service (a standard object) or defined by a subscriber (custom object).

An object can refer to a structure used to store data and associated metadata along with a globally unique identifier (called an identity field) that allows for retrieval of the object. In one embodiment implementing a multi-tenant database, all of the records for the tenants have an identifier stored in a common table. Each object comprises a number of fields. A record has data fields that are defined by the structure of the object (e.g. fields of certain data types and purposes). An object is analogous to a database table, fields of an object are analogous to columns of the database table, and a record is analogous to a row in a database table. Data is stored as records of the object, which correspond to rows in a database. The terms "object" and "entity" are used interchangeably herein. Objects not only provide structure for storing data, but can also power the interface elements that allow users to interact with the data, such as tabs, the layout of fields on a page, and lists of related records. Objects can also have built-in support for features such as access management, validation, formulas, triggers, labels, notes and attachments, a track field history feature, security features, etc. Attributes of an object are described with metadata, making it easy to create and modify records either through a visual interface or programmatically.

A record can also have custom fields defined by a user. A field can be another record or include links thereto, thereby providing a parent-child relationship between the records. Customizations can include custom objects and fields, Apex Code, Visualforce, Workflow, etc.

Examples of objects include standard objects, custom objects, and external objects. A standard object can have a pre-defined data structure that is defined or specified by a database service or cloud computing platform. A standard object can be thought of as a default object. For example, in one embodiment, a standard object includes one or more pre-defined fields that are common for each organization that utilizes the cloud computing platform or database system or service.

A few non-limiting examples of different types of standard objects can include sales objects (e.g., accounts, contacts, opportunities, leads, campaigns, and other related objects); task and event objects (e.g., tasks and events and their related objects); support objects (e.g., cases and solutions and their related objects); salesforce knowledge objects (e.g., view and vote statistics, article versions, and other related objects); document, note, attachment objects and their related objects; user, sharing, and permission objects (e.g., users, profiles, and roles); profile and permission objects (e.g., users, profiles, permission sets, and related permission objects); record type objects (e.g., record types and business processes and their related objects); product and schedule objects (e.g., opportunities, products, and schedules); sharing and team selling objects (e.g., account teams, opportunity teams, and sharing objects); customizable forecasting objects (e.g., includes forecasts and related objects); forecasts objects (e.g., includes objects for collaborative forecasts); territory management (e.g., territories and related objects associated with territory management); process objects (e.g., approval processes and related objects); content objects (e.g., content and libraries and their related objects); chatter feed objects (e.g., objects related to feeds); badge and reward objects; feedback and performance cycle objects, etc. For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is working on.

By contrast, a custom object can have a data structure that is defined, at least in part, by an organization or by a user/subscriber/admin of an organization. For example, a custom object can be an object that is custom defined by a user/subscriber/administrator of an organization, and includes one or more custom fields defined by the user or the particular organization for that custom object. Custom objects are custom database tables that allow an organization to store information unique to their organization. Custom objects can extend the functionality that standard objects provide.

In one embodiment, an object can be a relationship management entity having a record type defined within platform that includes a customer relationship management (CRM) database system for managing a company's relationships and interactions with their customers and potential customers. Examples of CRM entities can include, but are not limited to, an account, a case, an opportunity, a lead, a project, a contact, an order, a pricebook, a product, a solution, a report, a forecast, a user, etc. For instance, an opportunity can correspond to a sales prospect, marketing project, or other business-related activity with respect to which a user desires to collaborate with others.

An account object may include information about an organization or person (such as customers, competitors, and partners) involved with a particular business. Each object may be associated with fields. For example, an account object may include fields such as "company", "zip", "phone number", "email address", etc. A contact object may include contact information, where each contact may be an individual associated with an "account". A contact object may include fields such as "first name", "last name", "phone number", "accountID", etc. The "accountID" field of the "contact" object may be the ID of the account that is the parent of the contact. An opportunities object includes information about a sale or a pending deal. An opportunities object may include fields such as "amount", "accountID", etc. The "accountID" field of the "opportunity" object may be the ID of the account that is associated with the opportunity. Each field may be associated with a field value. For example, a field value for the "zip" field may be "94105".

External objects are objects that an organization creates that map to data stored outside the organization. External objects are like custom objects, but external object record data is stored outside the organization. For example, data that's stored on premises in an enterprise resource planning (ERP) system can be accessed as external objects in real time via web service callouts, instead of copying the data into the organization.

The following description is of one example of a system in which the features described above may be implemented. The components of the system described below are merely one example and should not be construed as limiting. The features described above may be implemented in any other type of computing environment, such as one with multiple servers, one with a single server, a multi-tenant server environment, a single-tenant server environment, or some combination of the above.

Figure 13:
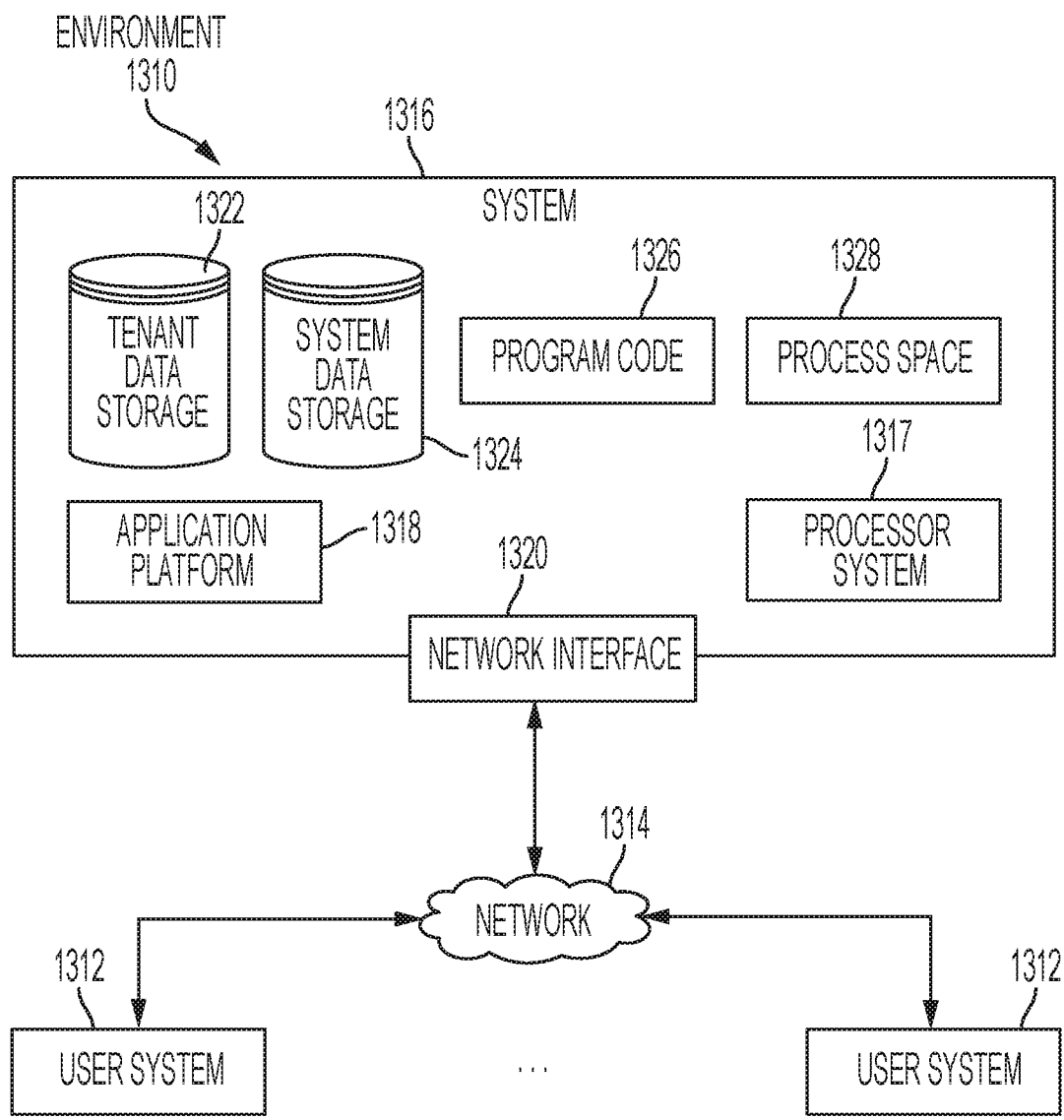
FIG. 13 is a block diagram that illustrates an example of an environment in which an on-demand database service can be used in accordance with some implementations.

FIG. 13 shows a block diagram of an example of an environment 1310 in which an on-demand database service can be used in accordance with some implementations. The environment 1310 includes user systems 1312, a network 1314, a database system 1316 (also referred to herein as a "cloud-based system"), a processor system 1317, an application platform 1318, a network interface 1320, tenant database 1322 for storing tenant data 1323, system database 1324 for storing system data 1325, program code 1326 for implementing various functions of the system 1316, and process space 1328 for executing database system processes and tenant-specific processes, such as running applications as part of an application hosting service. In some other implementations, environment 1310 may not have all of these components or systems, or may have other components or systems instead of, or in addition to, those listed above.

In some implementations, the environment 1310 is an environment in which an on-demand database service exists. An on-demand database service, such as that which can be implemented using the system 1316, is a service that is made available to users outside of the enterprise(s) that own, maintain or provide access to the system 1316. As described above, such users generally do not need to be concerned with building or maintaining the system 1316. Instead, resources provided by the system 1316 may be available for such users' use when the users need services provided by the system 1316; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 1318 can be a framework that allows the applications of system 1316 to execute, such as the hardware or software infrastructure of the system 1316. In some implementations, the application platform 1318 enables the creation, management and execution of one or more applications developed by the provider of the on-demand database service, users accessing the on-demand database service via user systems 1312, or third-party application developers accessing the on-demand database service via user systems 1312.

In some implementations, the system 1316 implements a web-based customer relationship management (CRM) system. For example, in some such implementations, the system 1316 includes application servers configured to implement and execute CRM software applications as well as provide related data, code, forms, renderable webpages and documents and other information to and from user systems 1312 and to store to, and retrieve from, a database system related data, objects, and Webpage content. In some MTS implementations, data for multiple tenants may be stored in the same physical database object in tenant database 1322. In some such implementations, tenant data is arranged in the storage medium(s) of tenant database 1322 so that data of one tenant is kept logically separate from that of other tenants so that one tenant does not have access to another tenant's data, unless such data is expressly shared. The system 1316 also implements applications other than, or in addition to, a CRM application. For example, the system 1316 can provide tenant access to multiple hosted (standard and custom) applications, including a CRM application. User (or third-party developer) applications, which may or may not include CRM, may be supported by the application platform 1318. The application platform 1318 manages the creation and storage of the applications into one or more database objects and the execution of the applications in one or more virtual machines in the process space of the system 1316.

According to some implementations, each system 1316 is configured to provide webpages, forms, applications, data and media content to user (client) systems 1312 to support the access by user systems 1312 as tenants of system 1316. As such, system 1316 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 1314 can be or include any network or combination of networks of systems or devices that communicate with one another. For example, the network 1314 can be or include any one or any combination of a LAN (local area network), WAN (wide area network), telephone network, wireless network, cellular network, point-to-point network, star network, token ring network, hub network, or other appropriate configuration. The network 1314 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 1312 can communicate with system 1316 using TCP/IP and, at a higher network level, other common Internet protocols to communicate, such as HTTP, FTP, AFS, WAP, etc. In an example where HTTP is used, each user system 1312 can include an HTTP client commonly referred to as a "web browser" or simply a "browser" for sending and receiving HTTP signals to and from an HTTP server of the system 1316. Such an HTTP server can be implemented as the sole network interface 1320 between the system 1316 and the network 1314, but other techniques can be used in addition to or instead of these techniques. In some implementations, the network interface 1320 between the system 1316 and the network 1314 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 1312 can be implemented as any computing device(s) or other data processing apparatus or systems usable by users to access the database system 1316. For example, any of user systems 1312 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 1312 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 1316) of the user system 1312 to access, process and view information, pages and applications available to it from the system 1316 over the network 1314.

Each user system 1312 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 1312 in conjunction with pages, forms, applications and other information provided by the system 1316 or other systems or servers. For example, the user interface device can be used to access data and applications hosted by system 1316, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 1312 may differ in their respective capacities, and the capacity of a particular user system 1312 can be entirely determined by permissions (permission levels) for the current user of such user system. For example, where a salesperson is using a particular user system 1312 to interact with the system 1316, that user system can have the capacities allotted to the salesperson. However, while an administrator is using that user system 1312 to interact with the system 1316, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 1312 and some or all of its components are operator-configurable using applications, such as a browser, including computer code executed using a central processing unit (CPU) such as an Intel Pentium® processor or the like. Similarly, the system 1316 (and additional instances of an MTS, where more than one is present) and all of its components can be operator-configurable using application(s) including computer code to run using the processor system 1317, which may be implemented to include a CPU, which may include an Intel Pentium® processor or the like, or multiple CPUs.

The system 1316 includes tangible computer-readable media having non-transitory instructions stored thereon/in that are executable by or used to program a server or other computing system (or collection of such servers or computing systems) to perform some of the implementation of processes described herein. For example, computer program code 1326 can implement instructions for operating and configuring the system 1316 to intercommunicate and to process webpages, applications and other data and media content as described herein. In some implementations, the computer code 1326 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 14:
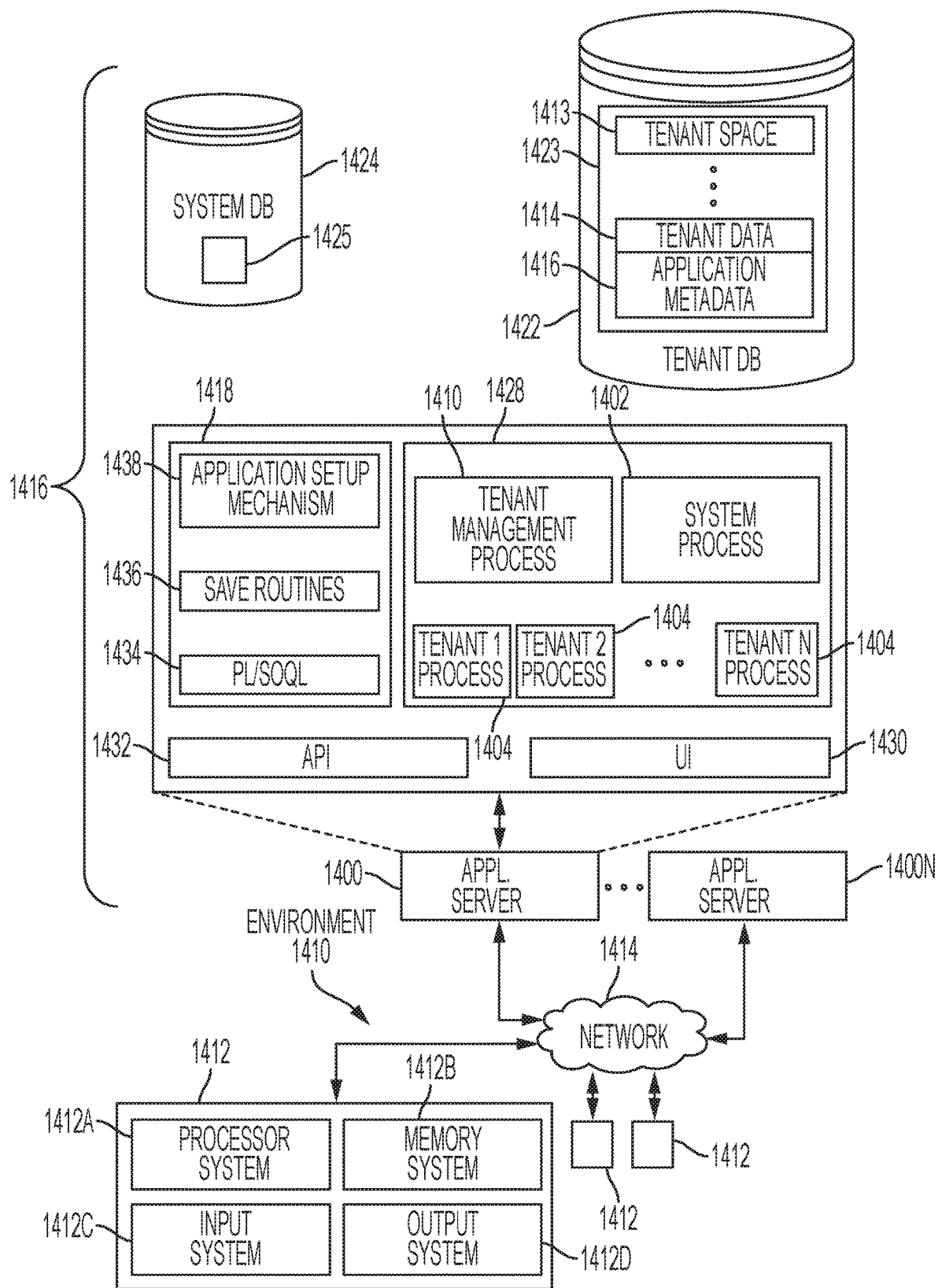
FIG. 14 is a block diagram that illustrates example implementations of elements of FIG. 13 and example interconnections between these elements according to some implementations.

FIG. 14 shows a block diagram of example implementations of elements of FIG. 13 and example interconnections between these elements according to some implementations. That is, FIG. 14 also illustrates environment 1310, but FIG. 14, various elements of the system 1316 and various interconnections between such elements are shown with more specificity according to some more specific implementations. Elements from FIG. 13 that are also shown in FIG. 14 will use the same reference numbers in FIG. 14 as were used in FIG. 13. Additionally, in FIG. 14, the user system 1312 includes a processor system 1412A, a memory system 1412B, an input system 1412C, and an output system 1412D. The processor system 1412A can include any suitable combination of one or more processors. The memory system 1412B can include any suitable combination of one or more memory devices. The input system 1412C can include any suitable combination of input devices, such as one or more touchscreen interfaces, keyboards, mice, trackballs, scanners, cameras, or interfaces to networks. The output system 1412D can include any suitable combination of output devices, such as one or more display devices, printers, or interfaces to networks.

In FIG. 14, the network interface 1320 of FIG. 13 is implemented as a set of HTTP application servers $1400_1$-$1400_N$. Each application server 1400, also referred to herein as an "app server," is configured to communicate with tenant database 1322 and the tenant data 1423 therein, as well as system database 1324 and the system data 1425 therein, to serve requests received from the user systems 1412. The tenant data 1423 can be divided into individual tenant storage spaces 1413, which can be physically or logically arranged or divided. Within each tenant storage space 1413, tenant data 1414 and application metadata 1416 can similarly be allocated for each user. For example, a copy of a user's most recently used (MRU) items can be stored to user storage 1414. Similarly, a copy of MRU items for an entire organization that is a tenant can be stored to tenant storage space 1413.

The process space 1328 includes system process space 1402, individual tenant process spaces 1404 and a tenant management process space 1410. The application platform 1318 includes an application setup mechanism 1438 that supports application developers' creation and management of applications. Such applications and others can be saved as metadata into tenant database 1322 by save routines 1436 for execution by subscribers as one or more tenant process spaces 1404 managed by tenant management process 1410, for example. Invocations to such applications can be coded using PL/SOQL 1434, which provides a programming language style interface extension to API 1432. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 1316 for the subscriber making the invocation and executing the metadata as an application in a virtual machine.

The system 1316 of FIG. 14 also includes a user interface (UI) 1430 and an application programming interface (API) 1432 to system 1316 resident processes to users or developers at user systems 1412. In some other implementations, the environment 1310 may not have the same elements as those listed above or may have other elements instead of, or in addition to, those listed above.

Each application server 1400 can be communicably coupled with tenant database 1322 and system database 1324, for example, having access to tenant data 1423 and system data 1425, respectively, via a different network connection. For example, one application server $1400_1$ can be coupled via the network 1314 (for example, the Internet), another application server $1400_N$ can be coupled via a direct network link, and another application server (not illustrated) can be coupled by yet a different network connection. Transfer Control Protocol and Internet Protocol (TCP/IP) are examples of typical protocols that can be used for communicating between application servers 1400 and the system 1316. However, it will be apparent to one skilled in the art that other transport protocols can be used to optimize the system 1316 depending on the network interconnections used.

In some implementations, each application server 1400 is configured to handle requests for any user associated with any organization that is a tenant of the system 1316. Because it can be desirable to be able to add and remove application servers 1400 from the server pool at any time and for various reasons, in some implementations there is no server affinity for a user or organization to a specific application server 1400. In some such implementations, an interface system implementing a load balancing function (for example, an F5 Big-IP load balancer) is communicably coupled between the application servers 1400 and the user systems 1412 to distribute requests to the application servers 1400. In one implementation, the load balancer uses a least-connections algorithm to route user requests to the application servers 1400. Other examples of load balancing algorithms, such as round robin and observed-response-time, also can be used. For example, in some instances, three consecutive requests from the same user could hit three different application servers 1400, and three requests from different users could hit the same application server 1400. In this manner, by way of example, system 1316 can be a multi-tenant system in which system 1316 handles storage of, and access to, different objects, data and applications across disparate users and organizations.

In one example storage use case, one tenant can be a company that employs a sales force where each salesperson uses system 1316 to manage aspects of their sales. A user can maintain contact data, leads data, customer follow-up data, performance data, goals and progress data, etc., all applicable to that user's personal sales process (for example, in tenant database 1322). In an example of an MTS arrangement, because all of the data and the applications to access, view, modify, report, transmit, calculate, etc., can be maintained and accessed by a user system 1412 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 1316 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 1316 also can maintain system level data usable by multiple tenants or other data. Such system level data can include industry reports, news, postings, and the like that are sharable among tenants.

In some implementations, the user systems 1412 (which also can be client systems) communicate with the application servers 1400 to request and update system-level and tenant-level data from the system 1316. Such requests and updates can involve sending one or more queries to tenant database 1322 or system database 1324. The system 1316 (for example, an application server 1400 in the system 1316) can automatically generate one or more SQL statements (for example, one or more SQL queries) designed to access the desired information. System database 1324 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for automatically generating a repository of company profiles, the system comprising:
   a plurality of independent seed source services, that when executed by a hardware-based processing system, are configurable to cause: crawling of web pages to collect seeds from different web-based sources, wherein each collected seed comprises original seed data that includes a plurality of attributes each having a type and an associated value, wherein each value is a specific piece of structured or unstructured information associated with a particular company;
   a repository configured to store the collected seeds;
   a seed enricher module, that when executed by a hardware-based processing system, is configurable to cause: receiving the collected seeds from a seed master module; fetching additional information for each of the collected seeds from a plurality of different web-based sources; and adding the additional information to each of collected seeds to enrich that collected seed to generate an enriched company seed, wherein each enriched company seed comprises: values for each attributes from the original seed data prior to enrichment, one or more websites that are associated with that enriched company seed, and additional values for attributes that have been extracted from the one or more websites;
   a clusterer and company profile generator module, that when executed by a hardware-based processing system, is configurable to cause:
      automatic clustering the enriched company seeds into different clusters by identifying selected ones of the enriched company seeds that each belong to a particular company, and then grouping the selected ones of the enriched company seeds into a cluster that represents that particular company, wherein each cluster has at least one value for each attribute; and
      selecting a particular value for each attribute of each cluster that has a highest score for inclusion in a corresponding company profile for that cluster.

2. The system according to claim 1, wherein the clusterer and company profile generator module comprises a clusterer module, that when executed by the hardware-based processing system, is configurable to cause:
   retrieving the enriched company seeds from the repository;
   determining which ones of the enriched company seeds have similar attributes; and
   grouping similar enriched company seeds together into different groups, wherein each group is a cluster of enriched company seeds that corresponds to and represents a particular company.

3. The system according to claim 1, wherein the clusterer and company profile generator module, when executed by the hardware-based processing system, is further configurable to cause:
   indexing, at a search engine of the clusterer and company profile generator module, each of the enriched company seeds by each attribute of that enriched company seed, such that each enriched company seed has an index entry for each attribute to allow each of the enriched company seeds to be searchable by attributes, wherein each index entry represents a particular enriched company seed;
   processing each enriched company seed to: search in the index for other enriched company seeds that have similar attributes to find similar enriched company seeds that are candidates for potential inclusion in a cluster for a particular company;

for each seed pair of an enriched company seed for a particular company and a candidate company seed having similar attributes to that enriched company seed: comparing values of attributes of the two company seeds to calculate and extract features; and running a pre-trained random forest machine learning model on extracted features to determine whether that candidate company seed belongs to the same cluster as the enriched company seed; and adding that candidate company seed to the same cluster as the enriched company seed when the pre-trained random forest machine learning model determines, based on the extracted features, that the candidate company seed belongs to the same cluster as the enriched company seed;

executing a connective components algorithm to: collect any other candidate company seeds that share a connection to one or more of the other candidate company seeds that were added to the same cluster of the enriched company seed for that particular company; and add the any other candidate company seeds that share a connection to the same cluster.

4. The system according to claim 2, wherein each cluster comprises: a number of different attributes, wherein each attribute within a particular cluster can have multiple values that were obtained from different seeds, and wherein the clusterer and company profile generator module further comprises a profile generator module, that when executed by the hardware-based processing system, is further configurable to process information in each cluster to cause:

scoring each value of each attribute within that cluster based on how similar each value is to corresponding information extracted from a home webpage for that company;

selecting, for each attribute within that cluster, the particular value for each attribute that has the highest score for inclusion in a company profile for that cluster;

grouping all of the selected values from that cluster together to convert that cluster into a company profile for a particular company, wherein the company profile comprises a set of values that had the highest score for each attribute; and storing each company profile in the repository such that users can access the company profiles and use the company profiles in conjunction with applications.

5. The system according to claim 4, wherein the profile generator module, that when executed by the hardware-based processing system, is further configurable to process information in each cluster to cause:

scoring each of values for each attribute within that cluster to generate a score for each attribute by comparing values for each attribute to a value of a corresponding attribute from the original seed data that was extracted from a home webpage for that company.

6. The system according to claim 5, wherein the profile generator module, that when executed by the hardware-based processing system, is further configurable to process information in each cluster to cause:

scoring each value of each attribute within that cluster by:
(a) selecting a particular enriched company seed from the cluster;
(b) extracting values for each attribute of that particular enriched company seed;
(c) determining a similarity of each extracted value for each attribute of that particular enriched company seed in comparison to an original value of a corresponding attribute from the original company seed to determine a similarity score for that attribute of that particular enriched company seed;
(d) scaling each similarity score based on a weight assigned to that attribute to generate a weighted similarity score for each attribute of that particular enriched company seed;
(e) summing all of the weighted similarity scores at a website scoring function to generate a website score for that particular enriched company seed; and
(f) computing a score, for each value of each attribute of that particular enriched company seed, as a product of the website score for that particular enriched company seed and the similarity score that was computed for that attribute of that particular enriched company seed; and repeating (a)-(f) for each of the other enriched company seeds from the cluster to generate scores for all attributes that are part of the cluster.

7. The system according to claim 5, wherein each company profile comprises the set of values that had the highest score for each attribute, and wherein each attribute is a specific piece of information about a company that describes that company or that can be used to identify that company.

8. The system according to claim 7, wherein the attributes within at least one cluster comprise: a company name attribute, a website address attribute, a ticker attribute, a physical address attribute and a telephone number attribute; and wherein the values within at least one company profile comprise values for a company name, a website address, a ticker symbol, a physical address and a telephone number for a particular company.

9. The system according to claim 2, wherein the clusterer and company profile generator module further comprises a profile generator module, that when executed by the hardware-based processing system, is further configurable to cause:

selecting top ranked information from that cluster of enriched company seeds and eliminating redundant information from that cluster of enriched company seeds;

repeating the selecting for each cluster;

using the top ranked information that is selected from each cluster and successfully validated to generate a corresponding company profile for each particular company;

sending each of the company profiles to the repository for storage.

10. A method for automatically generating company profiles, the method comprising:

collecting, via a plurality of independent seed source services each being configured to crawl web pages, seeds from different web-based sources, wherein each collected seed comprises original seed data that includes a plurality of attributes each having a type and an associated value, wherein each value is a specific piece of structured or unstructured information associated with a particular company;

fetching, via a seed enricher module that is executed by a hardware-based processing system, additional information for each of the collected seeds from a plurality of different web-based sources;

adding, via the seed enricher module that is executed by the hardware-based processing system, the additional information to each of collected seeds to enrich that collected seed to generate an enriched company seed, wherein each enriched company seed comprises: values for each attributes from the original seed data prior to enrichment, one or more websites that are associated with that enriched company seed, and additional values for attributes that have been extracted from the one or more websites;

automatically clustering the enriched company seeds into different clusters, at a clusterer and company profile generator module executed by the hardware-based processing system, by identifying selected ones of the enriched company seeds that each belong to a particular company, and then grouping the selected ones of the enriched company seeds into a cluster that represents that particular company, wherein each cluster has at least one value for each attribute; and selecting, at the clusterer and company profile generator module executed by the hardware-based processing system, a particular value for each attribute of each cluster that has a highest score for inclusion in a corresponding company profile for that cluster; and storing each of the company profiles in a repository.

11. The method according to claim 10, wherein automatically clustering the enriched company seeds into different clusters, comprises:

retrieving the enriched company seeds from the repository;

determining which ones of the enriched company seeds have similar attributes; and grouping similar enriched company seeds that have similar attributes together into different groups, wherein each group is a cluster of enriched company seeds that corresponds to and represents a particular company.

12. The method according to claim 10, wherein the automatically clustering the enriched company seeds into different clusters, comprises:

indexing, at a search engine of the clusterer and company profile generator module, each of the enriched company seeds by each attribute of that enriched company seed, such that each enriched company seed has an index entry for each attribute to allow each of the enriched company seeds to be searchable by attributes, wherein each index entry represents a particular enriched company seed;

processing each enriched company seed, at a clusterer module of the clusterer and company profile generator module, to: search in the index for other enriched company seeds that have similar attributes to find similar enriched company seeds that are candidates for potential inclusion in a cluster for a particular company;

for each seed pair of an enriched company seed for a particular company and a candidate company seed having similar attributes to that enriched company seed: comparing values of attributes of the two company seeds to calculate and extract features; and running a pre-trained random forest machine learning model on extracted features to determine whether that candidate company seed belongs to the same cluster as the enriched company seed; and adding that candidate company seed to the same cluster as the enriched company seed when the pre-trained random forest machine learning model determines, based on the extracted features, that the candidate company seed belongs to the same cluster as the enriched company seed;

executing a connective components algorithm at the clusterer module to: collect any other candidate company seeds that share a connection to one or more of the other candidate company seeds that were added to the same cluster of the enriched company seed for that particular company; and add the any other candidate company seeds that share a connection to the same cluster.

13. The method according to claim 11, wherein each cluster comprises: a number of different attributes, wherein each attribute within a particular cluster can have multiple values that were obtained from different seeds, and wherein the method further comprises:

processing information in each cluster by:

scoring each value of each attribute within that cluster based on how similar each value is to corresponding information extracted from a home webpage for that company;

selecting, for each attribute within that cluster, the particular value for each attribute that has the highest score for inclusion in a company profile for that cluster;

grouping all of the selected values from that cluster together to convert that cluster into a company profile for a particular company, wherein the company profile comprises a set of values that had the highest score for each attribute; and wherein storing each of the company profiles in a repository, comprises:

storing each company profile in the repository such that users can access the company profiles and use the company profiles in conjunction with applications.

14. The method according to claim 13, wherein the scoring each value of each attribute within that cluster based on how similar each value is to the corresponding information extracted from the home webpage for that company, comprises:

scoring each of values for each attribute within that cluster to generate a score for each attribute by comparing values for each attribute to a value of a corresponding attribute from the original seed data that was extracted from the home webpage for that company.

15. The method according to claim 14, wherein the scoring each of values for each attribute within that cluster to generate a score for each attribute by comparing values for each attribute to a value of a corresponding attribute from the original seed data that was extracted from the home webpage for that company, comprises:

(a) selecting a particular enriched company seed from the cluster;

(b) extracting values for each attribute of that particular enriched company seed;

(c) determining a similarity of each extracted value for each attribute of that particular enriched company seed in comparison to an original value of a corresponding attribute from the original company seed to determine a similarity score for that attribute of that particular enriched company seed;

(d) scaling each similarity score based on a weight assigned to that attribute to generate a weighted similarity score for each attribute of that particular enriched company seed;

(e) summing all of the weighted similarity scores at a website scoring function to generate a website score for that particular enriched company seed; and (f) computing a score, for each value of each attribute of that particular enriched company seed, as a product of the website score for that particular enriched company seed and the similarity score that was computed for that attribute of that particular enriched company seed; and repeating (a)-(f) for each of the other enriched company seeds from the cluster to generate scores for all attributes that are part of the cluster.

16. The method according to claim 14, wherein each company profile comprises the set of values that had the highest score for each attribute, and wherein each attribute is a specific piece of information about a company that describes that company or that can be used to identify that company.

17. The method according to claim 16, wherein the attributes within at least one cluster comprise: a company name attribute, a website address attribute, a ticker attribute, a physical address attribute and a telephone number attribute; and wherein the values within at least one company profile comprise values for a company name, a website address, a ticker symbol, a physical address and a telephone number for a particular company.

18. A system comprising at least one hardware-based processor and memory, wherein the memory comprises processor-executable instructions encoded on a non-transient processor-readable media, wherein the processor-executable instructions, when executed by the processor, are configurable to cause:

collecting, via a plurality of independent seed source services each being configured to crawl web pages, seeds from different web-based sources, wherein each collected seed comprises original seed data that includes a plurality of attributes each having a type and an associated value, wherein each value is a specific piece of structured or unstructured information associated with a particular company;

fetching additional information for each of the collected seeds from a plurality of different web-based sources;

adding the additional information to each of collected seeds to enrich that collected seed to generate an enriched company seed, wherein each enriched company seed comprises: values for each attributes from the original seed data prior to enrichment, one or more websites that are associated with that enriched company seed, and additional values for attributes that have been extracted from the one or more websites;

automatically clustering the enriched company seeds into different clusters by identifying selected ones of the enriched company seeds that each belong to a particular company, and then grouping the selected ones of the enriched company seeds into a cluster that represents that particular company, wherein each cluster has at least one value for each attribute; and selecting a particular value for each attribute of each cluster that has a highest score for inclusion in a corresponding company profile for that cluster; and storing each of the company profiles in a repository such that users can access the company profiles and use the company profiles in conjunction with applications.

19. The system according to claim 18, wherein the processor-executable instructions, when executed by the processor, are further configurable to cause:

indexing each of the enriched company seeds by each attribute of that enriched company seed, such that each enriched company seed has an index entry for each attribute to allow each of the enriched company seeds to be searchable by attributes, wherein each index entry represents a particular enriched company seed;

processing each enriched company seed to: search in the index for other enriched company seeds that have similar attributes to find similar enriched company seeds that are candidates for potential inclusion in a cluster for a particular company;

for each seed pair of an enriched company seed for a particular company and a candidate company seed having similar attributes to that enriched company seed:

comparing values of attributes of the two company seeds to calculate and extract features;

running a pre-trained random forest machine learning model on extracted features to determine whether that candidate company seed belongs to the same cluster as the enriched company seed; and adding that candidate company seed to the same cluster as the enriched company seed when the pre-trained random forest machine learning model determines, based on the extracted features, that the candidate company seed belongs to the same cluster as the enriched company seed;

executing a connective components algorithm to collect any other candidate company seeds that share a connection to one or more of the other candidate company seeds that were added to the same cluster of the enriched company seed for that particular company; and add the any other candidate company seeds that share a connection to the same cluster.

20. The system according to claim 19, wherein each cluster comprises: a number of different attributes, wherein each attribute within a particular cluster can have multiple values that were obtained from different seeds, and, wherein the processor-executable instructions, when executed by the processor, are further configurable to cause:

scoring each of values for each attribute within that cluster to generate a score for each attribute by comparing values for each attribute to a value of a corresponding attribute from the original seed data that was extracted from a home webpage for that company;

selecting, for each attribute within that cluster, the particular value for each attribute that has the highest score for inclusion in a company profile for that cluster; and grouping all of the selected values from that cluster together to convert that cluster into a company profile for a particular company, wherein the company profile comprises a set of values that had the highest score for each attribute, and wherein each attribute is a specific piece of information about a company that describes that company or that can be used to identify that company, and wherein a process used to score each of values for each attribute within that cluster to generate a score for each attribute includes processor-executable instructions, that when executed by the processor, are further configurable to cause:

(a) selecting a particular enriched company seed from the cluster;

(b) extracting values for each attribute of that particular enriched company seed;

(c) determining a similarity of each extracted value for each attribute of that particular enriched company seed in comparison to an original value of a corresponding attribute from the original company seed to determine a similarity score for that attribute of that particular enriched company seed;

(d) scaling each similarity score based on a weight assigned to that attribute to generate a weighted similarity score for each attribute of that particular enriched company seed;
(e) summing all of the weighted similarity scores at a website scoring function to generate a website score for that particular enriched company seed; and
(f) computing a score, for each value of each attribute of that particular enriched company seed, as a product of the website score for that particular enriched company seed and the similarity score that was computed for that attribute of that particular enriched company seed; and
repeating (a)-(f) for each of the other enriched company seeds from the cluster to generate scores for all attributes that are part of the cluster.

* * * * *